United States Patent
Bloms et al.

(10) Patent No.: US 9,288,439 B2
(45) Date of Patent: Mar. 15, 2016

(54) AUDIO-VIDEO REMOTE VISITATION TELECOMMUNICATIONS TECHNOLOGY

(71) Applicant: TW Vending, Inc., Hudson, WI (US)

(72) Inventors: Eric Bloms, River Falls, WI (US); Todd Westby, Woodbury, MN (US); Ben Halberg, River Falls, WI (US); Sam Bengston, River Falls, WI (US)

(73) Assignee: TW Vending, Inc., Hudson, WI (US)

( * ) Notice: Subject to any disclaimer, the term of this patent is extended or adjusted under 35 U.S.C. 154(b) by 0 days.

(21) Appl. No.: 14/136,886

(22) Filed: Dec. 20, 2013

(65) Prior Publication Data

US 2014/0218466 A1 Aug. 7, 2014

Related U.S. Application Data

(60) Provisional application No. 61/848,148, filed on Dec. 21, 2012.

(51) Int. Cl.
| | |
|---|---|
| *H04N 7/15* | (2006.01) |
| *H04L 29/06* | (2006.01) |
| *G06Q 50/26* | (2012.01) |
| *G06Q 50/10* | (2012.01) |

(52) U.S. Cl.
CPC .............. *H04N 7/152* (2013.01); *G06Q 50/10* (2013.01); *G06Q 50/26* (2013.01); *H04L 65/4038* (2013.01); *H04N 7/15* (2013.01)

(58) Field of Classification Search
CPC ...... H04N 7/152; H04N 7/15; H04L 65/4038; G06Q 50/10; G06Q 50/26
USPC .................. 235/382; 348/14.01, 14.03, 14.08, 348/14.09, 14.11, 14.12; 705/2, 3; 711/115; 340/870.01; 700/225
See application file for complete search history.

(56) References Cited

U.S. PATENT DOCUMENTS

| | | | |
|---|---|---|---|
| 4,054,756 A | 10/1977 | Comella et al. | |
| 5,382,972 A | 1/1995 | Kannes | |
| 6,604,018 B2 * | 8/2003 | Richard ................ | G06Q 10/08 700/215 |
| 6,844,893 B1 | 1/2005 | Miller et al. | |
| 7,046,779 B2 | 5/2006 | Hesse | |
| 7,061,521 B2 * | 6/2006 | Bulriss et al. .............. | 348/14.08 |
| 7,158,621 B2 | 1/2007 | Bayne | |
| 7,256,708 B2 * | 8/2007 | Rosenfeld ............ | G06F 19/325 340/539.12 |
| 7,256,816 B2 * | 8/2007 | Profanchik et al. ........ | 348/14.09 |
| 7,650,291 B2 * | 1/2010 | Rosenfeld et al. ................ | 705/2 |
| 7,991,625 B2 * | 8/2011 | Rosenfeld ............. | A61B 5/412 600/300 |
| 8,064,580 B1 | 11/2011 | Apple et al. | |
| 8,160,219 B2 | 4/2012 | Bayne | |

(Continued)

*Primary Examiner* — Gerald Gauthier
(74) *Attorney, Agent, or Firm* — Skinner and Associates; Joel O. Skinner

(57) ABSTRACT

A telecommunications system for use in a secure facility such as a jail, prison or the like. The systems, devices and methods disclosed provide telecommunications, email, other messaging, financial services, vending, and commissary or canteen services for inmates of a secure facility with respect to family, friends and others. The system also includes a system for video visitation via audio-visual communication. The system includes a phone server adapted to be communicatively connected to an external service provider; a monitoring station communicatively connected to the phone server; an account manager server communicatively connected to the phone server, and at least one telecommunications device disposed at the secure facility for use by the inmate and which is communicatively connected to the phone server. A method of telecommunicating, including video visitation, via the system is also disclosed.

21 Claims, 89 Drawing Sheets

(56) References Cited

U.S. PATENT DOCUMENTS

| | | | |
|---|---|---|---|
| 8,305,423 B2* | 11/2012 | Fabregat | H04N 7/147 348/14.03 |
| 8,326,649 B2* | 12/2012 | Rosenfeld | A61B 5/0205 600/300 |
| 8,401,874 B2* | 3/2013 | Rosenfeld | A61B 5/411 600/300 |
| 8,648,894 B2* | 2/2014 | Laney et al. | 348/14.03 |
| 8,832,374 B1* | 9/2014 | Schaefers | 711/115 |
| 9,007,425 B1* | 4/2015 | Simon | 348/14.12 |
| 9,094,569 B1* | 7/2015 | Humphries | H04N 7/14 |
| 9,106,789 B1* | 8/2015 | Shipman, Jr. | H04N 7/147 |
| 2004/0252184 A1* | 12/2004 | Hesse | E04H 1/14 348/14.01 |
| 2008/0000966 A1* | 1/2008 | Keiser | 235/382 |
| 2008/0201158 A1* | 8/2008 | Johnson et al. | 705/1 |
| 2009/0076832 A1* | 3/2009 | Collins | 705/1 |
| 2009/0228383 A1 | 9/2009 | Martinez et al. | |
| 2011/0096139 A1* | 4/2011 | Rudolf | 348/14.11 |
| 2013/0194377 A1 | 8/2013 | Humphries | |
| 2014/0192132 A1* | 7/2014 | Avery et al. | 348/14.01 |
| 2014/0218466 A1* | 8/2014 | Bloms et al. | 348/14.09 |

* cited by examiner

| ACCOUNT INFO | INMATE NAME | | | RESTART COMPUTER |
|---|---|---|---|---|
| | PHONE CALL | | PHONE ACCOUNT | |
| | | VOICEMAIL (3) | | |
| HISTORY | CALLER | DATE | | |
| CHANGE PIN | TKC SUPPORT | 9/14/2012 8:19 AM | LISTEN | |
| WITHDRAWAL | TKC SUPPORT | 9/28/2012 12:55 AM | LISTEN | |
| CANTEEN | TKC SUPPORT | 10/14/2012 6:37 AM | LISTEN | |
| PHONE CARD | | | | |
| MP3 | | | | |
| REQUESTS | | | | |
| INBOX | | | | |
| PHONE CALL | | | | |
| EXIT | | | | |

INMATE
CANTEEN

HOME  FAQ  CONTACT

STEP 1 OF 4

NEW ACCOUNT SIGNUP

AN INMATE CANTEEN ACCOUNT GIVES YOU DIRECT ACCESS TO A VARIETY OF SPECIALIZED SERVICES DESIGNED SPECIFICALLY FOR FAMILY AND FRIENDS OF INMATES IN CORRECTIONAL FACILITIES AROUND THE U.S.

CURRENTLY YOU MAY DEPOSIT FUNDS DIRECTLY INTO AN INMATE'S TRUST ACCOUNT, AND SOON YOU WILL BE ABLE TO SEND CARE PACKAGES, PURCHASE PRE-PAID PHONE CARDS, AND SEND ELECTRONIC MESSAGES TO INMATES AS WELL.

PLEASE ENTER YOUR FIRST AND LAST NAME BELOW

FIRST NAME:
LAST NAME:
PHONE NUMBER:

NEXT

INMATE PHONE CALL MONITORING PHONE SITE SETTINGS REPORTS ▷ LOGOUT
CANTEEN
TEST SITE TELPHONY SITE SETTINGS

PHONE CALL MONITORING
PHONE CALL SETTINGS
REPORTS ▷

EMAIL NOTIFICATIONS
ADD NEW NOTIFICATION
EMAIL ADDRESS: [A@JAIL.COMB@JAIL.COM]
PER APPROVED WEBUSER: [NO WEBUSERS AVAILAB ▷]
PER INMATE: [-SELECT- ▷]
PER SECTION: [-SELECT- ▷]
PER INMATE GROUP: [-SELECT- ▷]
[ADD SETTING]

BLACKLISTING
BLACKLIST INMATES AND WEBUSERS FROM PHONE CALLS
SELECT AN APPROVED WEBUSER: [NO WEBUSERS AVAILAB ▷]
SELECT AND INMATE: [-SELECT- ▷]
SELECT A SECTION: [-SELECT- ▷]
SELECT A GROUP: [-SELECT- ▷]
ENTER A PHONE NUMBER: [          ]
SEARCH FOR BLACKLISTED NUMBER: [          ] [SEARCH]
[ADD SETTING]

PHONE CALL HOURS
EDIT PHONE INCOMING/OUTGOING HOURS
DAY: [-SELECT- ▷] START TIME: [11:24:00AM] END TIME: [11:24:00AM] [ADD SETTING]
MONDAY'S CALL HOURS:
[MONDAY] [5:00 AM] TO [10:00 PM] ⊗
[MONDAY] [9:30 AM] TO [9:30 PM] ⊗

FIG. 56

INMATE CANTEEN — PHONE CALL MONITORING   PHONE SITE SETTINGS   REPORTS ▷   LOGOUT

PHONE CALL MONITORING
PHONE CALL SETTINGS
REPORTS ▽

TEST SITE TELPHONY SITE SETTINGS

EMAIL NOTIFICATIONS
ADD NEW NOTIFICATION
EMAIL ADDRESS: [A@JAIL.COM,B@JAIL.COM] ⊕
PER APPROVED WEBUSER: [NO WEBUSERS AVAILAB ▽]
PER INMATE: [-SELECT- ▽]
PER SECTION: [-SELECT- ▽]
PER INMATE GROUP: [-SELECT- ▽]  [ADD SETTING]

BLACKLISTING
BLACKLIST INMATES AND WEBUSERS FROM PHONE CALLS
SELECT AN APPROVED WEBUSER: [NO WEBUSERS AVAILAB ▽] ⊕
SELECT AND INMATE: [-SELECT- ▽]
SELECT A SECTION: [-SELECT- ▽]
SELECT A GROUP: [-SELECT- ▽]
ENTER A PHONE NUMBER: [_____]
SEARCH FOR BLACKLISTED NUMBER: [_____] [SEARCH]  [ADD SETTING]

PHONE CALL HOURS
EDIT PHONE INCOMING/OUTGOING HOURS
DAY: [-SELECT- ▽]  START TIME: [11:24:00AM ⬦]  END TIME: [11:24:00AM ⬦]  [ADD SETTING]
MONDAY'S CALL HOURS:
MONDAY [5:00 AM]  [TO] [10:00 PM]  ⊗
MONDAY [9:30 AM]  [TO] [9:30 PM]  ⊗

↙ 159

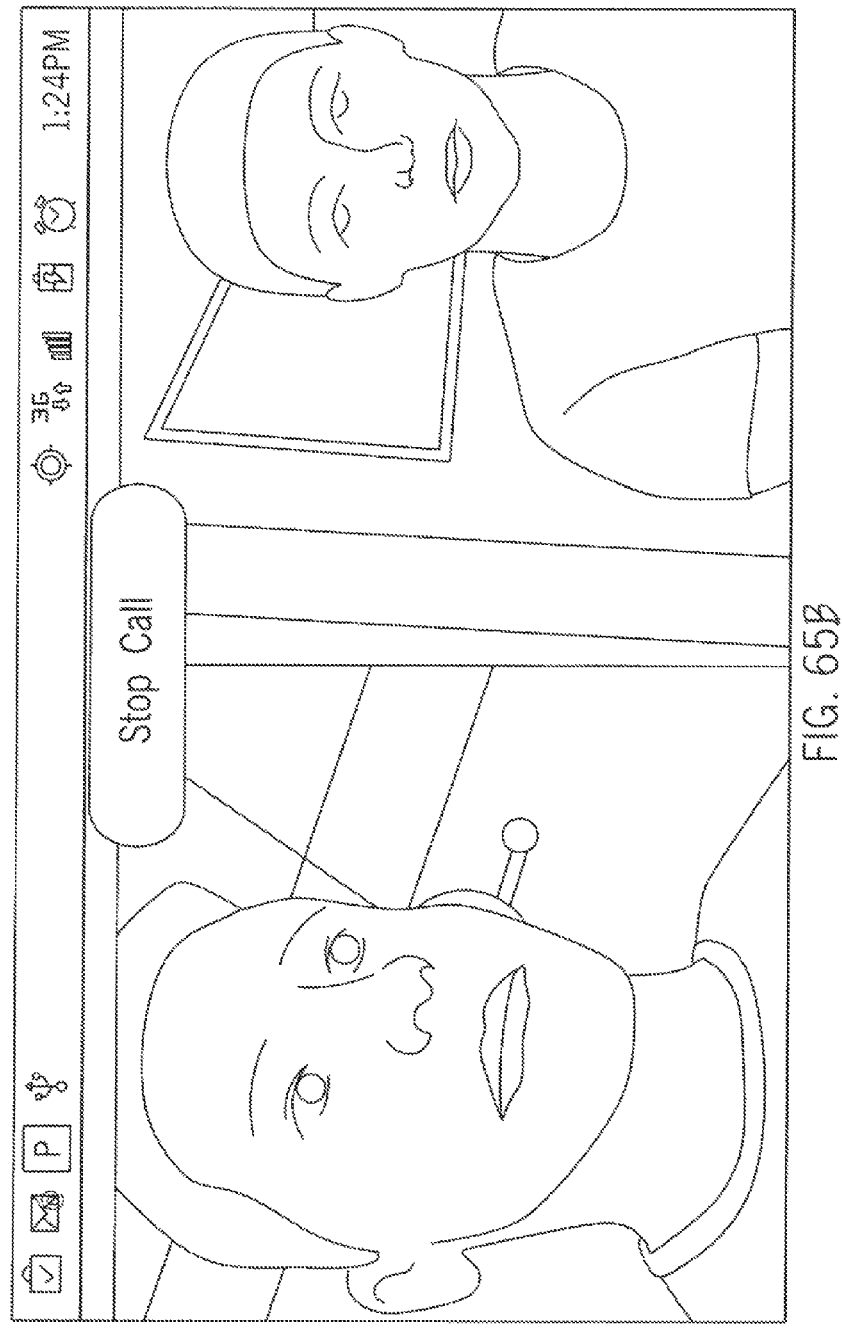

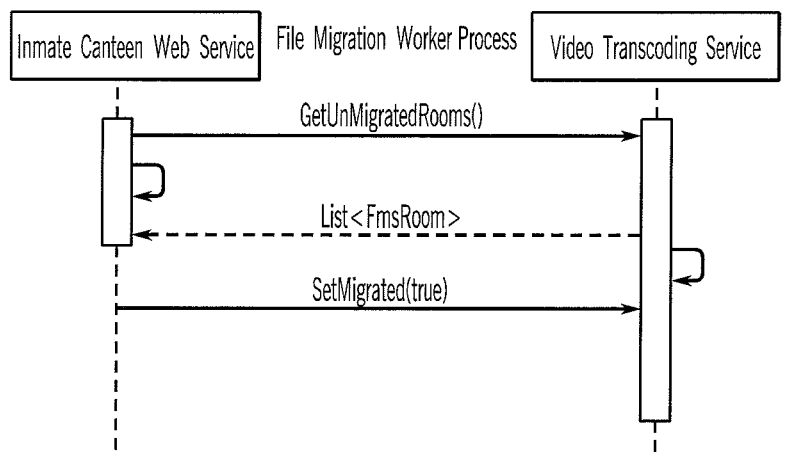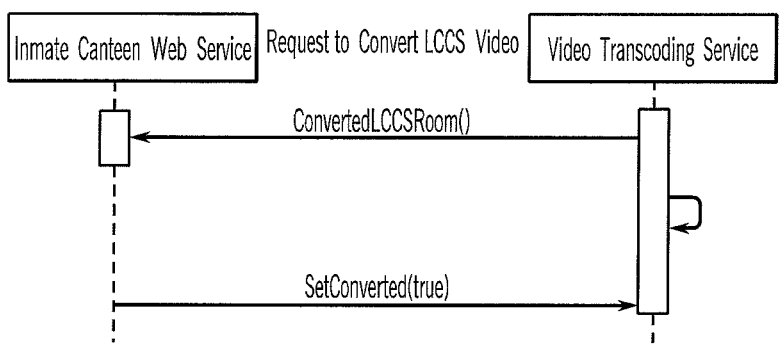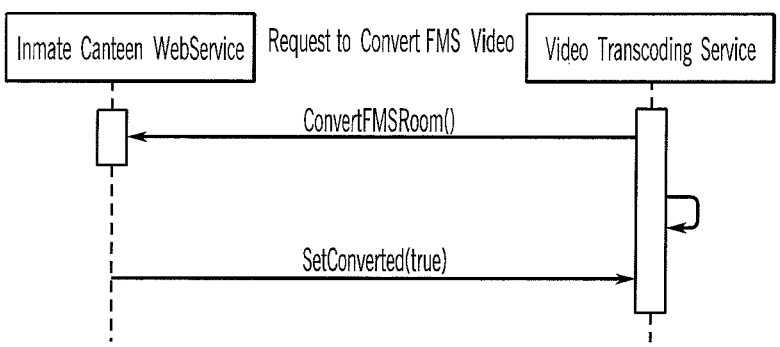
FIG. 67

1296

VIDEO VISITATION SITE SETTINGS      ST. CROIX COUNTY

Hide Topics... ⊕
Adding an Email Notification ⊞
Blacklisting ⊞
Editing Visitation Hours ⊞
Editing Connection Settings ⊞

Add New Notification

Email Address: [A@Jail.com, B@Jail.com] ⊕
Per Approved WebUser: [Select WebUser ▼]
Per Inmate: [Select Inmate ▼]
Per Section: [Select Section ▼]
Per Inmate Group: [No Groups for this Fa ▼]

( ⊙ Add Setting )

BlackList Inmates or Webusers from Video Calls – View Full List

Select an Approved Webuser: [Select WebUser ▼]
Select an Inmate: [Select Inmate ▼]
Select a Section: [Select Section ▼]
Select a Group: [No Groups for this Fa ▼] ( ⊙ Add Setting )

Edit Allowed Hours to receive video calls

| Monday | 12:02 AM to 11:58 PM ⊗ |
| Tuesday | 12:02 AM to 11:58 PM ⊗ |
| Wednesday | 12:02 AM to 11:58 PM ⊗ |
| Thursday | 12:02 AM to 11:58 PM ⊗ |
| Friday | 12:02 AM to 11:58 PM ⊗ |
| Saturday | 12:02 AM to 11:58 PM ⊗ |
| Sunday | 12:02 AM to 11:58 PM ⊗ |

[Select A Day ▼] [02:12:00 PM ↕] to [02:12:00 PM ↕] (＋ Add )

( ⊙ Add Setting )

Rules for connecting video calls

☑ Connect Calls without Admin Approval
☐ Allow all Webusers to visit without background check ( ⊙ Add Setting )

Rules that apply per section

Active Sections for Video Visitation:
☑ Booking
☑ Vid / Phone Testing ( ⊙ Add Setting )

| Setting Name | Start Date | |
|---|---|---|
| Active Sectoin: Admin | 9 / 11 / 2012 8:11:06 AM | [Remove] |
| Active Section: Booking | 9 / 11 / 2012 8:11:06 AM | [Remove] |
| Active Section: Lobby | 9 / 11 / 2012 8:11:06 AM | [Remove] |

FIG. 69

Inmate     Home    Site Management    Facility Settings    View Saved Video    Logout
Canteen Admin

Full Blacklist List – Dakota County

| Start Date | End Date | Name | Category | Detail | Remove | Team User |
|---|---|---|---|---|---|---|
| 7/11/2012 1:43:11 PM | 12/31/9999 11:59:59 PM | DEAN, JASON | Inmate | + Detail | ⊗ | tkceric |
| 7/11/2012 1:43:11 PM | 12/31/9999 11:59:59 PM | DEAN, JASON | Inmate | + Detail | ⊗ | tkceric |
| 7/11/2012 1:43:11 PM | 12/31/9999 11:59:59 PM | Smith, Bob | WebUser | + Detail | ⊗ | tkceric |
| ... | | | | | | |
| 7/25/2012 2:16:36 PM | 12/31/9999 11:59:59 PM | art, mike | WebUser | + Detail | ⊗ | dgcx5 |
| 7/25/2012 2:16:36 PM | 12/31/9999 11:59:59 PM | art, mike | WebUser | + Detail | ⊗ | dgcx5 |

FIG. 71

Inmate
Canteen Admin    Home    Site Management    Facility Settings    View Saved Video    Logout Search Video By:

( Inmate )    ( Data Range )

Inmate Selected
Acct Code: 31    First Name: John    Last Name: Doe
( Change Inmate )

Video Archives

| 10/15/2012<br>11:58:30 AM | John Doe | TKC<br>Support | .18Mb | ( View Online ) | ( Request<br>Download ) |
| 11/5/2012<br>1:42:44 PM | John Doe | TKC<br>Support | .17Mb | ( View Online ) | ( Request<br>Download ) |
| ... | | | | | |
| 11/13/2012<br>10:34:42 AM | John Doe | TKC<br>Support | .16Mb | ( View Online ) | ( Request<br>Download ) |

FIG. 72

Turnkey Corrections – St. Croix County Notification

Inmate
Canteen

Video Visitation Notification

The WebUser TKC Support and Inmate John Doe are using Inmate Canteen Video Visitation!

Follow this link to view the call in progress: Click Here

When the Session is completed, you may watch the recorded video here: Click Here.

You're receiving this because you have opted in to E-mail Notifications.

| Inmate Canteen Video | Home | My Account | Audition Room | Logout |

✉ Get Approved
___
St. Croix County requires an approval before you can visit.
Your information will be reviewed by the facility as soon as possible.
Approval Status: No Approval Submitted
___

VIDEO CHAT APPROVAL FORM

Facility: St. Croix County
Date of Birth: [click me ->] 🗓
Drivers License Number: [        ]
Relationship To Inmate: [        ]
Address: [        ]
Address 2: [        ]
City: [        ]
Zip: [        ]

( Request Approval )

○ Deposit for Inmate

FIG. 75

Turnkey Corrections Approval Notification

Inmate
Canteen

Approval Request – Denied

Unfortunately, you have been denied the ability to visit online at St. Croix County. Please contact the facility for further information regarding this denial.

You're receiving this because you have opted in to E-mail Notifications.

FIG. 79

Inmate     Home    My Account    Audition Room    Logout
Canteen Video

INMATE CANTEEN VIDEO VISITATION       JOHN DOE

Visitation Hours

| Day | Time |
|---|---|
| Monday | 12:02 AM to 11:58 PM |
| Tuesday | 12:02 AM to 11:58 PM |
| Wednesday | 12:02 AM to 11:58 PM |
| Thursday | 12:02 AM to 11:58 PM |
| Friday | 12:02 AM to 11:58 PM |
| Saturday | 12:02 AM to 11:58 PM |
| Sunday | 12:02 AM to 11:58 PM |

Current Status: Open

☑ I agree to the video agreement ( Call Inmate )

$0.35 / min -- may change per facility

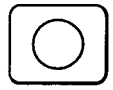 Communication Account Balance: $856.79    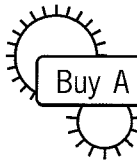 Buy A Web Camera

ADD FUNDS TO YOUR ACCOUNT BALANCE

Please Select a Credit Card:   XXXX-XXXX-XXXX-1524 ▼

Please Enter Deposit Amount:   $[ ] + $8.00 Fee

[Process Transaction]    ☐ I agree to the video agreement

 Questions or comments? Please call 715-386-5700

FIG. 81

Inmate Canteen Video   Home   My Account   Audition Room   Logout

INMATE CANTEEN VIDEO VISITATION    JOHN DOE

Visitation Hours

| Day | Time |
|---|---|
| Monday | 12:02 AM to 11:58 PM |
| Tuesday | 12:02 AM to 11:58 PM |
| Wednesday | 12:02 AM to 11:58 PM |

Current Status: Open

ATTEMPTING TO CALL INMATE
2:46

Cancel

The kiosk inside of the facility is ringing. The Inmate will not have access to this kiosk at all times.

The inmate may not be available for the following reasons:
- The inmate is in Lockdown
- The inmate is in Recreation
- The inmate is in Programs

 Camera

ADD FUNDS TO YOUR ACCOUNT BALANCE

Please Select a Credit Card: XXXX-XXXX-XXXX-1524 ▼

Please Enter Deposit Amount: $ _____ + $8.00 Fee

Process Transaction    ☐ I agree to the video agreement

 Questions or comments? Please call 715-386-5700

FIG. 82

| | | Home | Site Management | Facility Settings | View | Saved Video | Logout |
|---|---|---|---|---|---|---|---|
| Inmate Canteen Admin | | | | | | | |
| | | Full User Approval List – St. Croix County | | | | | |
| Date | Name | Status | Suggested Inmate | Detail | Reset | Approve | Deny | Pending |
| 12/7/2012 3:23:06 PM | Ge Link | Denied | Doe, John | (+Detail) | ▣ | ⊙ | ⊗ | ▣ |
| 9/28/2012 8:02:38 AM | Al Lance | Pending | Doe, John | (+Detail) | ▣ | ⊙ | ⊗ | ▣ |
| 9/13/2012 1:39:56 PM | TKC Support | Approved | | (+Detail) | ▣ | ⊙ | ⊗ | ▣ |

Home     Login
Lookup Receipt     Sign Up
FAQ     My Account
Contact

| TWVENDING.NET | | | | tkceric [ Log Out ] |
|---|---|---|---|---|
| Home  Email Video  Visitation Video  About  ACT  Seed  Submit Ticket  Application  Support Portal | | | | |
| Test Video  Monthly Credit Card  View All Video  View Online Kiosks  Credit Card Errors  Phone Directory | | | | |
| Online Transaction Info  Canteen Items Auto Removed  Recent Video Calls  Phone Cards  Email Sales | | | | |
| Site Name | Section | Station | Call Time | Play |
| Dakota County | 8100 | T10-375 | 12 / 8 / 2012   9:57:14 PM | ☐ |
| Dakota County | 9100 | T12-580 | 12 / 8 / 2012   7:02:59 PM | ☐ |
|  |  | ⋮ |  |  |
| Daviess-Dekalb County | C Tank | T10-303 | 12 / 8 / 2012   10:27:12 PM | ☐ |

FIG. 86

AUDIO-VIDEO REMOTE VISITATION TELECOMMUNICATIONS TECHNOLOGY

CROSS REFERENCE TO RELATED APPLICATIONS, IF ANY

This application claims the benefit under 35 U.S.C. §119(e) of U.S. Provisional Patent Application Ser. No. 61/848,148, filed Dec. 21, 2012, which is hereby incorporated by reference.

37 C.F.R. §1.71(E) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to telecommunications systems, apparatus and methods. Particularly, the invention relates to a telecommunications system for use in a secure facility such as a jail, prison or the like. Most particularly, the invention provides audio-visual telecommunications services for inmates of a secure facility with respect to family, friends and others.

2. Background Information

Existing technology in this field is believed to have significant limitations and shortcomings.

All US patents and patent applications, and all other published documents mentioned anywhere in this application are incorporated by reference in their entirety.

BRIEF SUMMARY OF THE INVENTION

The present invention provides a telecommunications apparatus and methods which are practical, reliable, secure, accurate and efficient, and which are believed to constitute an improvement over the background technology.

In one aspect, the invention relates to systems, devices and methods for providing telecommunications, audio-visual communication and visitation, email, other messaging, financial services, vending, and commissary or canteen services for inmates of a secure facility with respect to family, friends and others.

In one aspect, the invention provides a system for providing telecommunications between a resident inside a secure facility and at least one person outside the secure facility, and for management of such telecommunications by an administrator of the secure facility, comprising: a phone server adapted to be communicatively connected to an external service provider; a monitoring station communicatively connected to the phone server: an account manager server communicatively connected to the phone server, and at least one telecommunications device disposed at the secure facility for use by the resident and being communicatively connected to the phone server.

In another aspect, the invention provides a method for telecommunicating between a resident inside a secure facility and at least one person outside the secure facility, and for management of such telecommunication by an administrator of the secure facility, comprising the step of making an incoming voice call from at least one person outside the secure facility to the resident inside the secure facility.

The secure facility is an institution such as a jail, a detention center, a short term corrections facility, a penitentiary, a prison and a mental health institution. The resident is a person such as an inmate, a prisoner and a patient. The administrator is a person such as a sheriff, an officer, a guard, a warden, a jailer, and a mental health worker. The at least one person outside the secure facility is a person such as a family member, a friend, an acquaintance, and an attorney. The telecommunications between the resident of the secure facility and the at least one person outside the secure facility is a communication mode such as voice. SMS text, IM, email, and/or audio-visual. Management of telecommunications is selected from the group of activities consisting of monitoring, recording, controlling and documenting communications and transactions of the resident. Controlling activities may involve call blocking, blacklisting, email notification, section/station setting, attorney call status, and/or deferred call status. The at least one telecommunications device disposed at the secure facility is a device such as a land line telephone, a mobile telephone, a personal computer (PC), and a telecommunications kiosk. And, the person outside the secure facility communicatively connects with the system by a device adapted to connect to the phone server selected from the group of devices consisting of a land line telephone, a mobile telephone, a smart phone, a PC and a telecommunications kiosk.

The person outside the secure facility is further able to electronically deposit funds or credits to an account of the resident at the secure facility. The account funding products and services may be voice communications, audio-visual communications, vending drink, snacks and food items, and commissary items such as personal care items, books, videos, clothing and apparel, and blankets. The administrator is further able to monitor, audit and manage the account of the resident.

The present invention is believed to involve novel elements, combined in novel ways to yield more than predictable results. The problems solved by the invention were not fully recognized in the prior art.

The aspects, features, advantages, benefits and objects of the invention will become clear to those skilled in the art by reference to the following description, claims and drawings.

BRIEF DESCRIPTION OF THE SEVERAL VIEWS OF THE DRAWING

FIGS. 12 to 24 show embodiments of user screens of the administrator controls and tools of the system as outlined in the Chart of FIG. 9, with FIG. 12 illustrating a LogIn interface.

FIG. 13 discloses a chat initiation screen.

FIG. 14 shows a Create Inmate Account screen.

Figure 15:
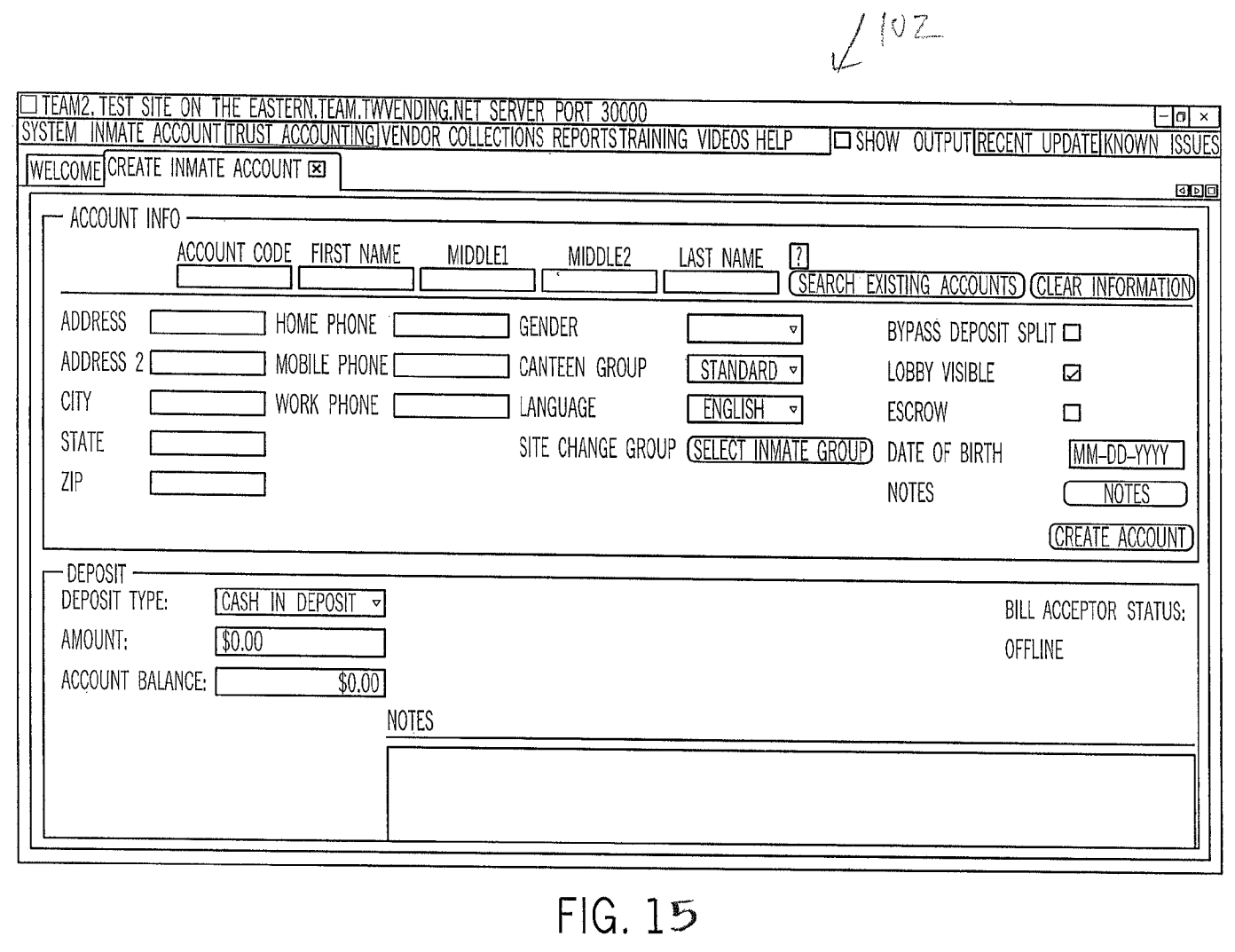

FIG. 15 also shows a Create Account screen.

FIG. 16 discloses a Deposit Funds to Inmate Account screen.

FIG. 17 illustrates a Withdraw Funds from Inmate Account screen.

Figure 18:
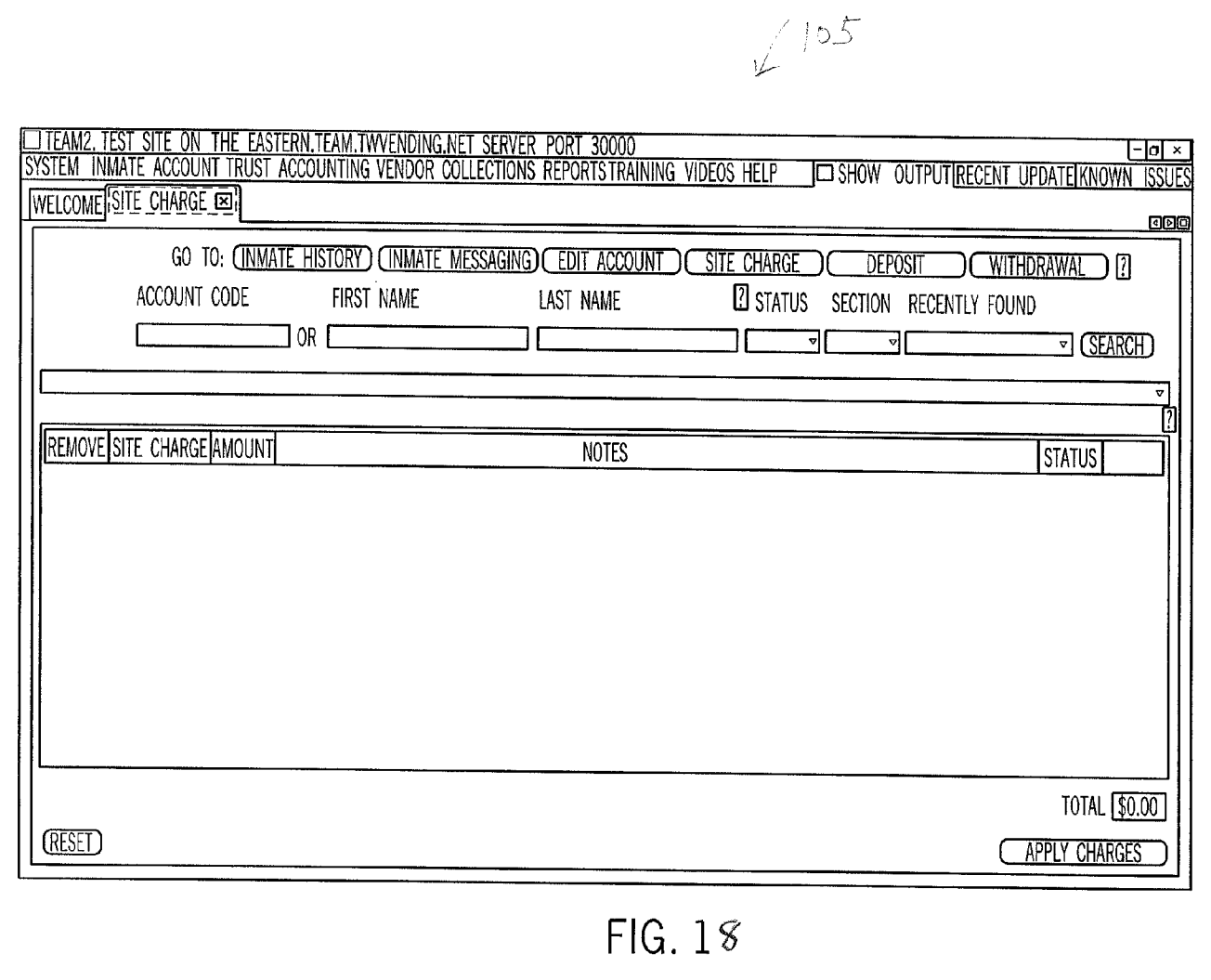

FIG. 18 shows a Charge (Site Charge) An Inmate's Account for Money Owed to a Vendor screen.

Figure 19:
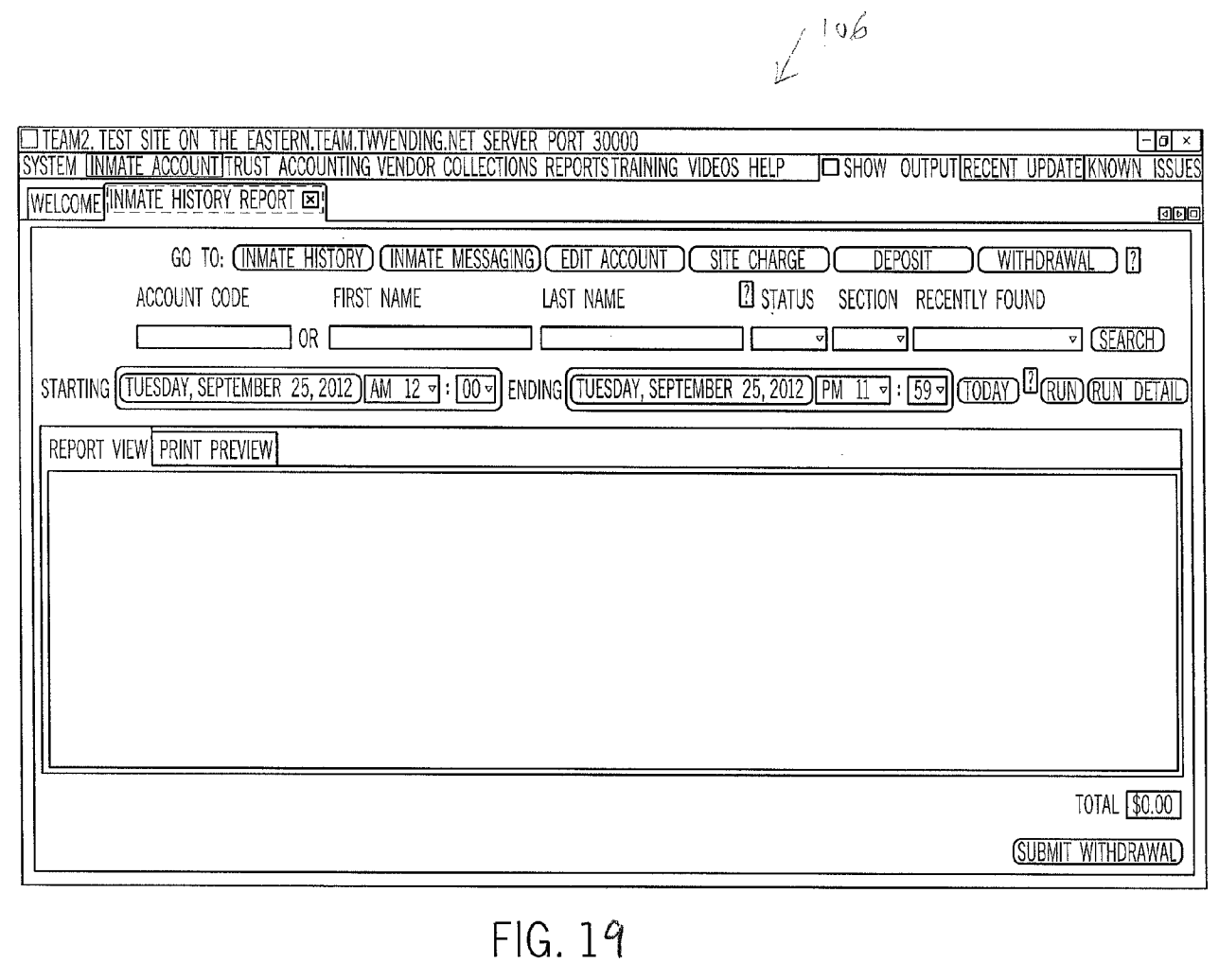

FIG. 19 discloses a Inmate History Report user interface.

FIG. 20 shows a Inmate Request screen.

FIG. 21 shows an Undo/Correction Wizard interface.

FIG. 22 shows a submit a ticket screen.

FIG. 23 shows a remote support screen.

FIG. 24 shows a live chat screen.

FIGS. 25-37 show further administrator control functions and user interfaces, with FIG. 25 illustrating a Close Inmate Account screen.

Figure 26:
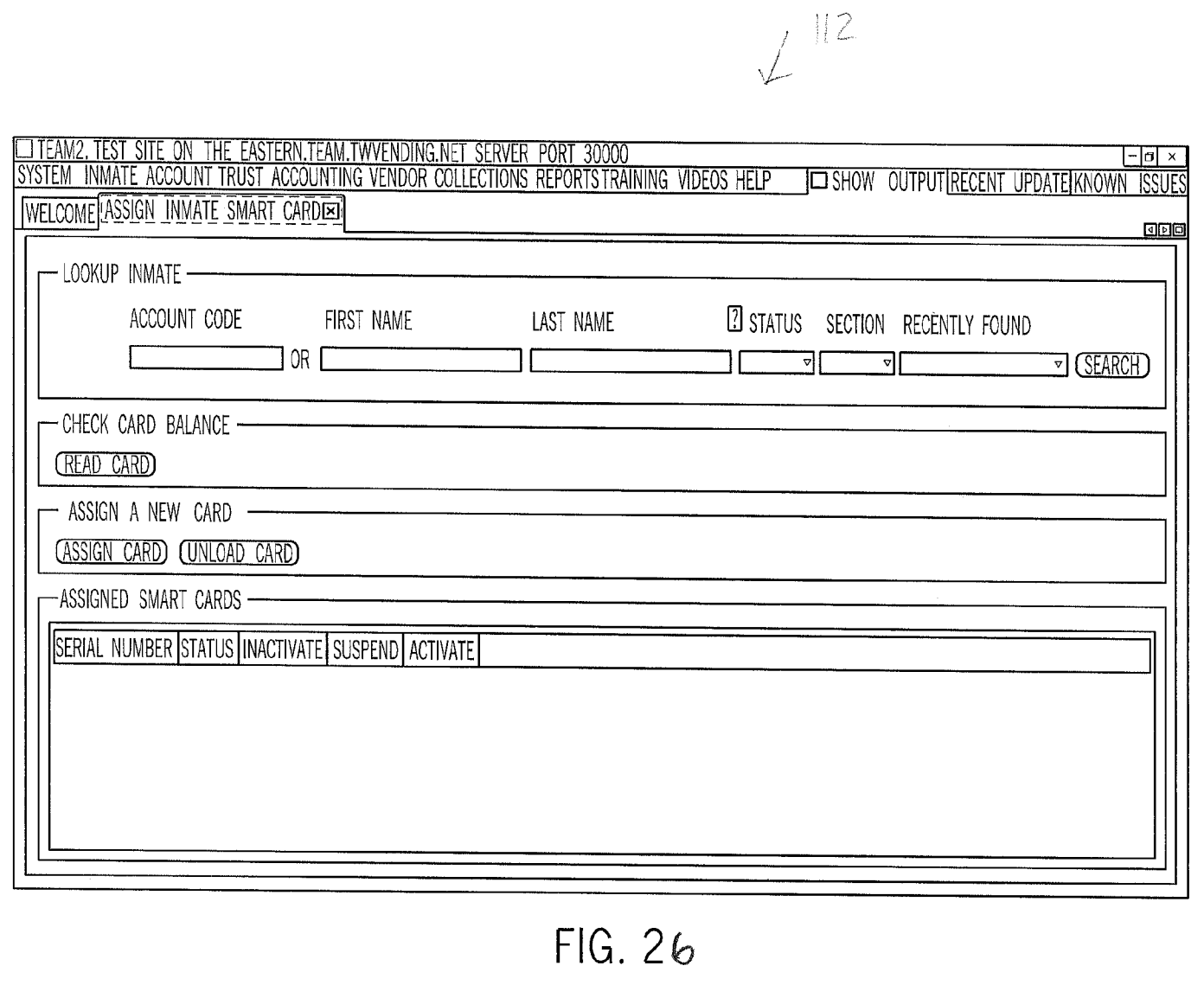

FIG. 26 shows an Assign Inmate Smart Card screen.

Figure 27:
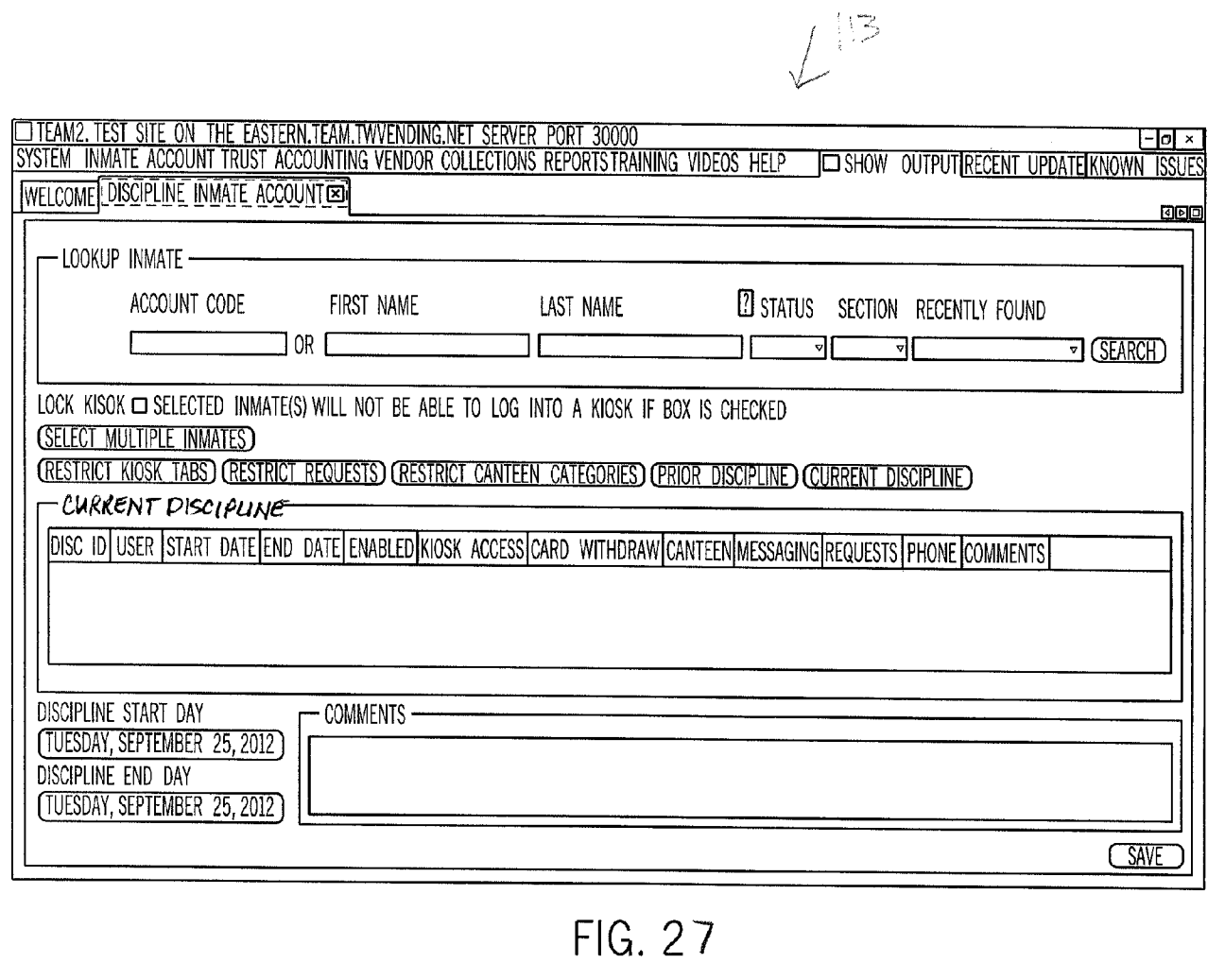

FIG. 27 discloses a Discipline Inmate Account interface.

Figure 28:
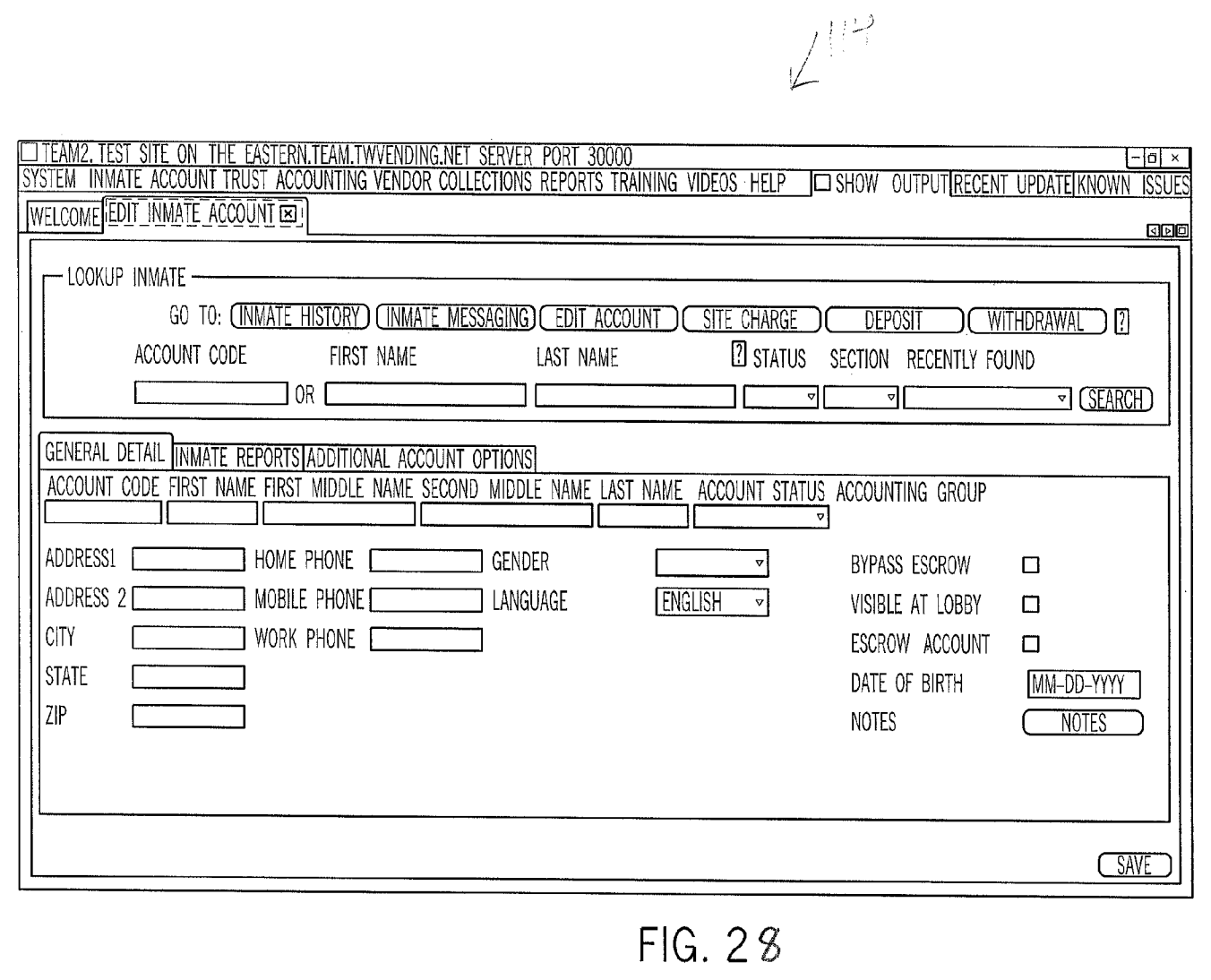

FIG. 28 illustrates an Edit Inmate Account screen.

FIG. 29 shows an Inmate Requests—Old screen.

Figure 30:
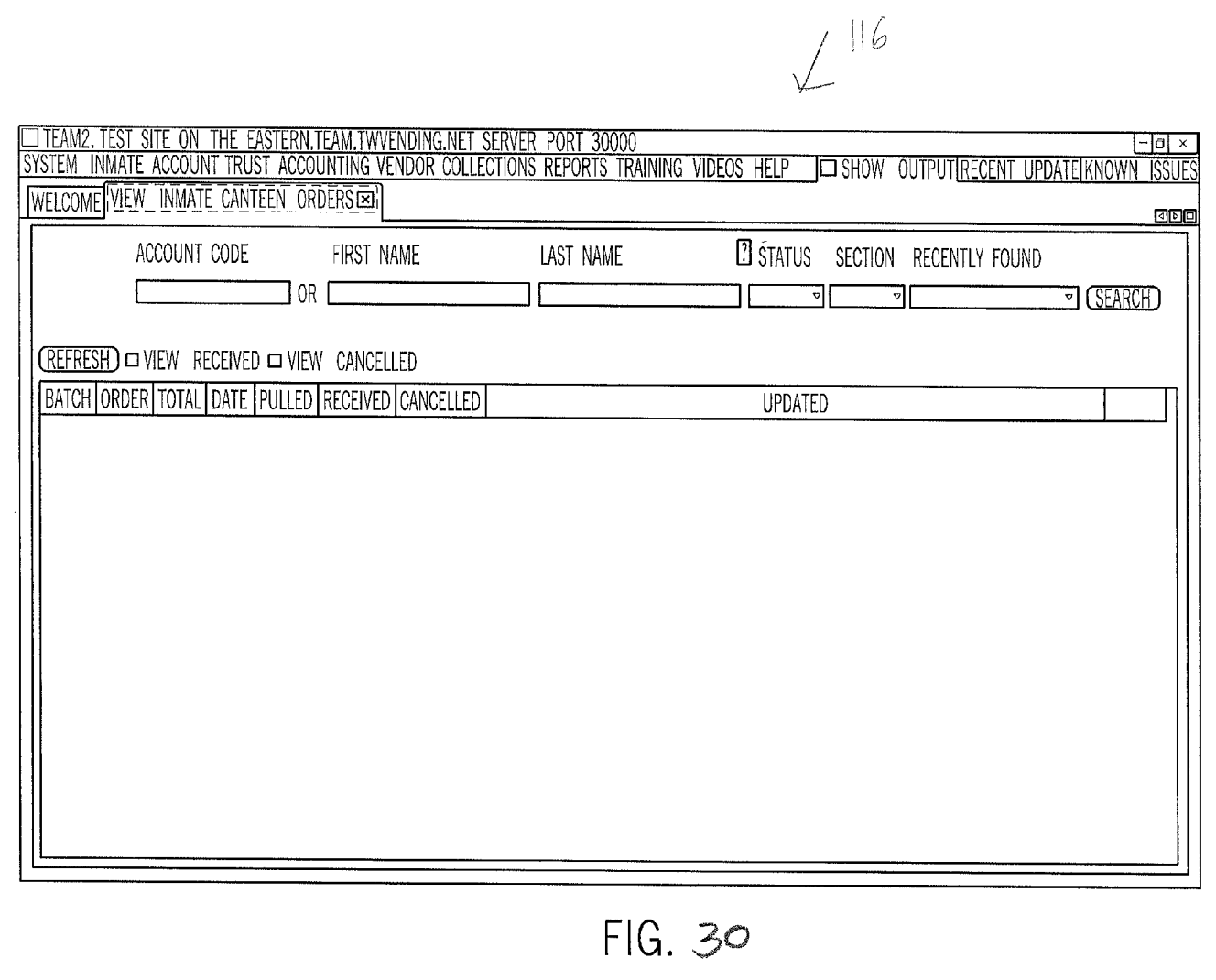

FIG. 30 shows a View Inmate Canteen Order screen.

FIG. 31 shows a Bank Deposit interface.

Figure 32:
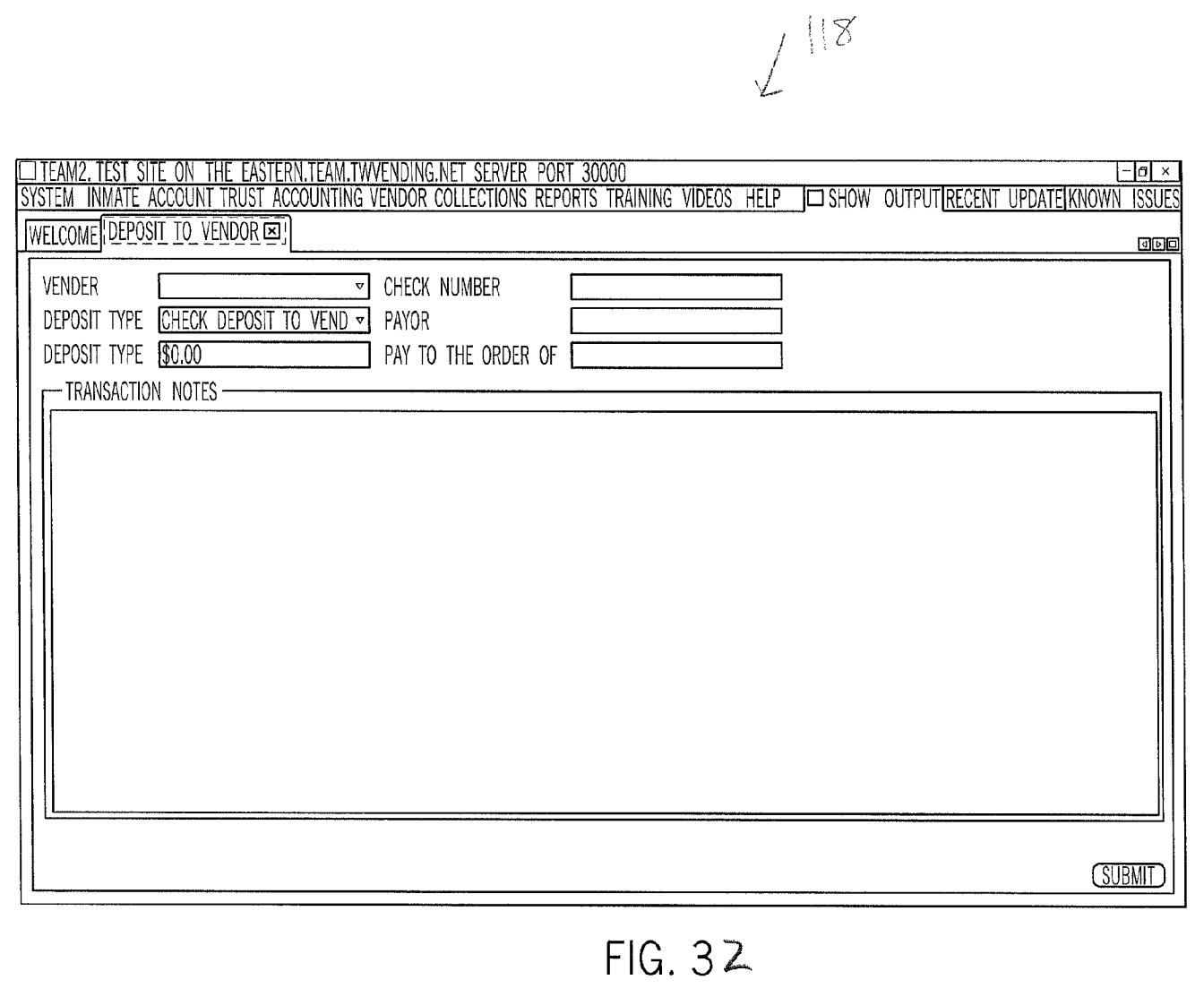

FIG. 32 shows a Deposit To Vendor screen.

Figure 33:
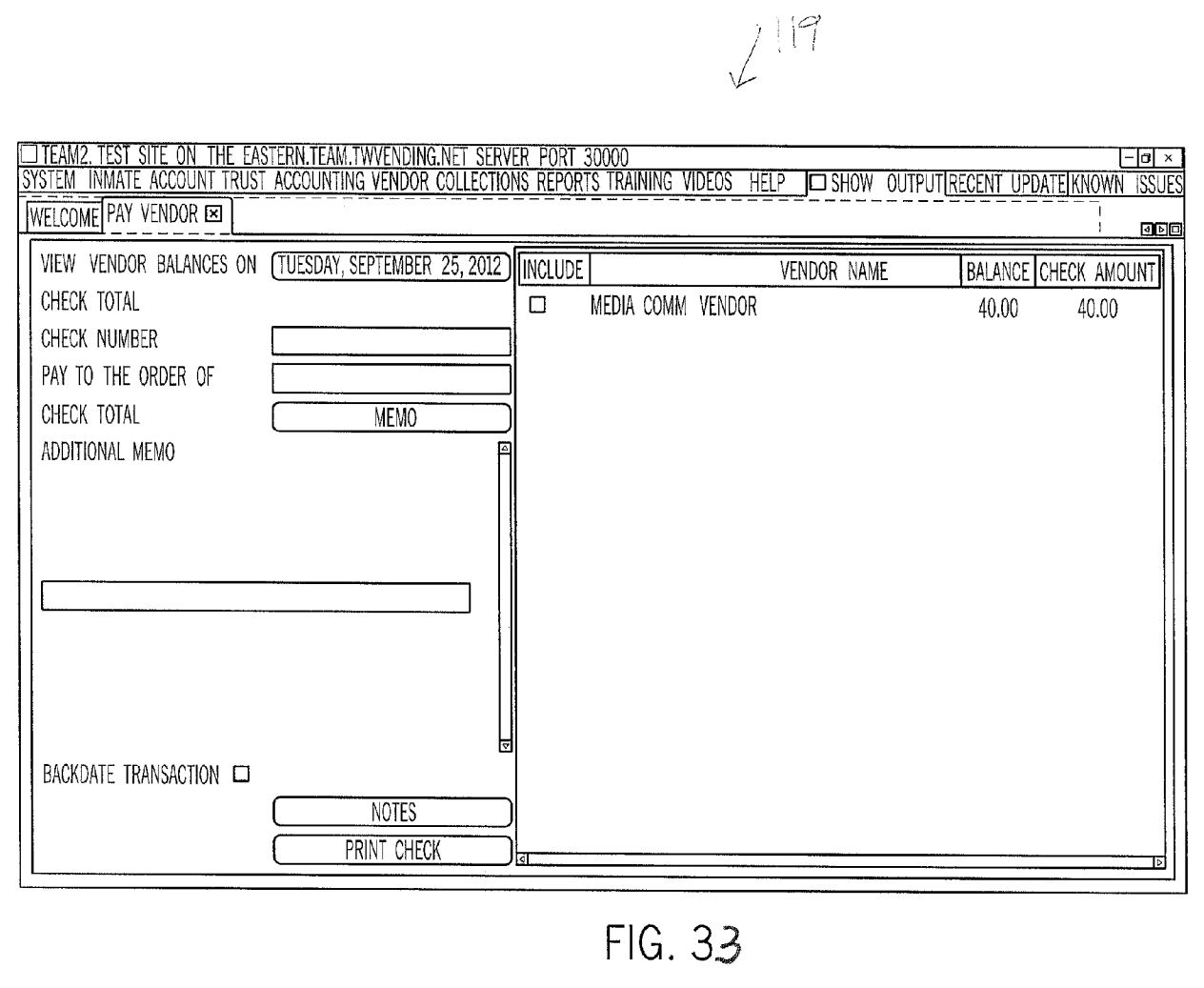

FIG. 33 shows a Pay Vendor user interface.

FIG. 34 shows a Batch Order screen.

Figure 35:
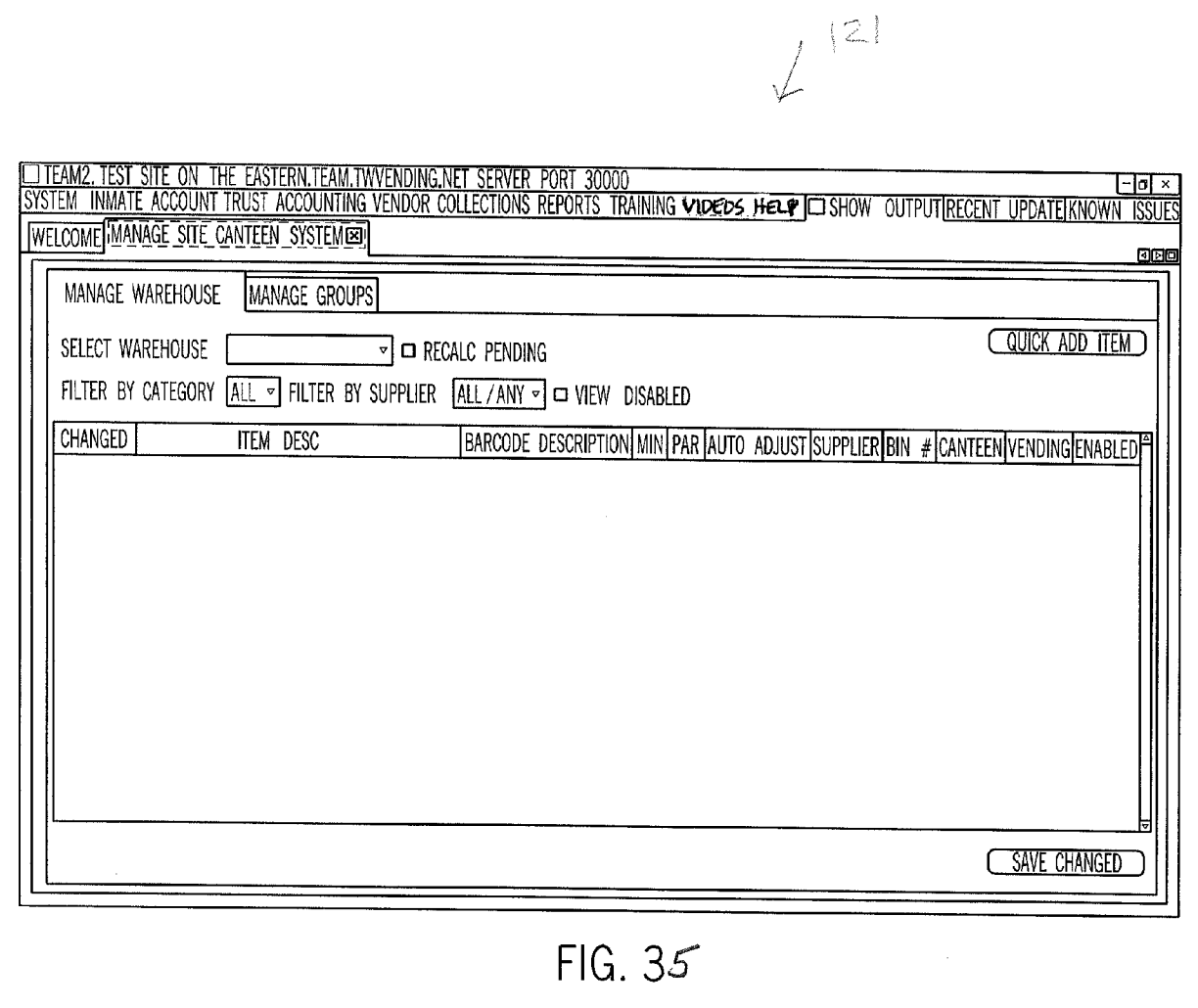

FIG. 35 shows a Manage Site Canteen System interface.

FIG. 36 shows a Manage Warehouse screen.

Figure 37:
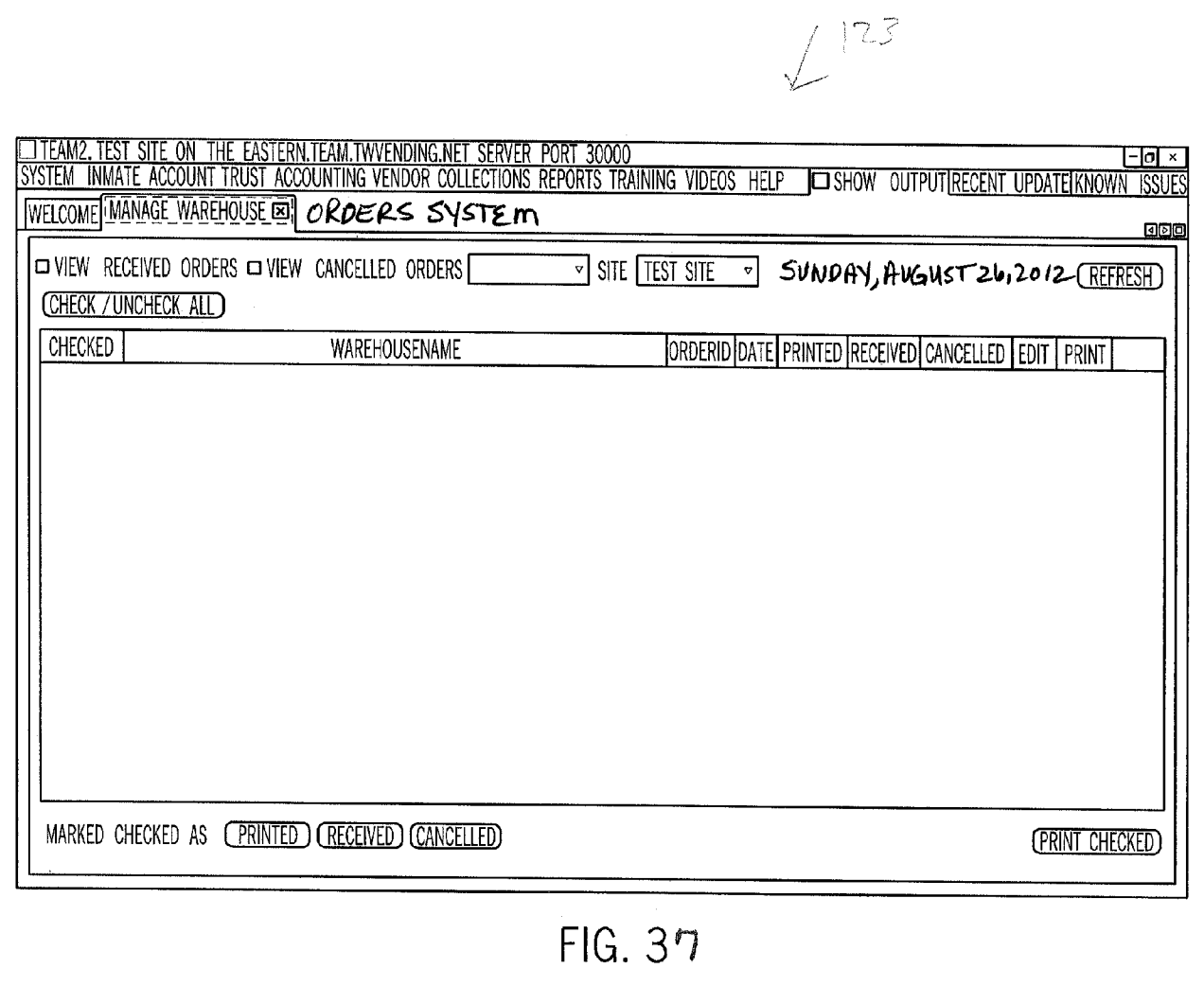

FIG. 37 discloses a Manage Warehouse Order System user interface.

FIGS. 38 to 50 show embodiments of user screens of the inmate management tools of the system outlined in the Chart of FIG. 10, with FIG. 38 illustrating the login screen.

Figure 39:
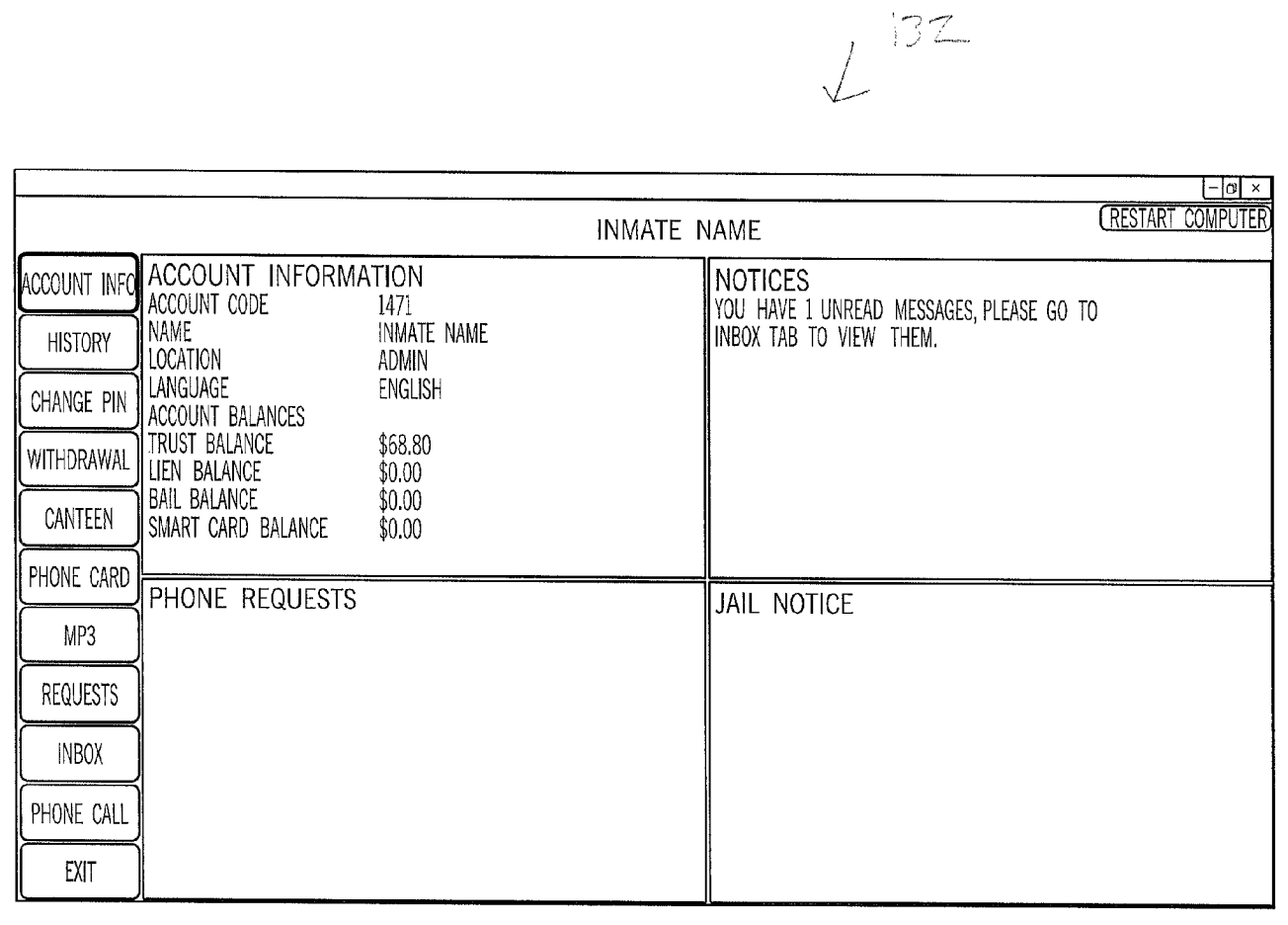

FIG. 39 shows an example of the Account Information screen.

FIG. 40 shows an embodiment of the Account History screen.

FIG. 41 shows a Withdrawal Information screen.

FIG. 42 shows a Canteen Information screen with Current Order and Past Order selections.

Figure 43:
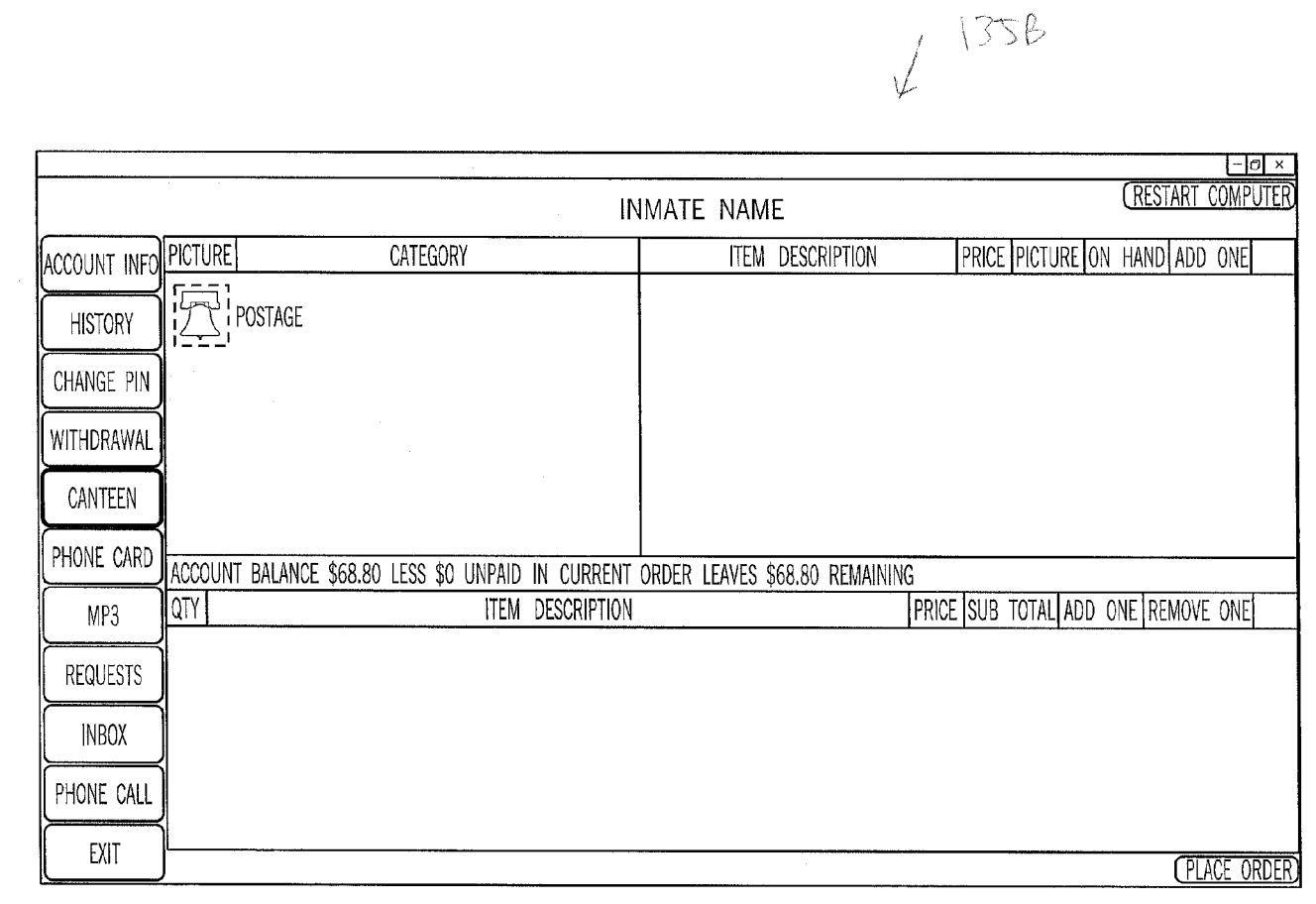

FIG. 43 shows a further Canteen Information Screen Current Order screen.

FIG. 44 shows a Phone Card screen.

FIG. 45 shows an MP3 screen.

FIG. 46 shows a Requests screen.

FIG. 47 shows an Inbox 141 screen

FIG. 48 shows a Phone Call screen.

FIG. 49 shows a Voice Mail screen.

FIG. 50 shows a preferred embodiment of the Phone Account screen.

FIGS. 51 to 59 show embodiments of user screens of the family/friend management tools of the system, as outlined in the Chart of FIG. 11, with FIG. 51 showing a login screen.

FIG. 52 shows an embodiment of the New Account Sign Up Screen.

FIG. 53 shows an admin screen for user name and password.

FIG. 54 shows a facility selection screen.

FIG. 55 shows an example interface for phone administration.

FIG. 56 shows a phone call setting screen.

FIG. 57 illustrates a call detail screen.

FIG. 58 discloses an inmate deposit user interface.

FIG. 59 shows a video visitation admin screen.

FIG. 65B is another screen shot showing an embodiment of the user interface and display of a video visitation from the perspective of an outside user family or friend using a mobile device such as an iPad or Android device.

FIG. 67 is a flow chart of an embodiment of the file migration worker process of the invention.

FIG. 69 is a web shot of an embodiment of a user interface for a secure facility administrator for controlling video visitation settings for the system.

FIG. 71 is a web shot of an embodiment of a user interface for an administrator for listing and controlling blacklist information for the system.

FIG. 72 is a web shot of an embodiment of a user interface for an administrator for listing and controlling inmate video visitations for the system.

FIG. 73 is a web shot of an embodiment of an email notification for an administrator that a particular inmate has used video visitation for the system.

FIG. 75 is a web shot of an embodiment of a user interface for a first step in the method of obtaining approval.

FIG. 79 is a web shot of an embodiment of a user interface for a final step in the method of obtaining approval, wherein a request is denied or approved.

FIG. 81 is a web shot of an embodiment of a user interface for a first step in the method of making a video visitation call by an outside family member or friend.

FIG. 82 is a web shot of an embodiment of a user interface for a second or subsequent step in the method of obtaining approval, wherein the video visitation caller is waiting for the video visitation call to connect with the inmate. Upon connection, a video visitation screen appears as for example is shown in FIG. 65 or 65.

FIG. 83 is a web shot of an embodiment of a user interface for an administrator who is manually approving requests for video visitation rights for a caller.

FIG. 84 is a web shot of an embodiment of a subsequent user interface for an administrator who is manually approving requests for video visitation rights for a caller.

FIG. 86 is a web shot of an embodiment of a user interface for a system administrator for monitoring and controlling video visitation calls in the overall system.

DETAILED DESCRIPTION

The invention provides systems, devices and methods for providing audio-visual telecommunications for inmates of a secure facility (i.e. a jail or prison) with respect to family, friends and others. The system optionally provides a Phone System, email, other messaging, financial services, vending, and commissary or canteen services in the secure facility environment.

Figure 1:
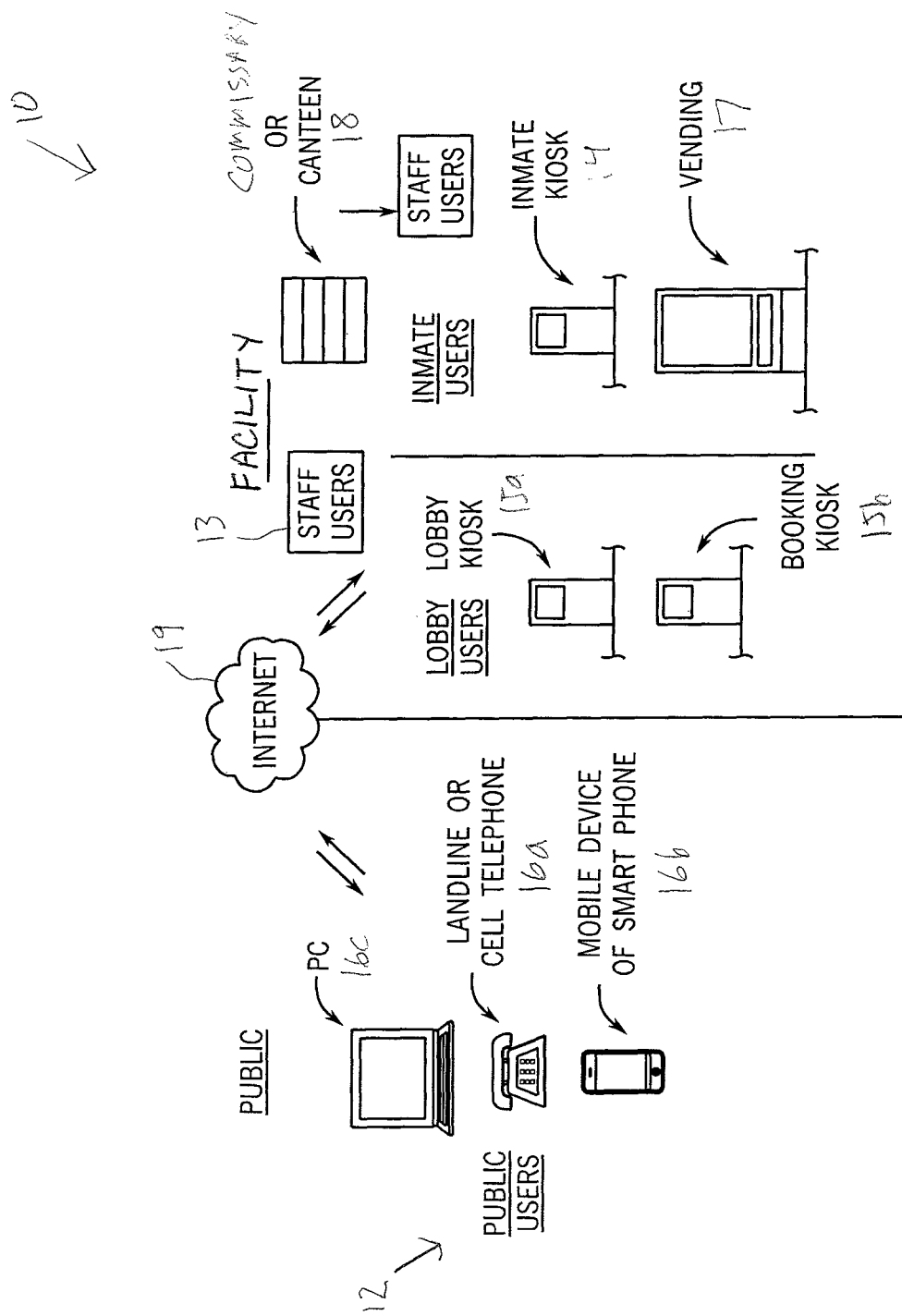
FIG. 1 is a diagram showing an embodiment of the system of the present invention for providing telecommunications, email, other messaging, financial services, vending, and commissary or canteen services for inmates of a secure facility with respect to family, friends and others.
Figure 2:
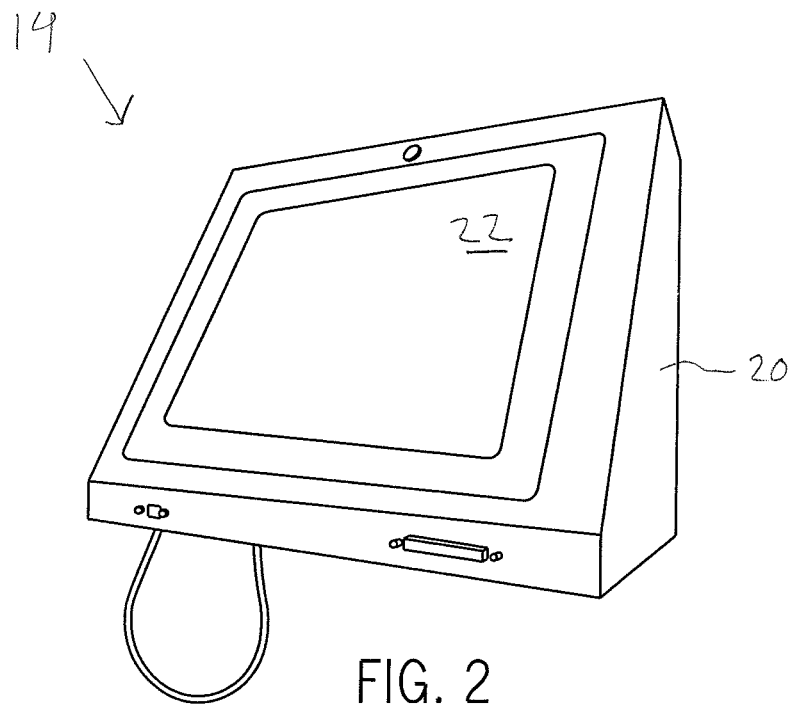
FIG. 2 is a perspective view of an embodiment of an inmate kiosk of the system of the present invention.
Figure 3:
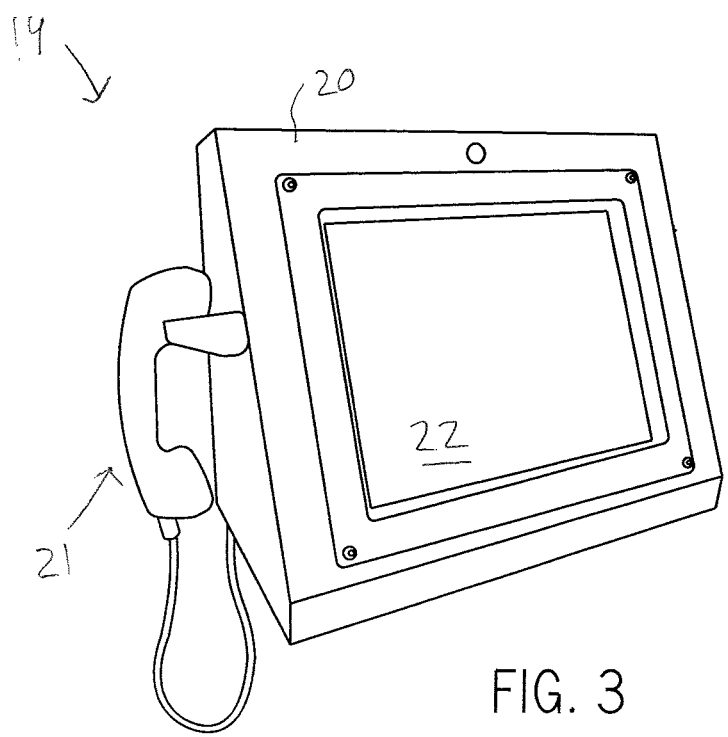
FIG. 3 is another perspective view of the kiosk.

FIG. 1 shows an embodiment of the system 10 of the invention fir providing communications (including phone communications and audio-visual video visitation), financial transactions and delivery of goods and services between an inmate 11 and family member 12 at the inmate facility (such as the booking area or the lobby of the jail) or remote from the facility (such as a home or work location), and which can be monitored and controlled by a facility (jail) administrator(s) 13. The system 10 provides telecommunications (voice, text, email, and in some cases audiovisual) between a person (for example an inmate) inside a closed facility (for example a jail, work house, detention center, prison or the like) with one or more persons (for example family, spouse, children, fiends or the like) outside the facility (for example in the lobby of the facility, booking station of the facility, or completely outside the facility such as home, work or public place either in the community of the facility or even outside the city, state or country of the facility. The inmate uses a kiosk 14, an example embodiment of which is shown in FIGS. 2 and 3 (including a housing 20, a receiver/transmitter handset 21, a touch screen user interface 22, control and communications circuitry, and a power supply), inside the secure section of the secure facility to send and receive telecommunications. The other person receiving or sending communications may use a kiosk 15a or b inside the facility, but outside the secure section thereof (i.e. a lobby or booking kiosk 17a/b), or a land line type or cell type telephone 16a (POTS) for voice or SMS text, a smart mobile phone 16b for voice, text, email or AV, or a PC 16c for email or AV. The system 10 also provides means for family or friends to electronically send or deposit funds or credits to the inmate that may then be used by the inmate to purchase or acquire telecommunication services of the system, vending of drinks, candy, snacks, personal items, or the like by way of one or more vending machines 17 inside the secure section of the facility or commissary 18 (aka "canteen") items such as clothing, blankets and other larger personal items delivered by facility staff or administration, via so called "brown-bag" services. The system further provides a means for the facility staff or administration to monitor, record, and document communications and transactions between the inmate and his or her family, friends or others. The facility staff can safely and securely monitor communications for prohibited, illegal or unsafe activity, limit inmate access based on normal rules, funds or credit availability, or rule violations, and can suspend inmate accounts when warranted or necessary.

A preferred embodiment of the system 10 of the invention uses VoIP to communicatively connect the Kiosks 14 and 15, staff hardware and users of PCs 16c, land line telephones 16a and mobile phones and other mobile devices such as smart phones 16b. VoIP stands for Voice over IP or voice over Internet Protocol. It encompasses the communication protocols, technologies, methodologies, and transmission techniques involved in the delivery of voice communications and multimedia sessions over Internet Protocol (IP) networks, such as the Internet 19. Internet telephony refers to communications services—voice, SMS, and/or voice-messaging applications—that are transported via the Internet, rather than the public switched telephone network (PSTN). The steps involved in originating an outgoing VoIP telephone call are signaling and media channel setup, digitization of the analog voice signal, encoding, packetization, and transmission as Internet Protocol (IP) packets over a packet-switched network. On the receiving or incoming side, similar steps (usually in the reverse order) such as reception of the IP packets, decoding of the packets and digital-to-analog conversion reproduce the original voice stream. Even though IP telephony and VoIP are used interchangeably, IP telephony refers to all use of IP protocols for voice communication by digital telephony systems, while VoIP is one technology used by IP telephony to transport phone calls. VoIP systems employ session control protocols to control the set-up and tear-down of calls as well as audio codecs which encode speech allowing transmission over an IP network as digital audio via an audio stream. The choice of codec varies between different implementations of VoIP depending on application requirements and network bandwidth: some implementations rely on narrowband and compressed speech, while others support high fidelity stereo codecs. Some popular codecs include u-law and a-law versions of G.711, G.722 which is a high-fidelity codec marketed as HD Voice by Polycom, a popular open source voice codec known as iLBC, a codec that only uses 8 Kbit/s each way called G.729, and many others. VoIP is available on many smart phones and Internet devices so that users of portable devices that are not phones, may place calls or send SMS text messages over 3G or Wi-Fi.

Figure 4:
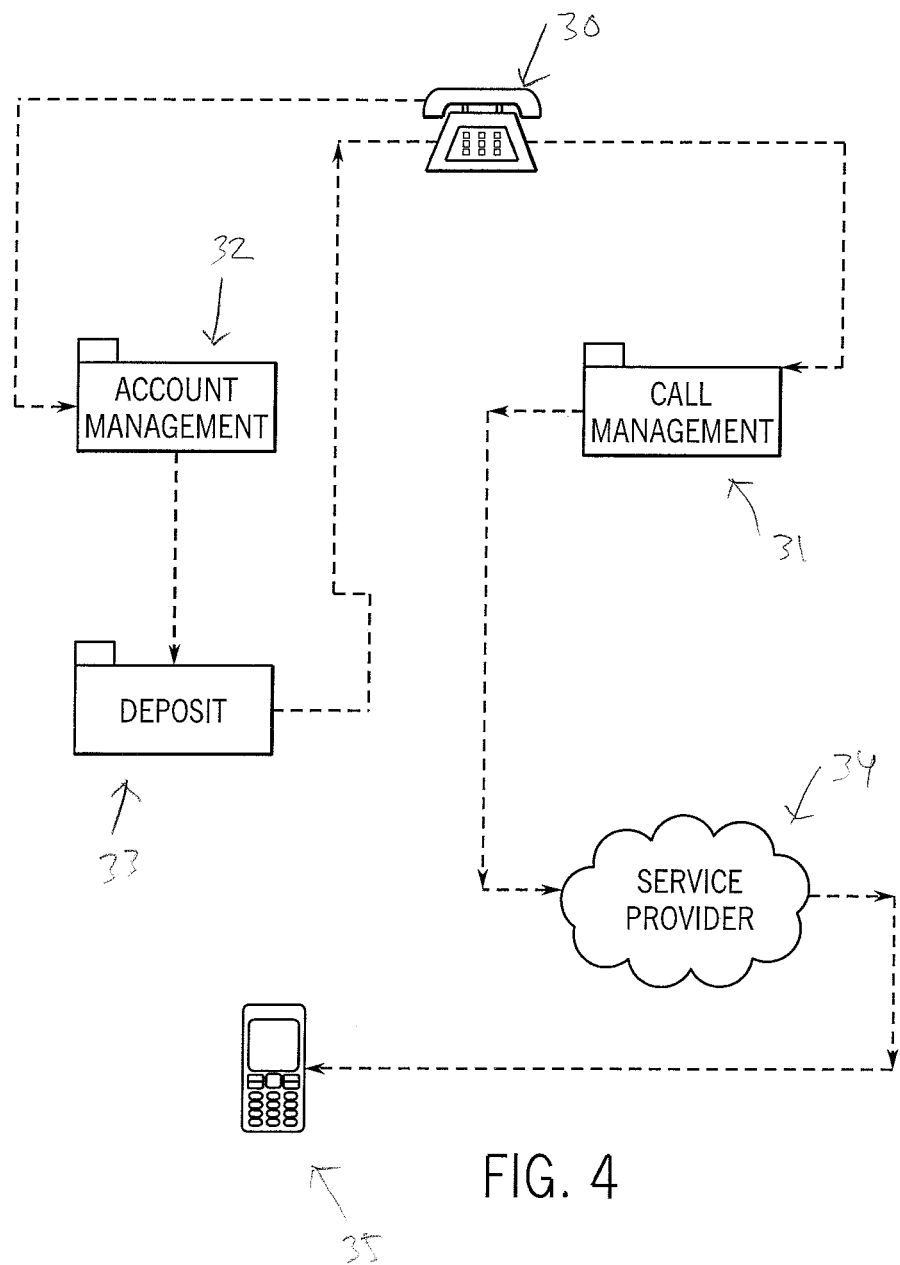
FIG. 4 is diagram of a prior art telecommunications system.

FIG. 4 illustrates a traditional process for using telephones inside a jail or other secure facility to contact persons outside the jail. In the prior art, the inmate picks up a telephone 30 and is automatically connected to a switch, which prompts the inmate with call 31 or account management 32 options. To manage their account, the switch checks into the inmate's balance and prompts the inmate with deposit 33 options. Funds may be deposited into the inmates' account assuming all validation checks pass. To manage a call, the switch check the inmate's balance and then prompts the inmate for the number to be called and checks for various rule settings. The rule settings may include blacklistings, email notifications, section/station settings, attorney call status, and deferred payment call status. The call is placed with a telecommunications service provider 34 via Session Initiation Protocol (SIP). The telephone called is answered by a user 35 (for example the inmate's friend, family member or attorney) outside the jail or other secure facility, or if not answered it routes to voicemail. A non-blocking call identifying prompt is played in the background while the call continues. Either the calling device or the telephony switch will charge the inmate account for the call.

Figure 59:
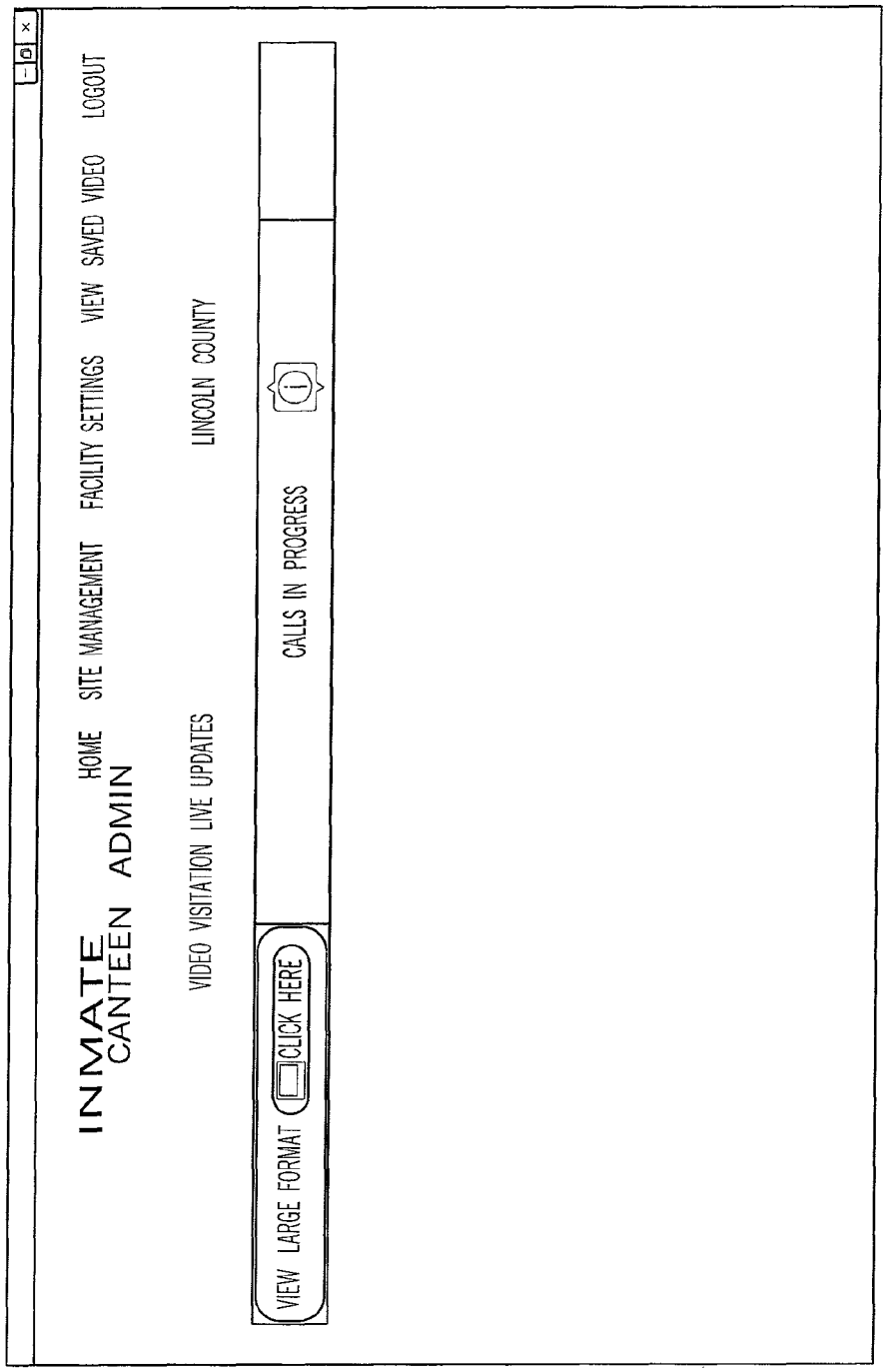

The system 10 of the invention is described below first in terms of its telephone or phone aspects in Section 1 and FIGS. 4-59 and then with respect to its audio-visual or video visitation aspects in Section 2 and FIGS. 60-87.

1. Phone Features

Figure 5:
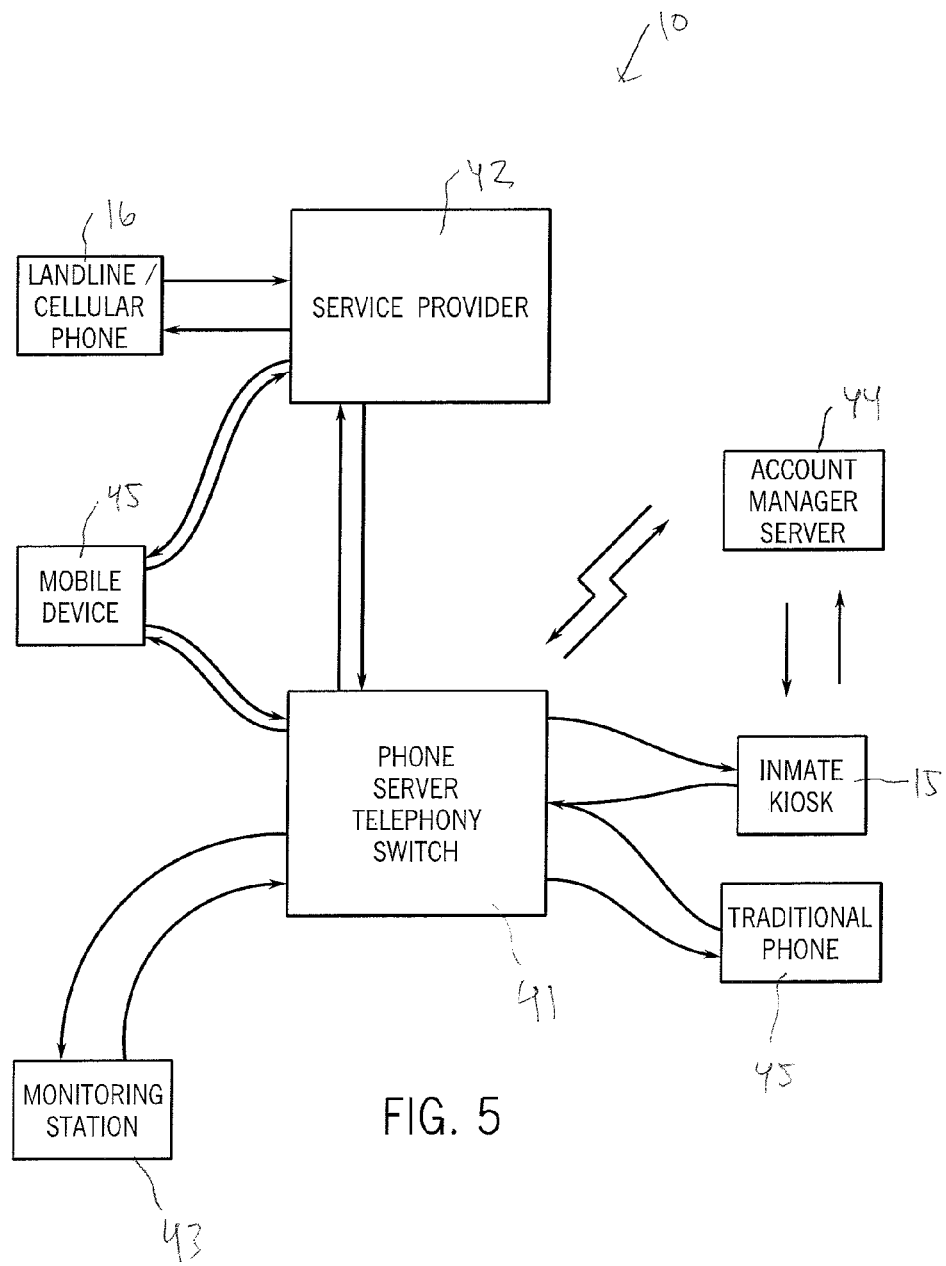
FIG. 5 is a more detailed diagram of the system of the invention, including the interconnection of a phone server and an account manager server, and a monitoring station of the system.

Referring to FIG. 5, an embodiment of the phone system 10 of the invention comprises a Phone Server 41, a telephony switch which is connected to a Service Provider 42. The Service Provider 42 is any provider with Session Initiated Protocol (SIP) capability. The Phone Server 41 negotiates SIP communication between various SIP endpoints. It handles call permissions as well as charging, recording and monitoring. The Phone Server 41 is communicatively connected to a Monitoring Station 43 which requests recorded and live streams from the Phone Server 41. Based on a request, the monitoring station 43 has the ability to pause, fast forward and rewind the recorded stream as well as to stop a live call in progress. It also enables calling rules. The Phone Server 41 is also communicatively connected to an Account Manager Server 44. The account manager 44 provides a means for the telephones to know the details of the caller and the person or entity being called. A most preferred example of the account manager server 44 is a Team Server provided by Team Software of Hudson, Wis. USA. However, the account manager server 44 can be any server that handles TCP/IP protocols over any IP network. The Phone Server 41 and Account Manager Server 44 are communicatively connected to the Inmate Kiosk(s) 15 or other devices inside the jail or other facility. Such other devices include traditional inmate telephones 19a and mobile or hand held devices inside the secure facility or jail. The Phone Server 41 is also communicatively connected to the telephones and devices 16a-c outside the facility.

Figure 6:
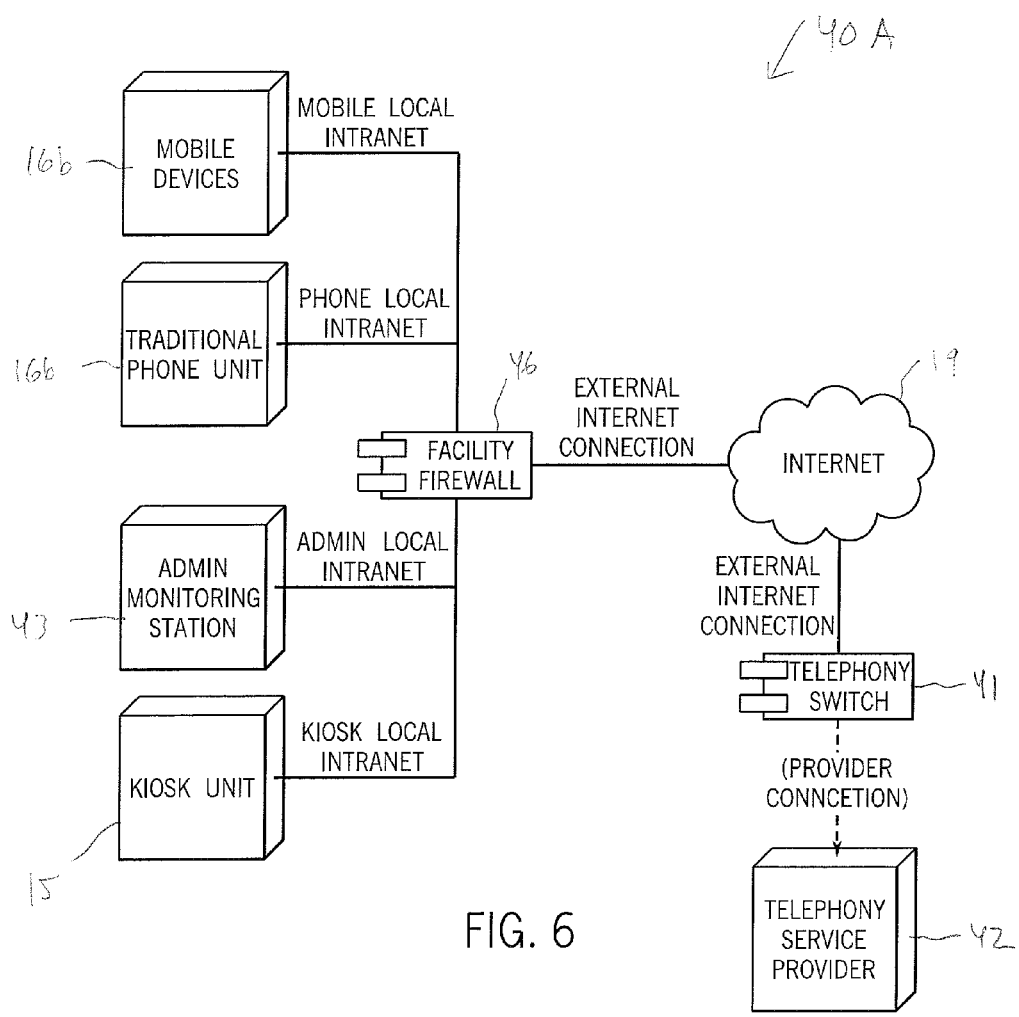
FIG. 6 a diagram showing an embodiment of the communicative interconnection of the phone server with elements of the system which are disposed inside the secure facility.

FIG. 6 shows an embodiment of the communications connections 40a between the phone server 41 and certain elements of the system 10 located inside the secure facility (the kiosk(s) 15, traditional inmate phone(s) 45, other mobile devices 16 in the facility, and the admin monitoring station 44) via the Internet 19 and through the facility firewall 46.

Figure 7:
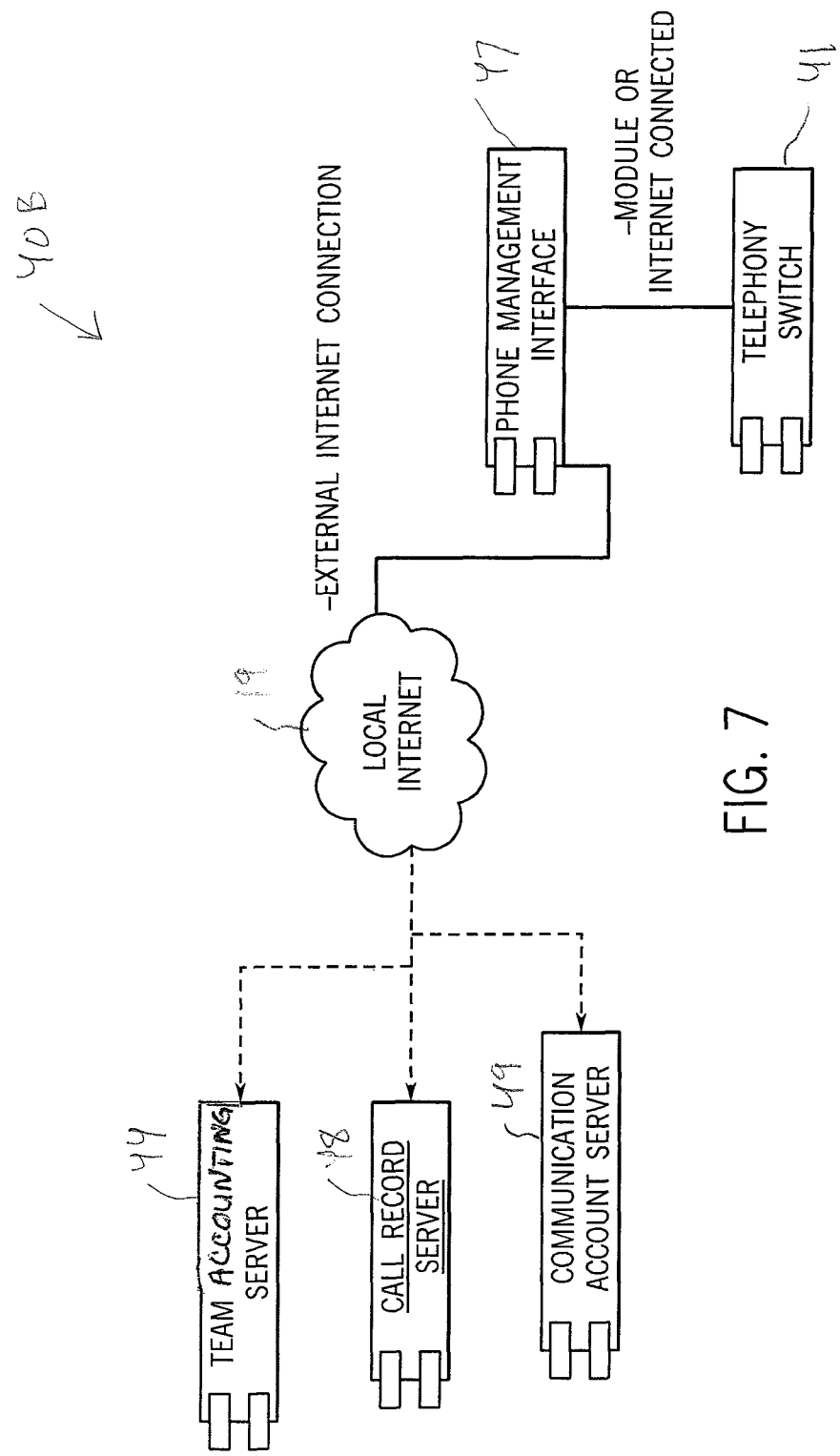
FIG. 7 is a diagram showing an embodiment of the communicative interconnections of the phone server with elements of the system which are preferably disposed outside the secure facility.

FIG. 7 shows an embodiment of the communication connections 40b between the phone server 41 and other servers and elements of the system 10 which are disposed outside the secure facility. The phone server 41 is preferably a software element which makes the calls. A phone management interface 47 is an additional layer of software that controls the phone server 41. The phone management interface 47 processes information such as outgoing and incoming rules, the inmate rate, and the like. Connected through the Internet 19 are the account manager server 44, the call record server 48 (a hardware element which actually stores recorded calls), and a communication account server 49. The communication account server 49 is preferably software which debits and credits accounts at the manager of the system 10, and other similar business functions. The manager of the system 10 is preferably an independent third party business, such as Applicant's assignee. However, it is within the purview of the invention that the system 10 manager may be the jail or secure facility itself, or some other governmental, quasi-governmental or non-profit entity.

Figure 8A:
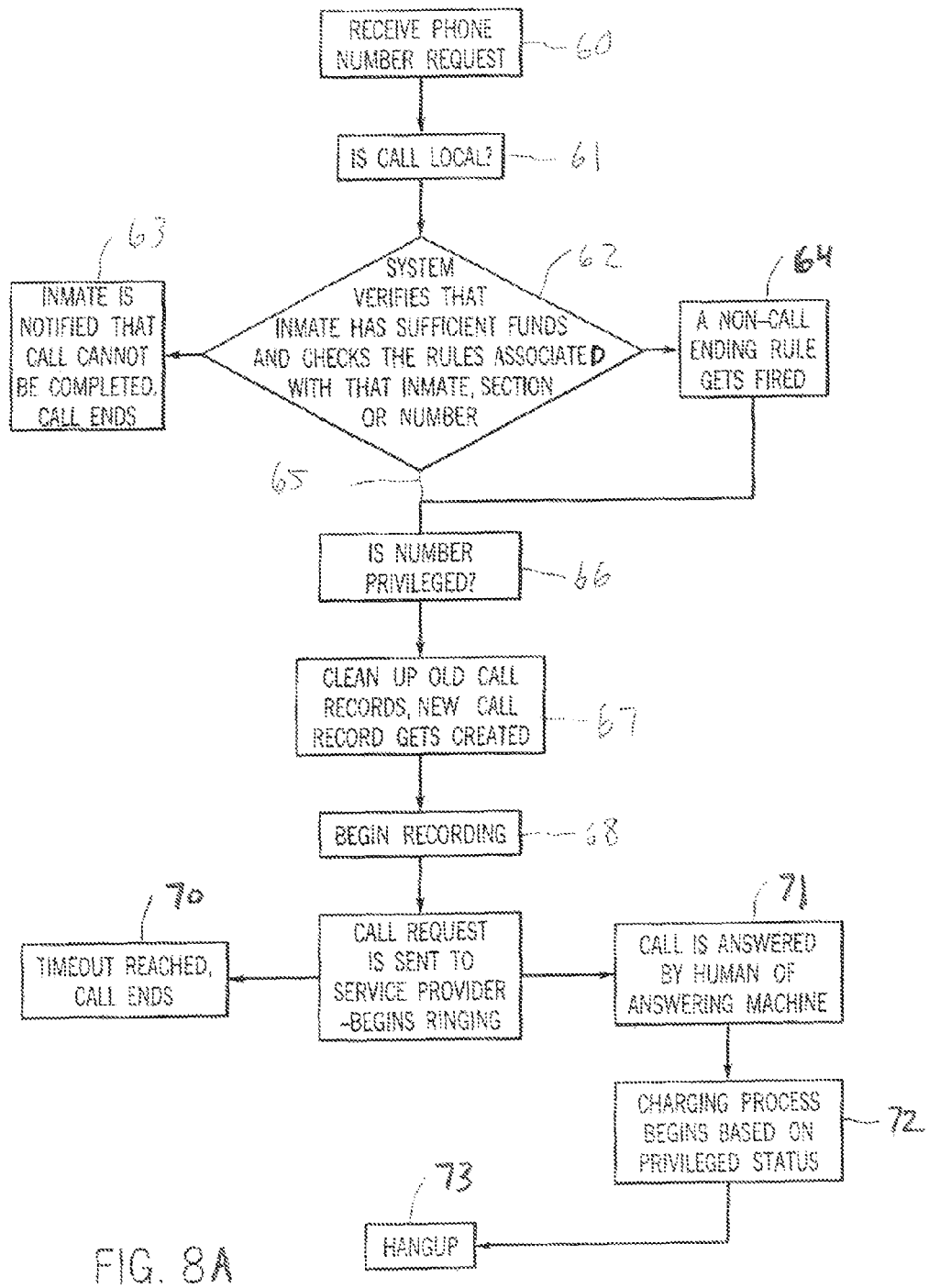
FIG. 8A is a flowchart of an embodiment of an outgoing call process of the invention.

FIG. 8A is a flow chart showing an embodiment of the process of making an outgoing call from a jail according to the invention. The outgoing call process of the invention is preferably implemented by the system 10 of the invention. The first step of the process involves receiving 60 a request for an outside phone number of a family member, friend or other call recipient, and then determine 61 whether the call is local or long distance. Next, the system verifies 62 that the inmate has sufficient funds or credit, and checks associated rules for that inmate account. The call is either prohibited 63 (with notice to the inmate), a non-call ending rule is noted 64, or the system proceeds 65 to determination 66 whether the call number is privileged as for example in the case of an attorney telephone number. Proceeding with the call, next records are logged and created 67, recording is initiated 68 and the call is sent 69 to the service provider to ring the call recipient. If a timeout timer period is reached 70 the call ends. If the call is answered 71 within the allotted time, the call proceeds. A charging process 72 begins in some cases. The call proceeds until termination or hang up 73.

Figure 8B:
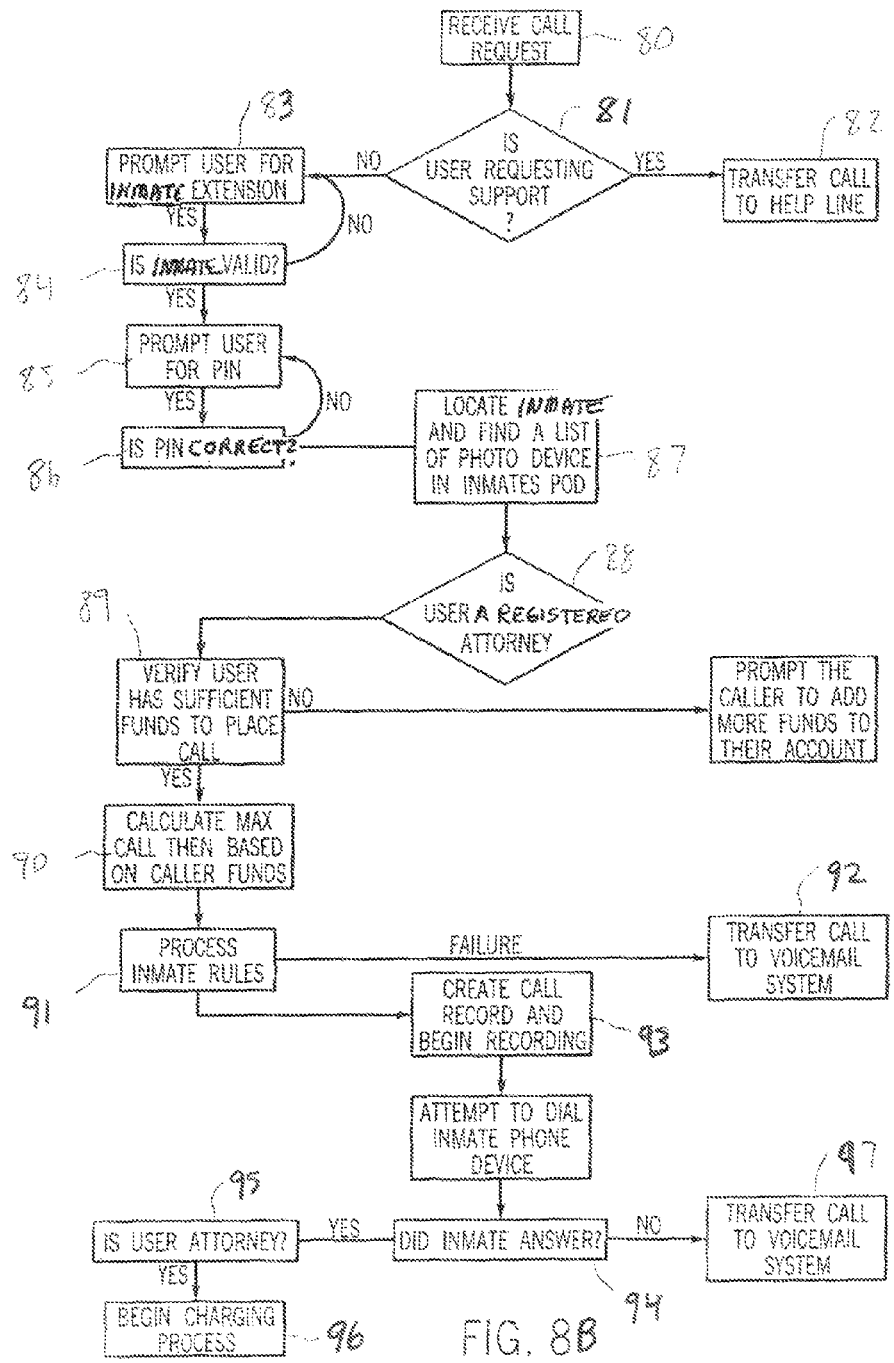
FIG. 8B is a flowchart of an embodiment of an incoming call process of the invention.

Significantly, the system of the invention provides a means of receiving 80 an incoming call to the inmate in the facility from a person outside. Referring to FIG. 8B, a preferred embodiment of an incoming call process of the invention involves first receiving a call request and then determining 81 whether the outside caller is requesting support. If so, then the call is transferred 82 to a help line. If not, the user is prompted 83 to dial or otherwise input an extension for the inmate. Users may first obtain an inmate extension as well as a PIN number by utilizing the inmatecantee.com process shown in FIGS. 51-59. Next, the system determines 84 if the extension is valid. If not, then the caller has an opportunity to enter another extension by another prompt 85. If valid, the system inquires of the PIN and checks 86 whether it is valid. If the PIN is not entered correctly, the user again has an opportunity to correct. If the PIN is correct, the next step 87 is to find the Inmate's location and a list of phone devices in the inmate's POD (jail location). Phone devices may include, but are not limited to stand alone Kiosks, traditional hand held telephone devices and the like. The system then determines 88 whether the caller is a registered attorney. If the user is a registered attorney (again signed up at the inmatecanteen.com system of FIGS. 51-59), the conversation is private and a reduced rate may apply. If not, the system verifies 89 that the user has sufficient funds to place the call (funds are deposited via inmatecanteen.com). Maximum call time is calculated 90 based on caller funds, and at a predetermined time, for example the 1 minute 30 second remaining mark of the call, a blocking prompt is played warning the user that they are about to run out of call minutes. Initially or at any time later, inmate rules 91 may be processed. Such rules may include, but are not limited to inmate blacklisting, section/pod blacklisting, email call notifications, and approved calling hours. If a call or call event or time fails a rule, the call is transferred 92 to a voicemail system. If all rules or some rules are met, a call record is created 93, recording begins (unless attorney or other call), and the registered device is dialed. Recordings are processed in GSM format. Both sides of the stream are included in the recording. The next step is to wait 94 for an answer. If the inmate answers, the attorney rule is checked 95 and if positive, the charging 96 process begins. If the inmate does not answer, the call may be transferred 97 to a voicemail system.

Figure 9:
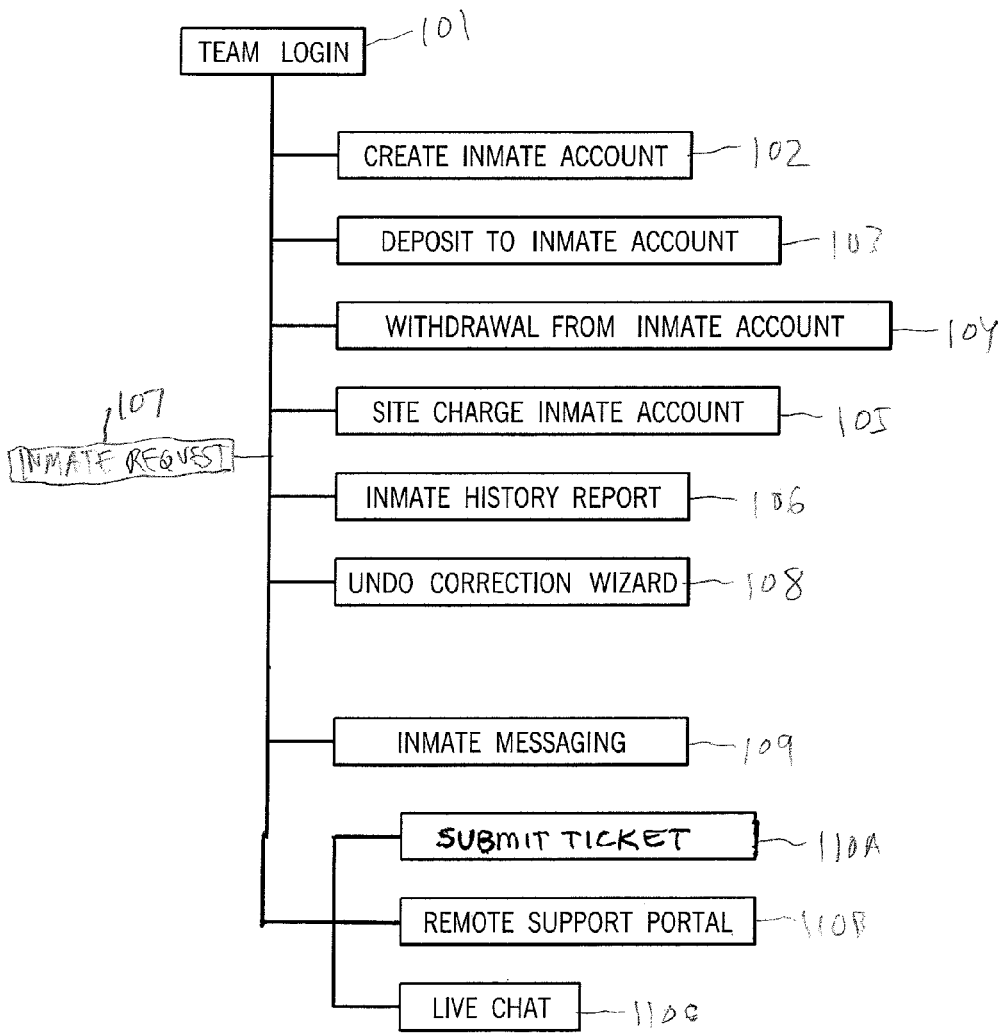
FIG. 9 is a chart of an embodiment of the user screens of the administrator controls and tools of the system.
Figure 12:
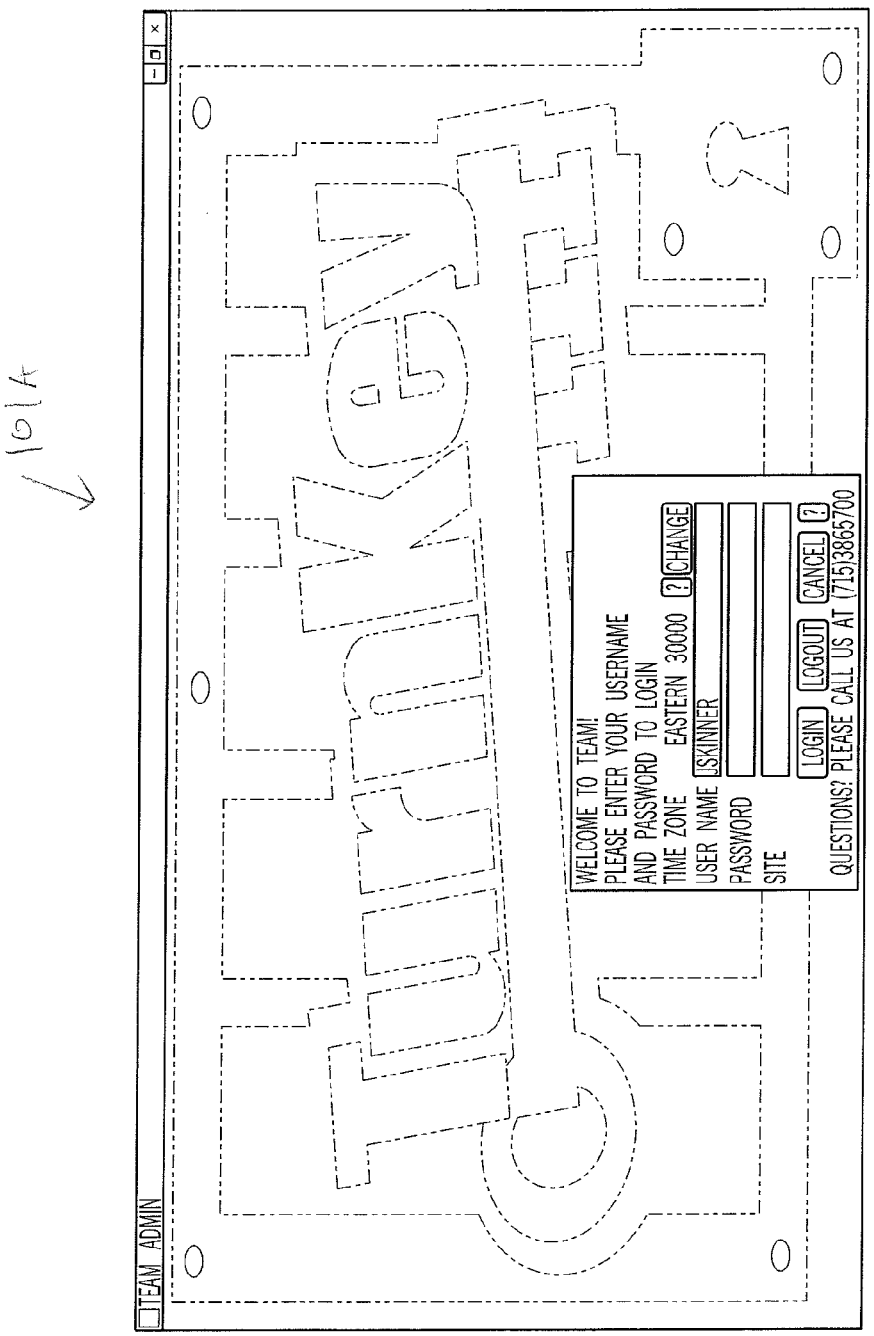
Figure 13:
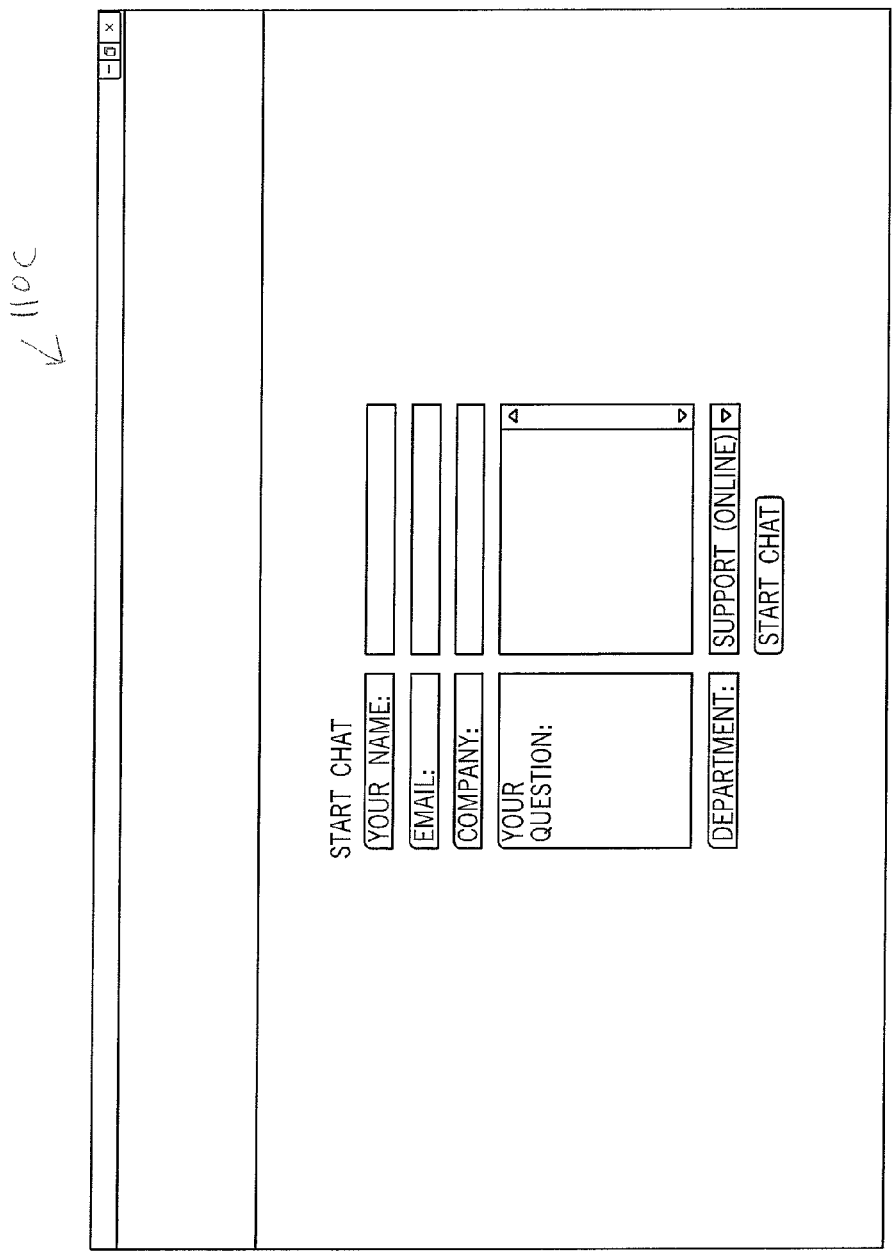
Figure 14:
Figure 16:
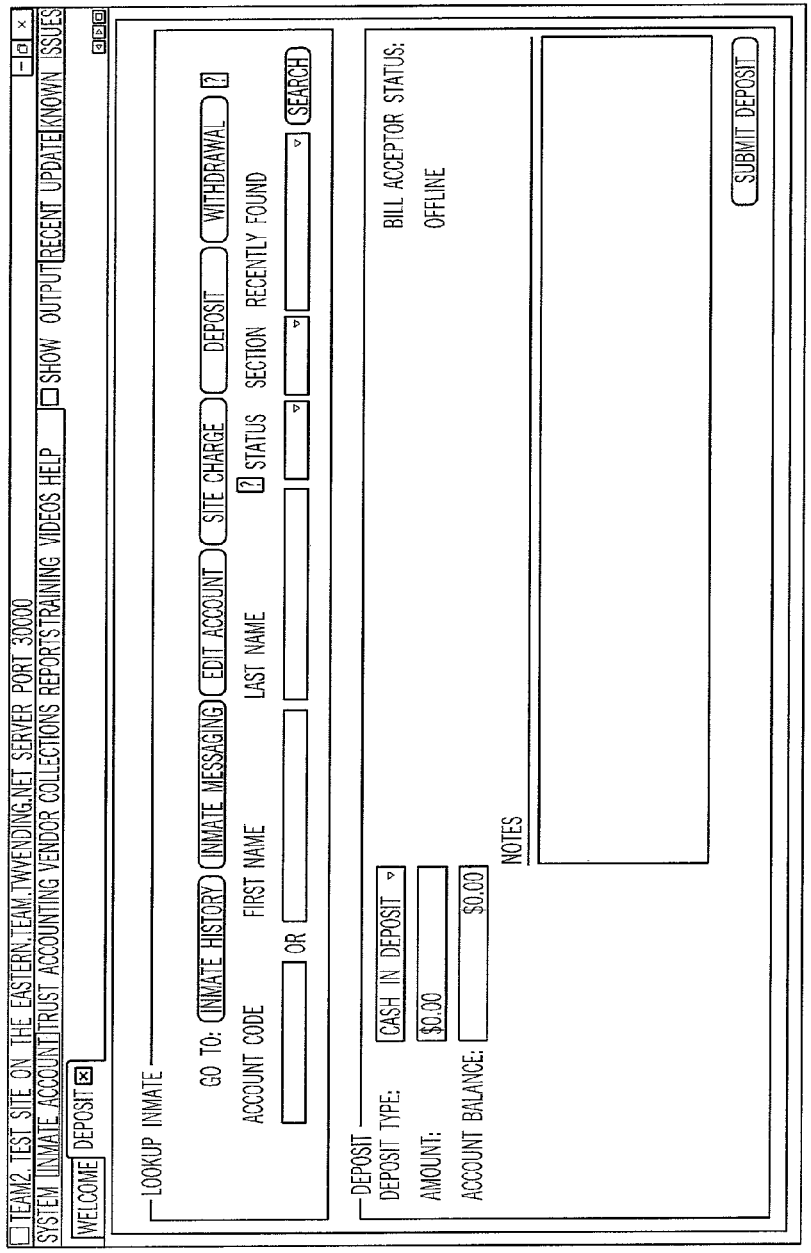
Figure 17:
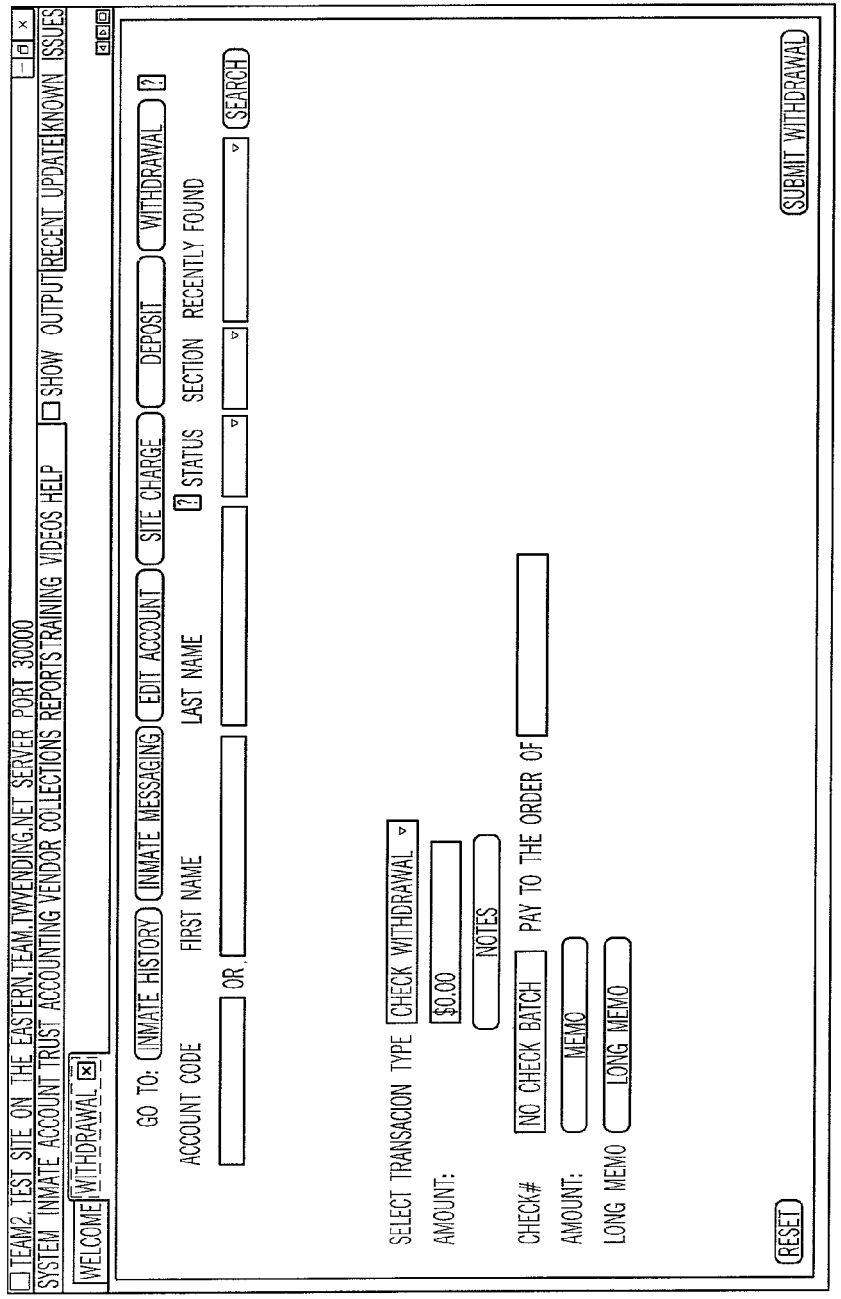
Figure 20:
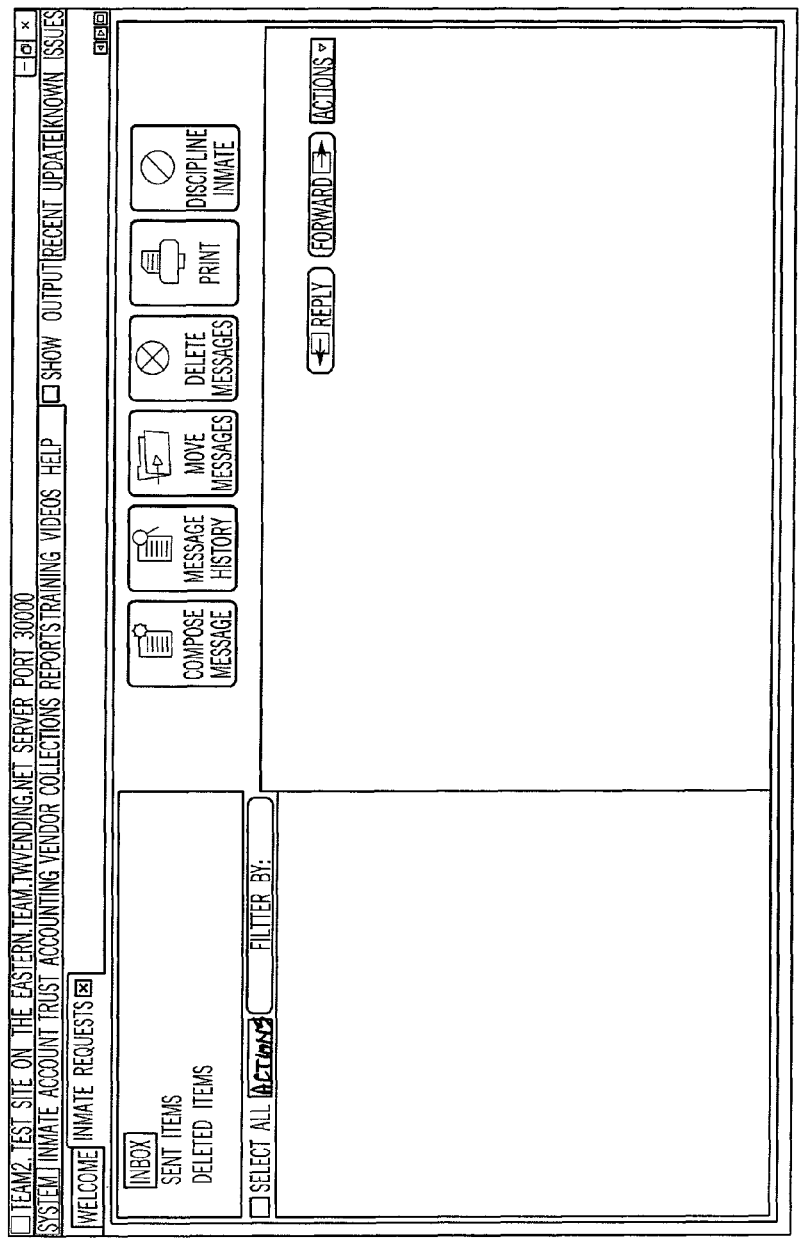
Figure 21:
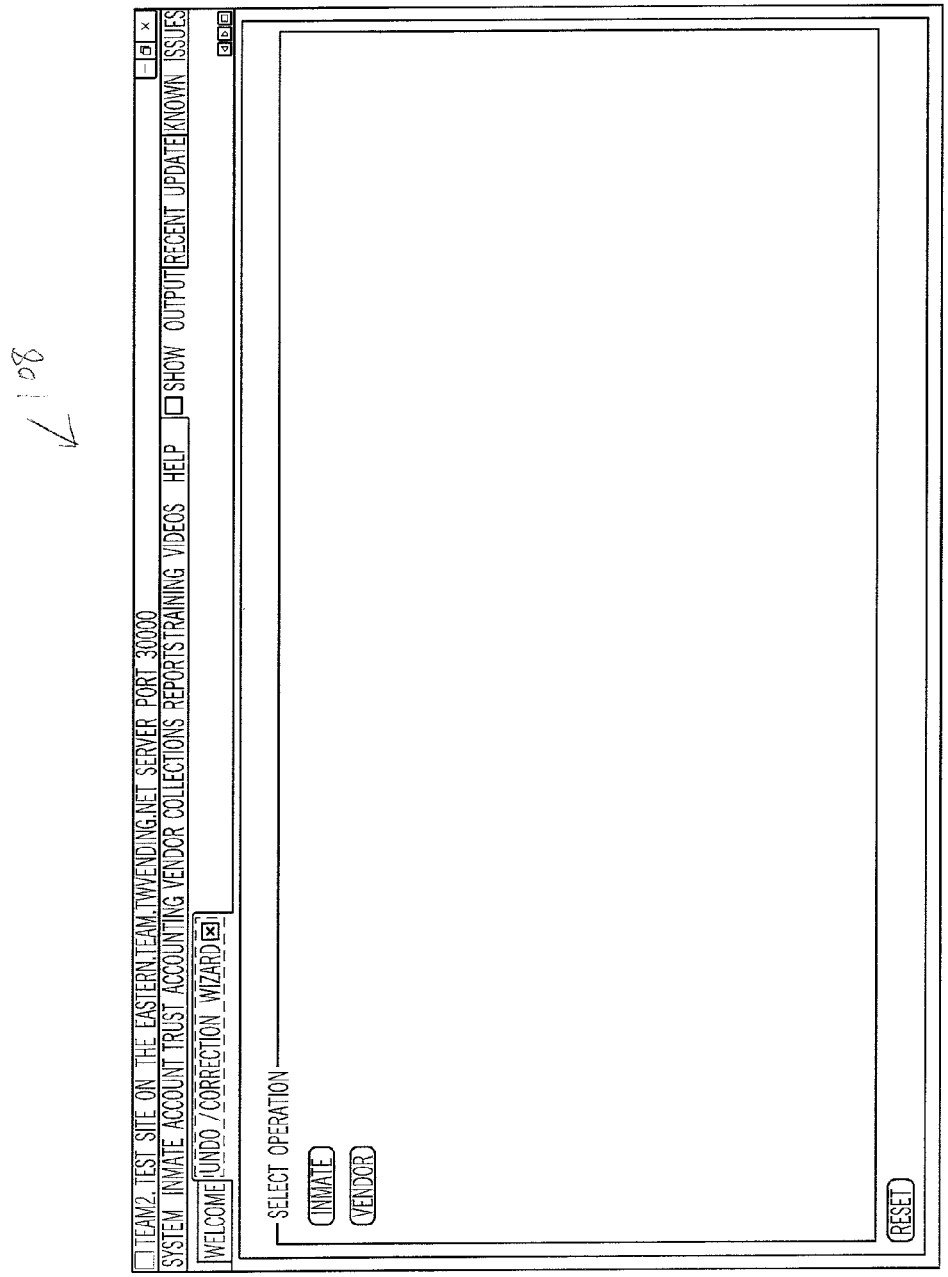
Figure 22:
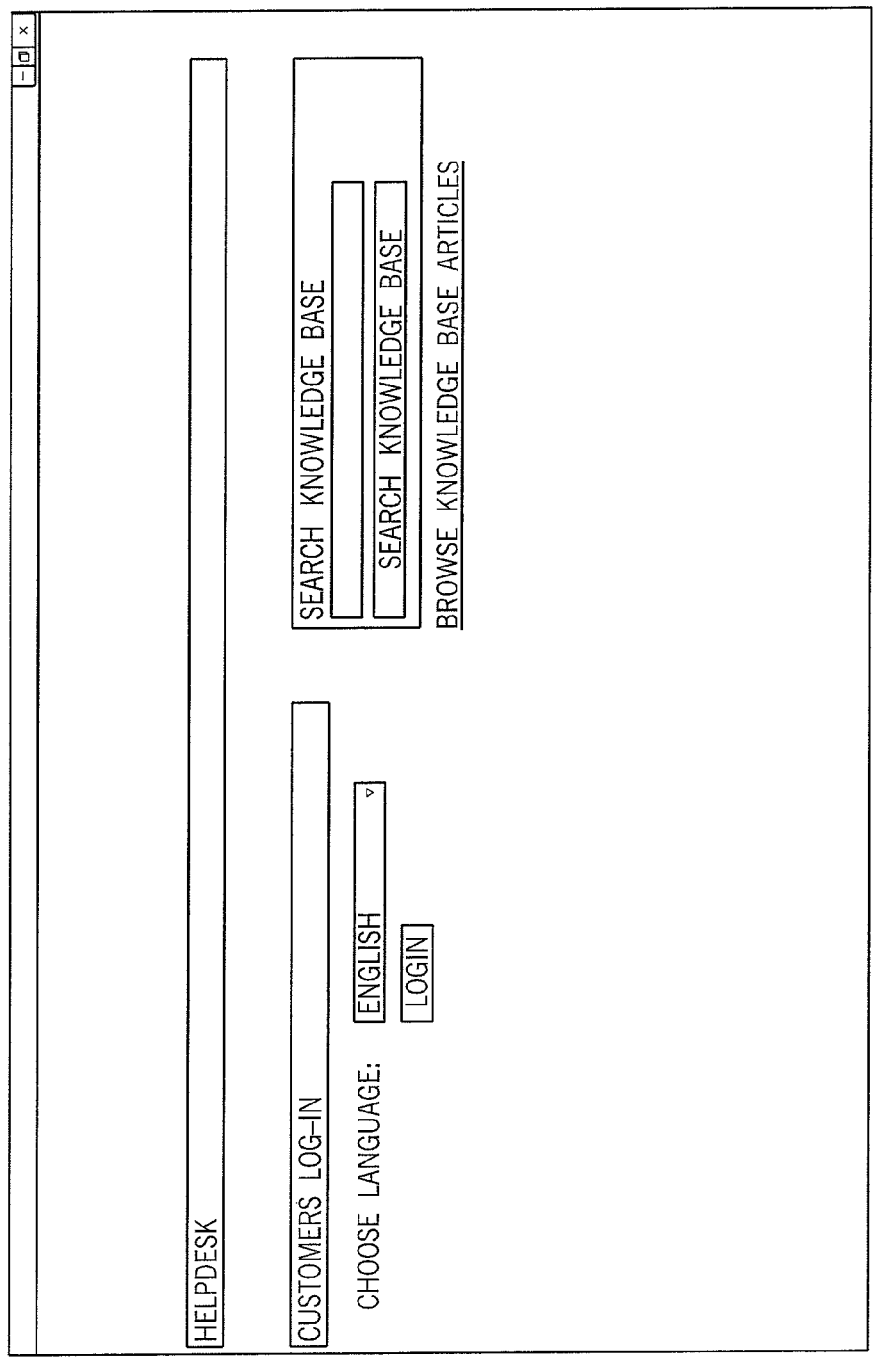

FIG. 9 is a chart of an embodiment of the hierarchy or relationship of the user screens of the administrator controls and tools 100 of the system. At the Administration Login screen 101 a username and password are provided by the user. The following admin screens are available: Create Inmate Account 102, Deposit Funds to Inmate Account 103, Withdraw Funds from Inmate Account 104, Charge (Site Charge) An Inmate's Account for money owed to a Vendor 105, Inmate History Report 106, Inmate Request Page 107, an Undo Connection Wizard 108 and an Inmate Messaging page 109. Additionally, the system provides means to submit a ticket 110A, for remote support 110B, and for live chat 110C. FIGS. 12-24 show exemplary embodiments of user interfaces for these functions. FIG. 12 illustrates a LogIn interface 101. FIG. 14 shows a Create Inmate Account 102. FIG. 16 discloses a Deposit Funds to Inmate Account screen 103. FIG. 17 illustrates a Withdraw Funds from Inmate Account screen 104. FIG. 18 shows a Charge (Site Charge) An Inmate's Account for Money Owed to a Vendor 105 screen. FIG. 19 discloses a Inmate History Report user interface 106. FIG. 20 shows a Inmate Request screen 107. Additionally, the system provides means to submit a ticket 110A, for remote support 110B, and for live chat 110C shown in FIGS. 22, 23 and 24 respectively.

Figure 25:
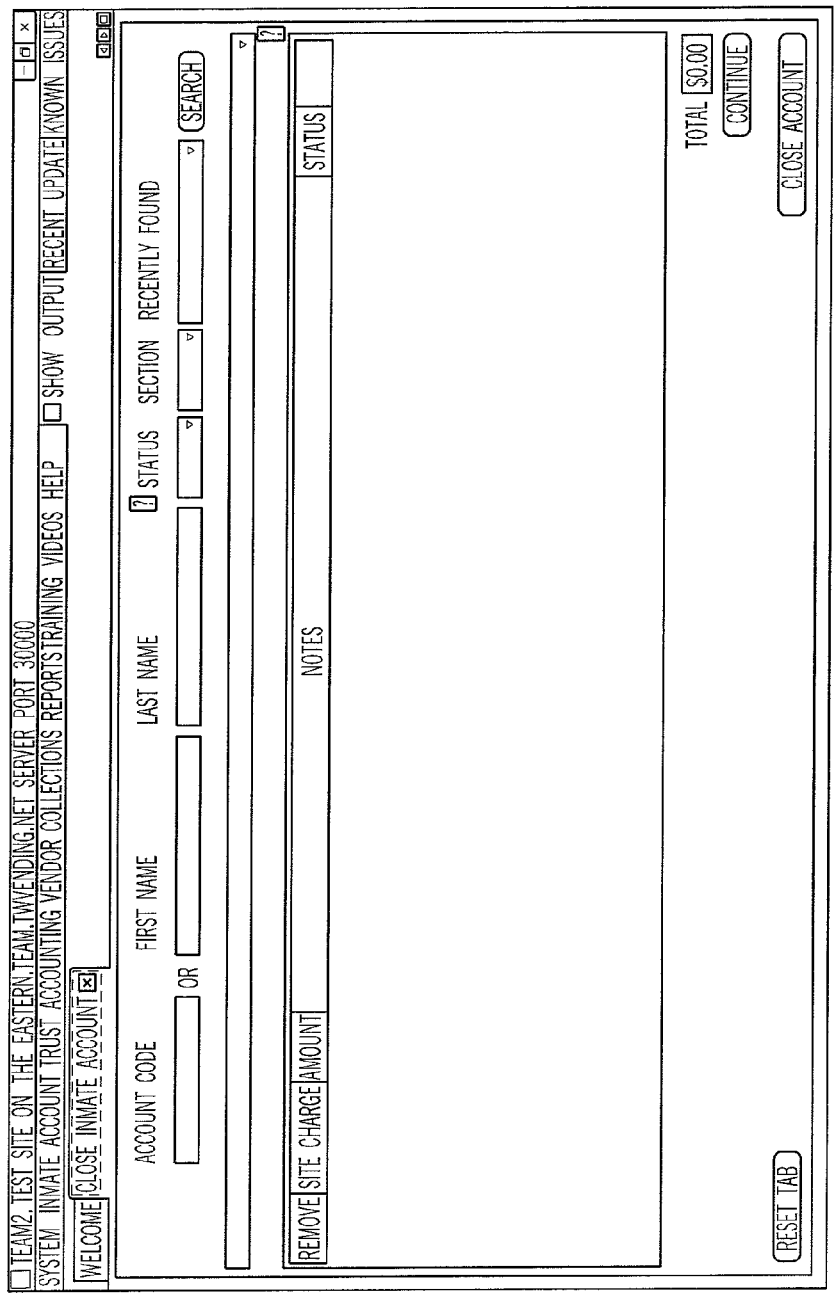
Figure 29:
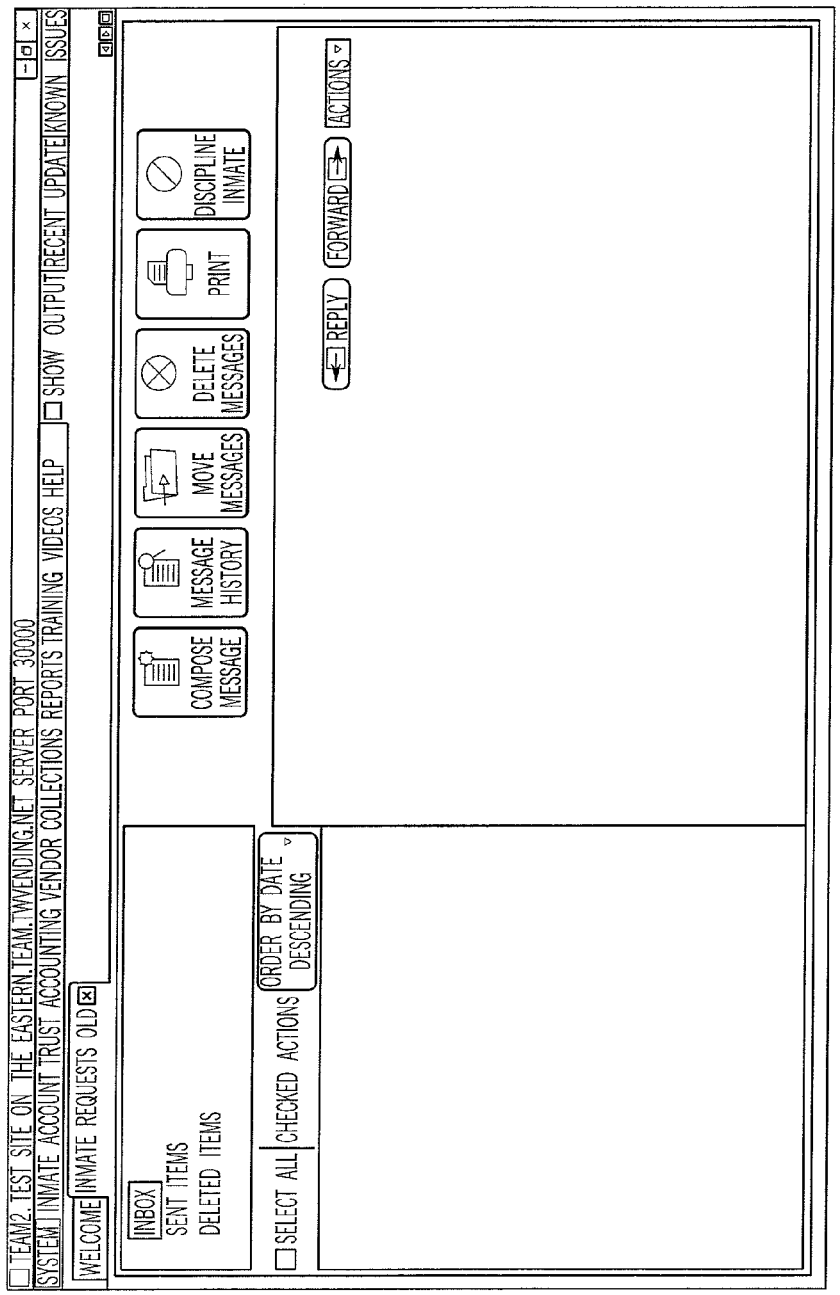
Figure 31:
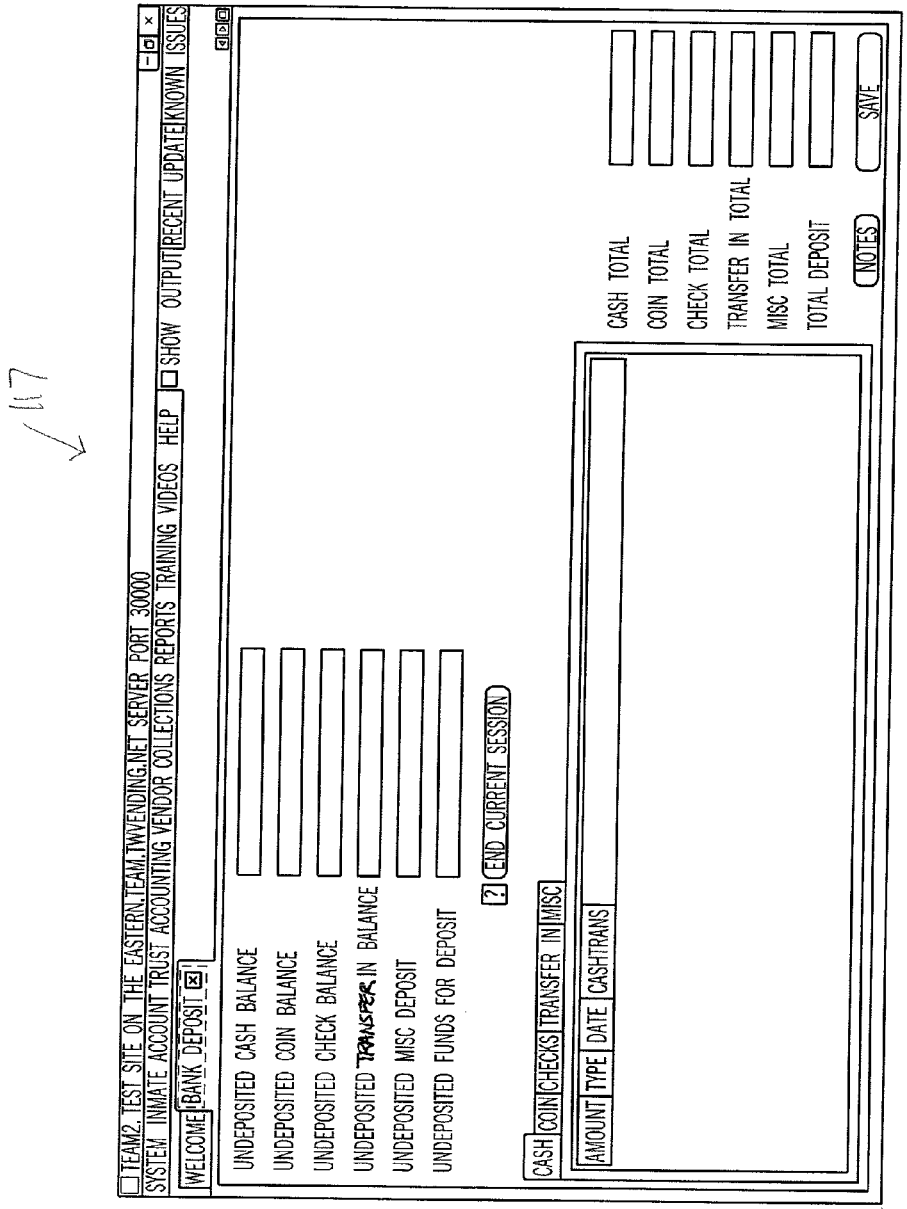
Figure 34:
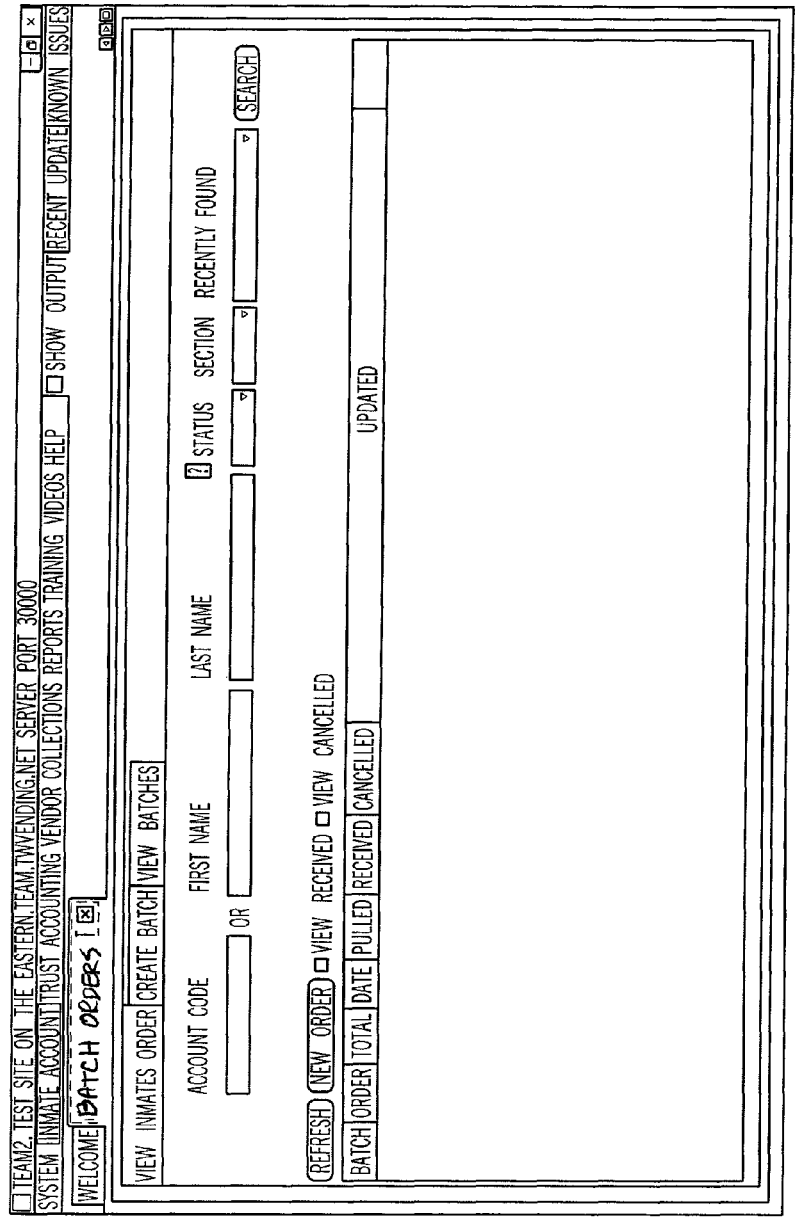
Figure 36:
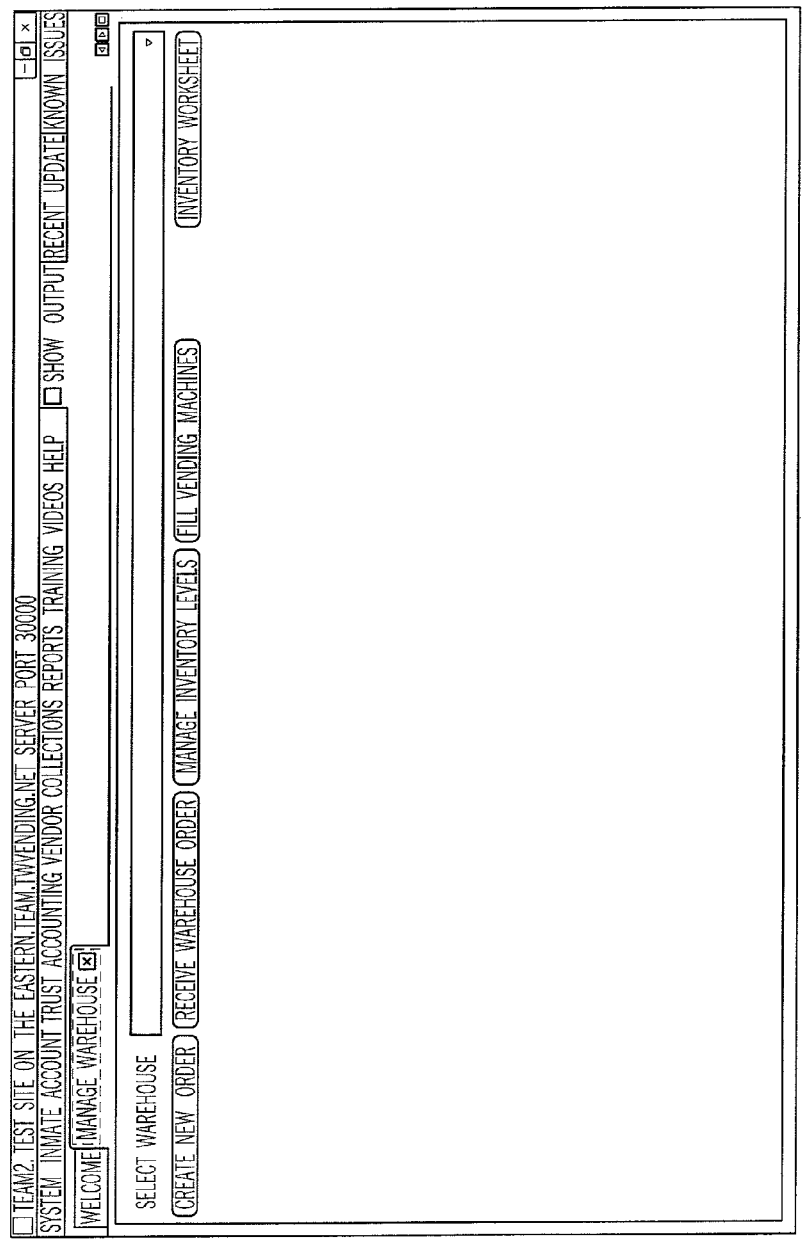
Figure 36:
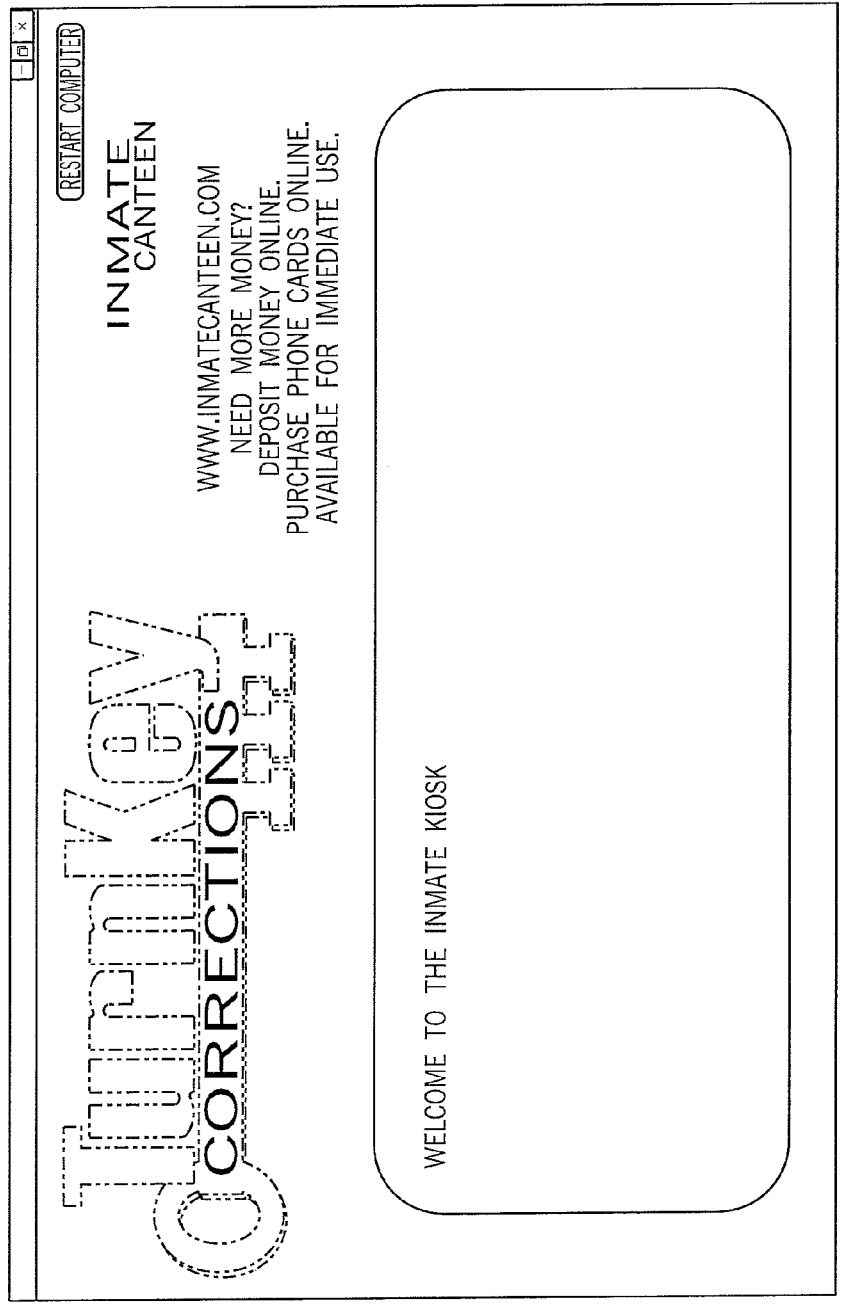

Additional administrator control functions and user interfaces therefor are shown in FIGS. 25-37. FIG. 25 illustrates a Close Inmate Account screen 111. FIG. 26 shows an Assign Inmate Smart Card screen 112. FIG. 27 discloses a Discipline Inmate Account interface 113. FIG. 28 illustrates an Edit Inmate Account screen 114. FIG. 29 shows an Inmate Requests—Old screen 115. FIG. 30 shows a View Inmate Canteen Order screen 116. FIG. 31 shows a Bank Deposit interface 117. FIG. 32 shows a Deposit To Vendor screen 118. FIG. 33 shows a Pay Vendor user interface 119. FIG. 34 shows a Batch Order screen 120. FIG. 35 shows a Manage Site Canteen System interface 121. FIG. 36 shows a Manage Warehouse screen 122. FIG. 37 discloses a Manage Warehouse Order System user interface 123.

Figure 10:
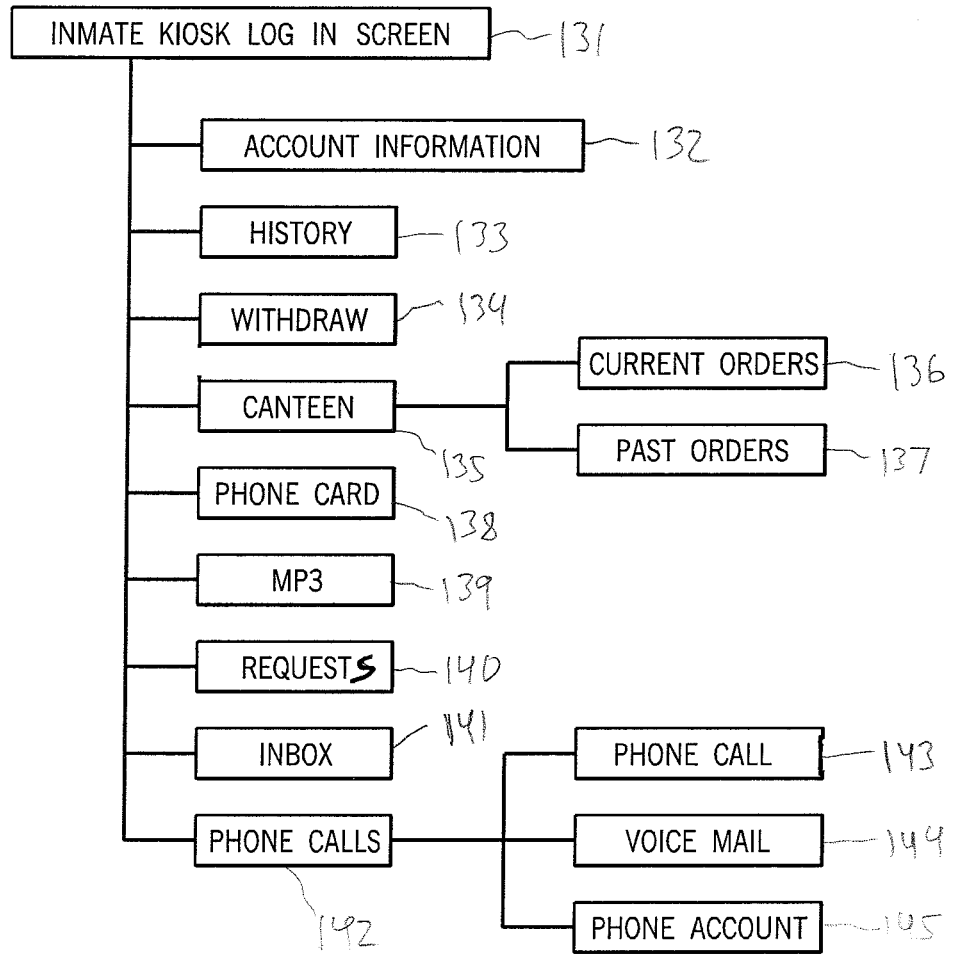
FIG. 10 is a chart of an embodiment of the user screens of the inmate management tools of the system.
Figure 40:
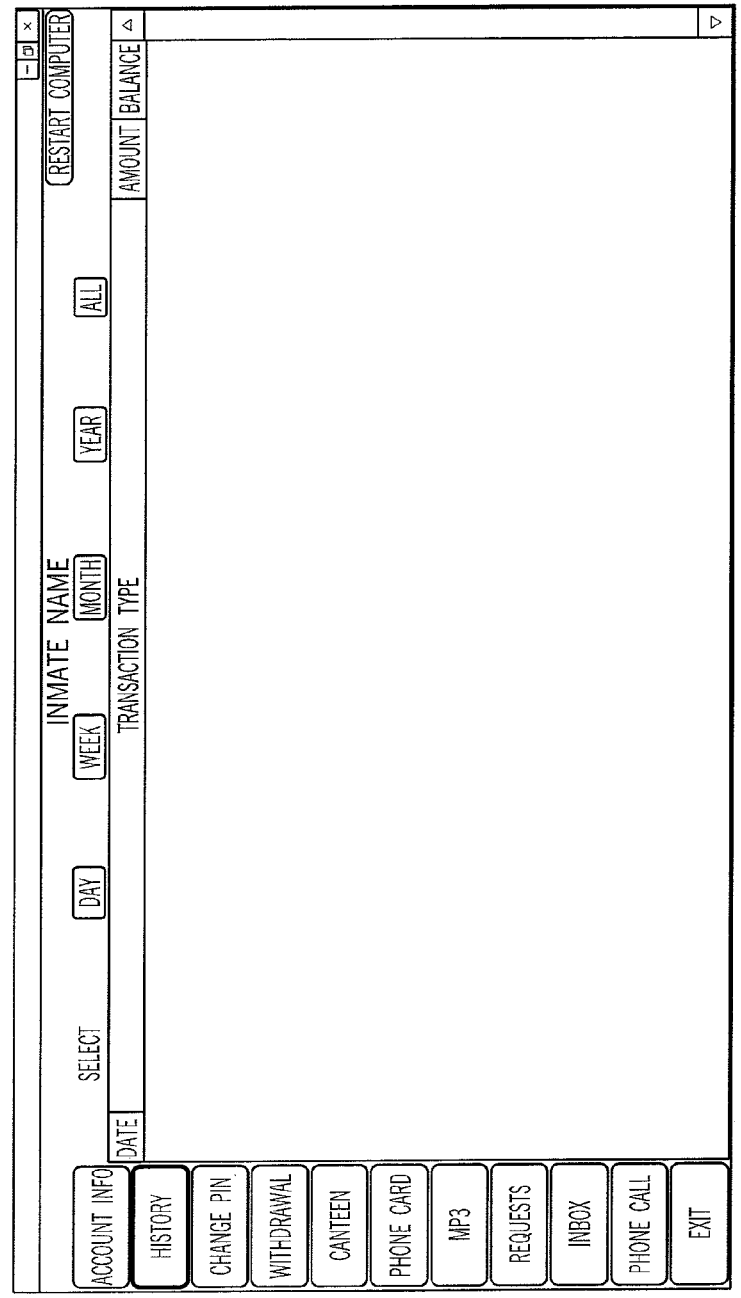
Figure 41:
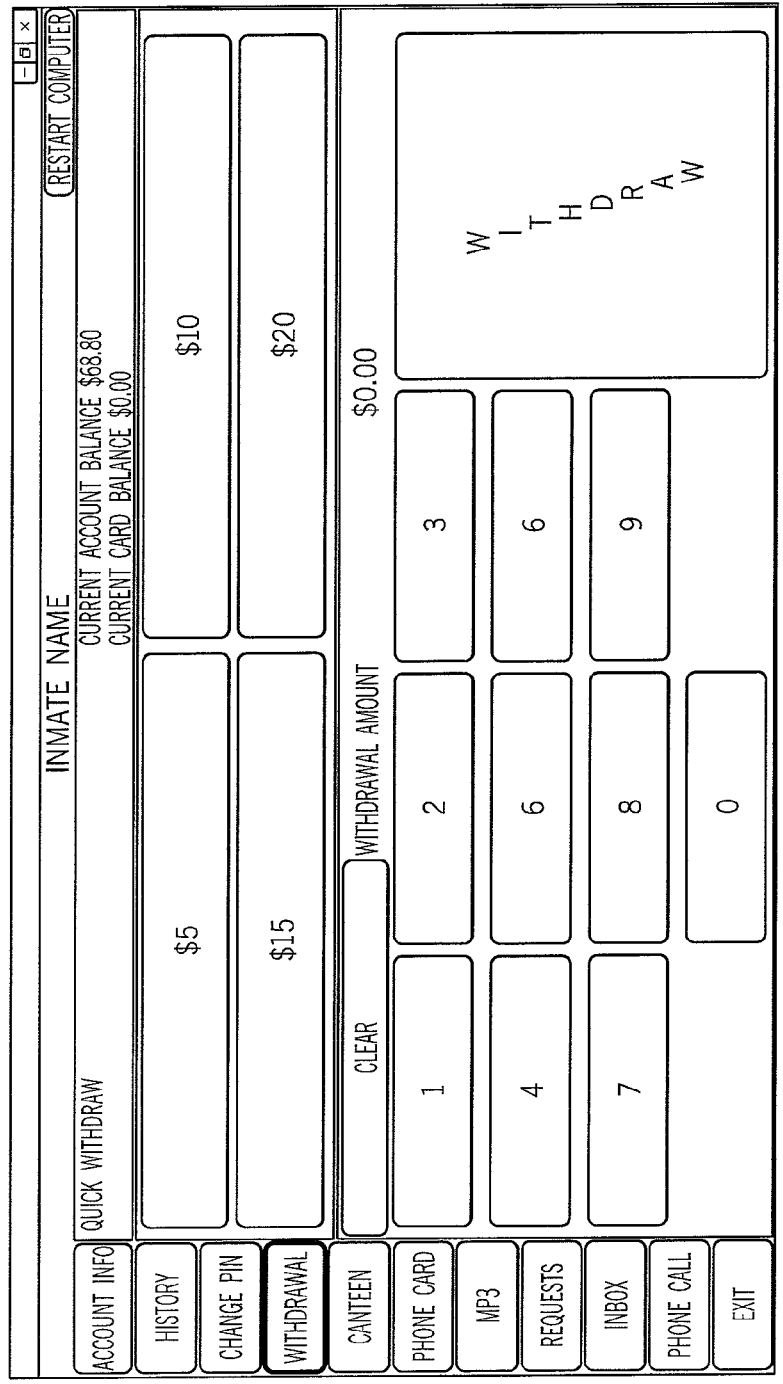
Figure 42:
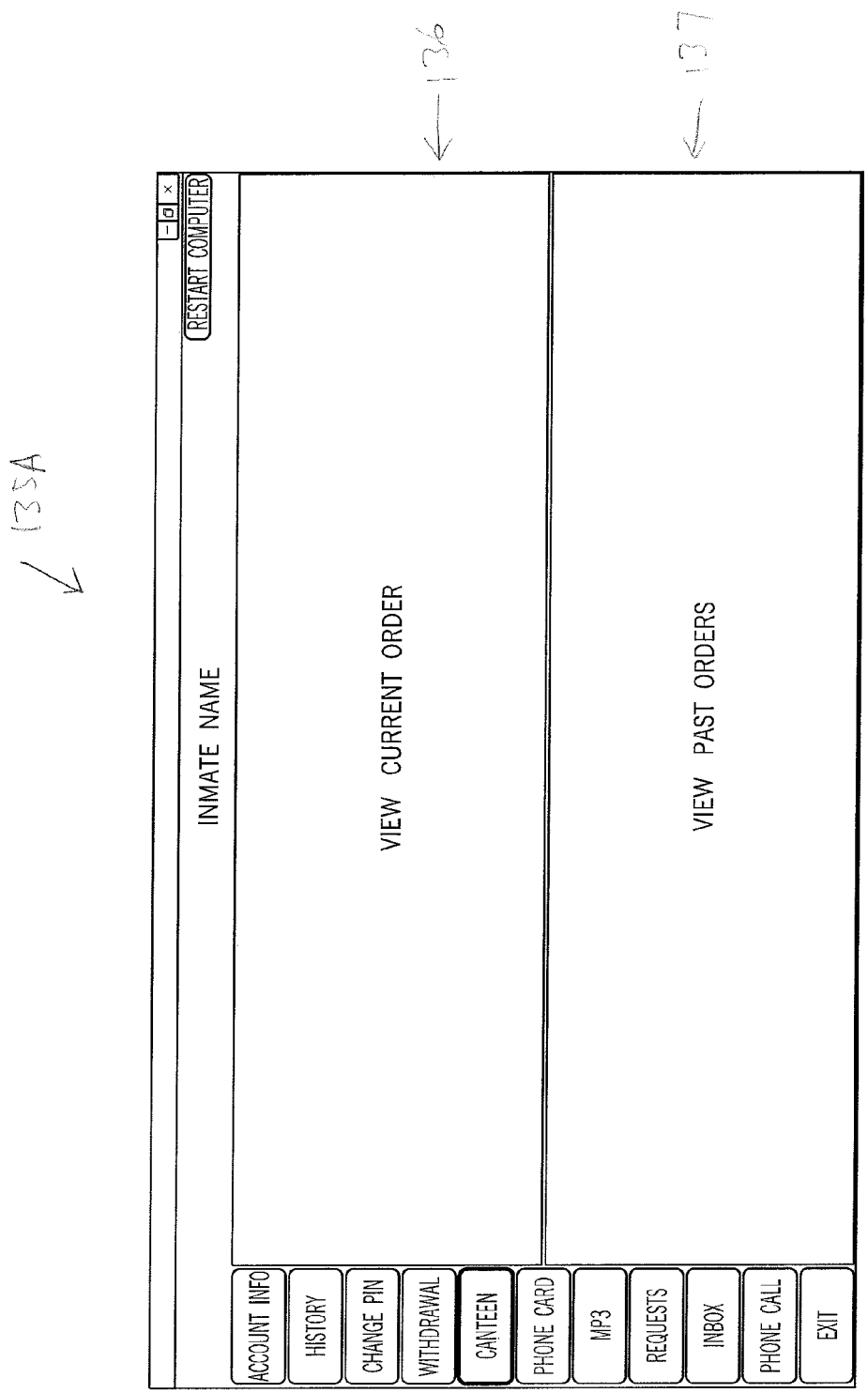
Figure 44:
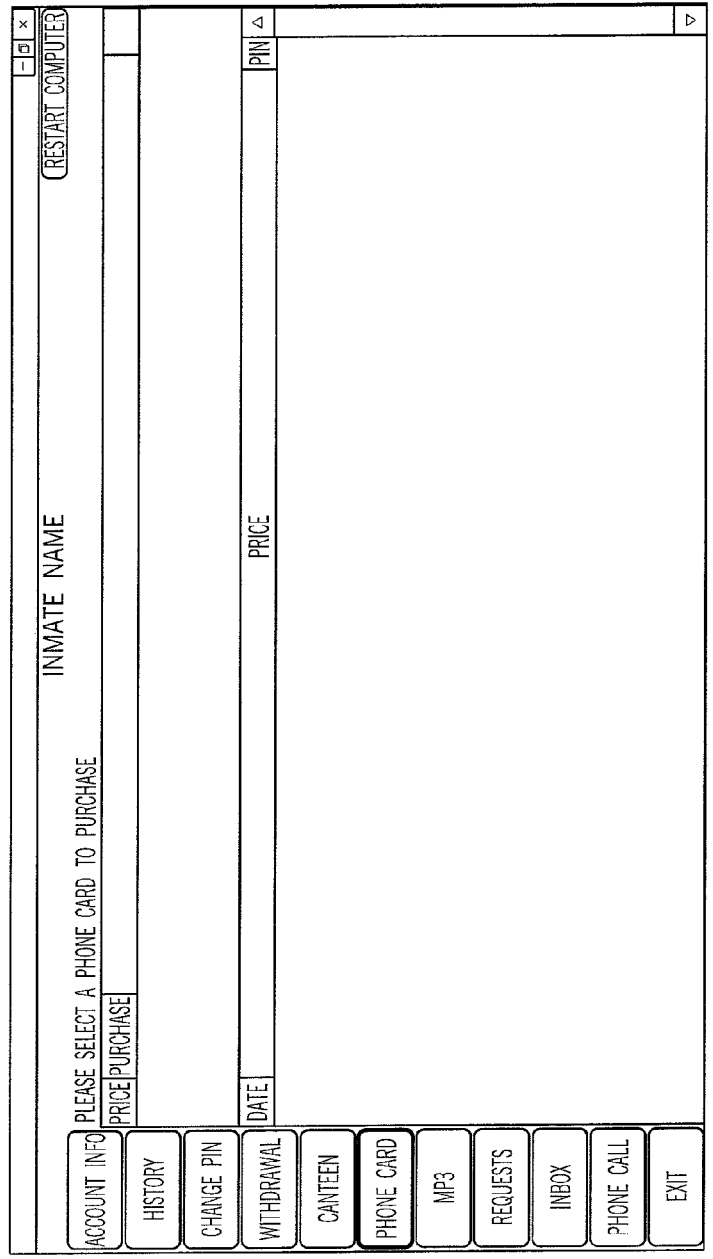
Figure 45:
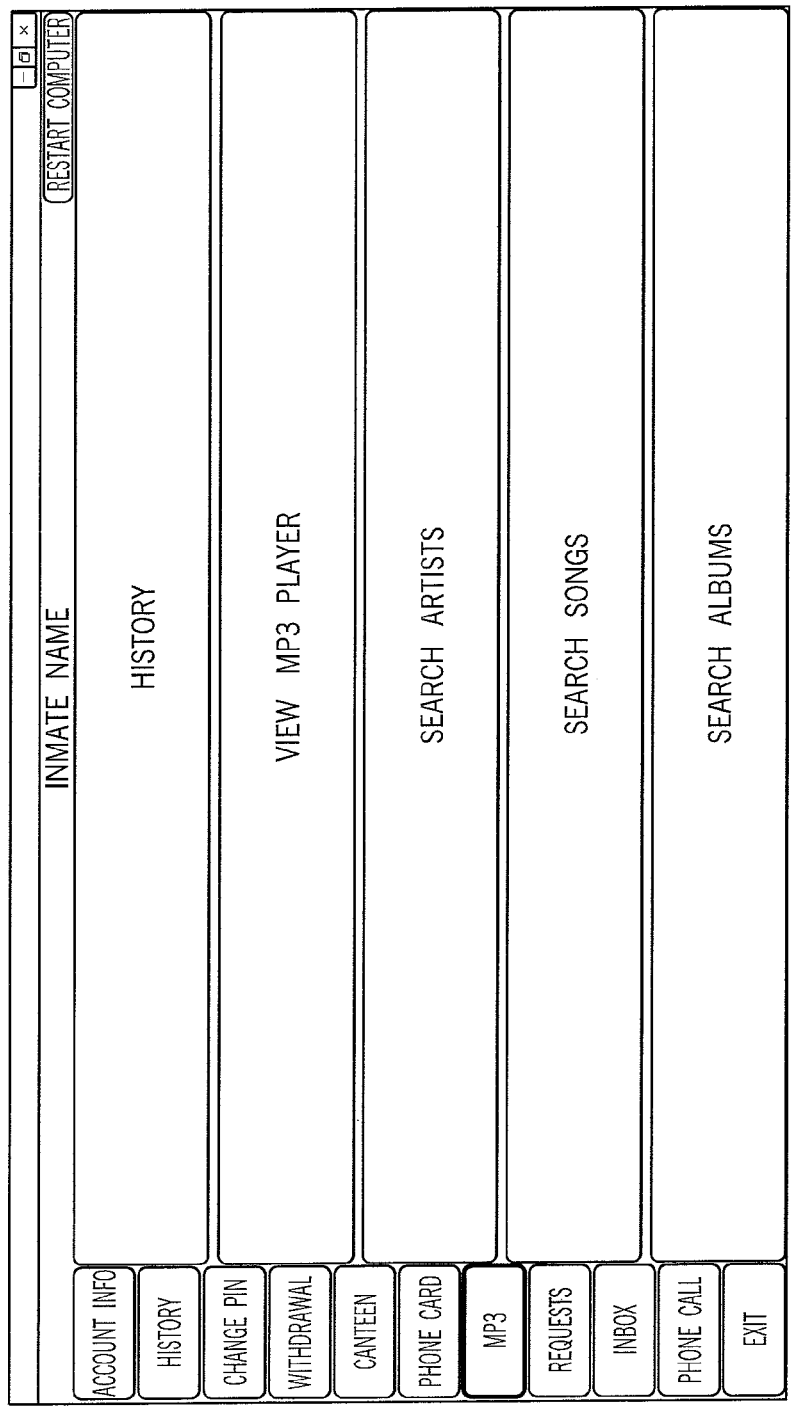
Figure 4B:
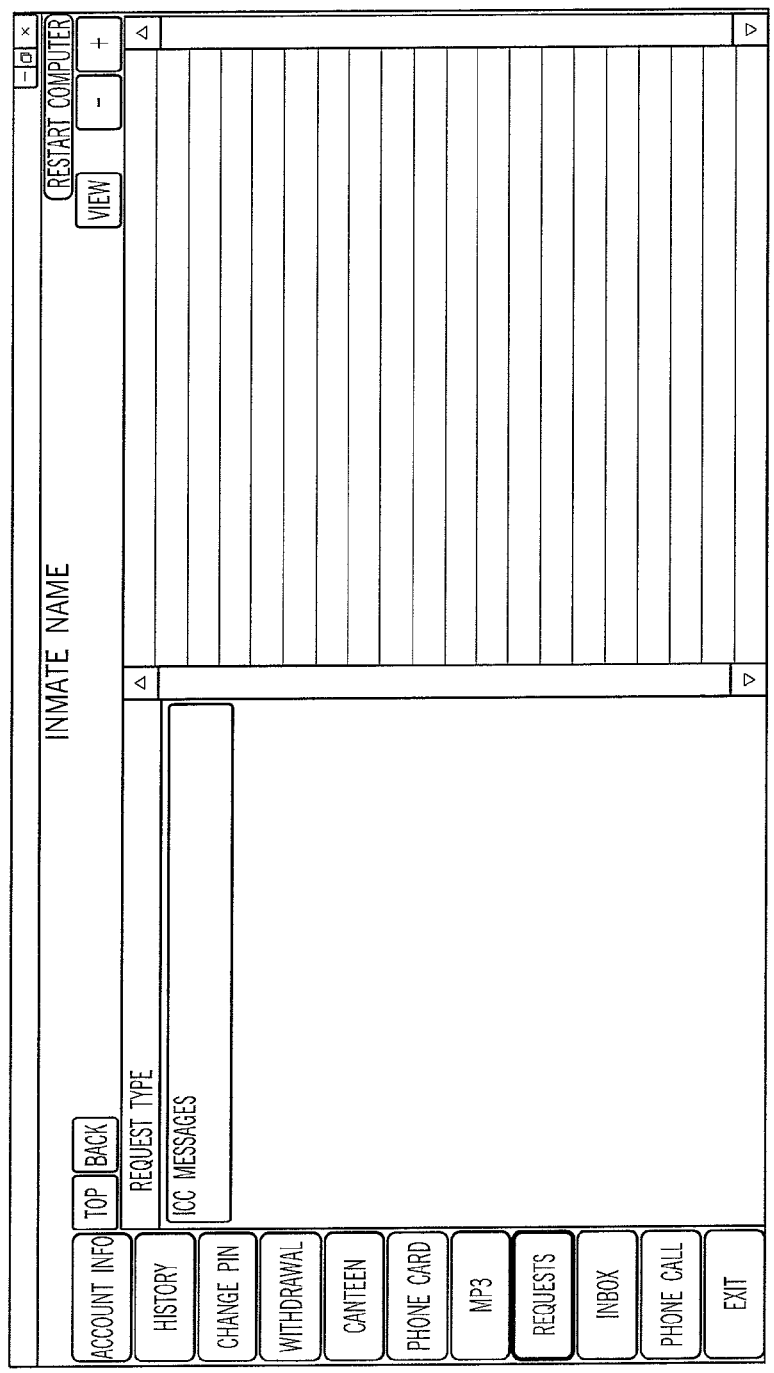
Figure 47:
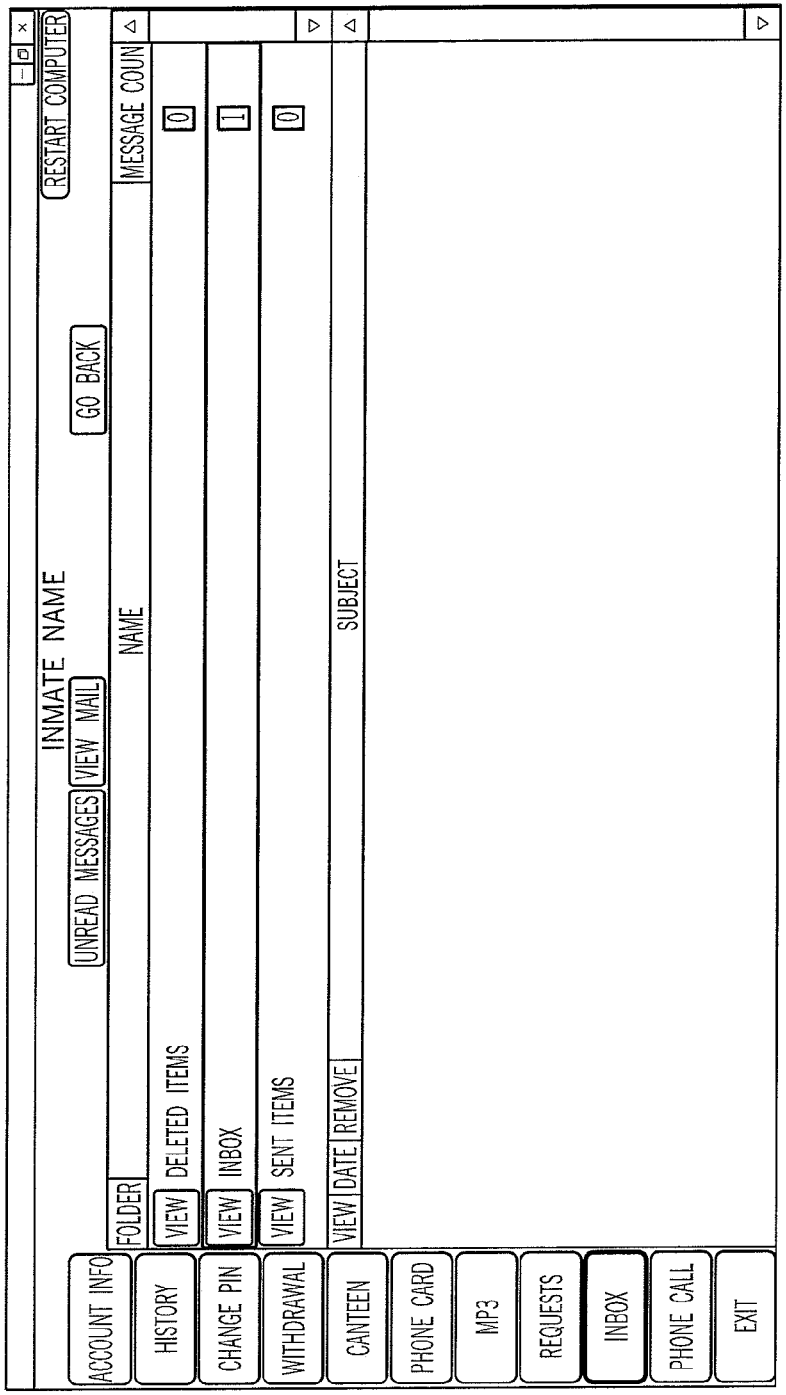
Figure 48:
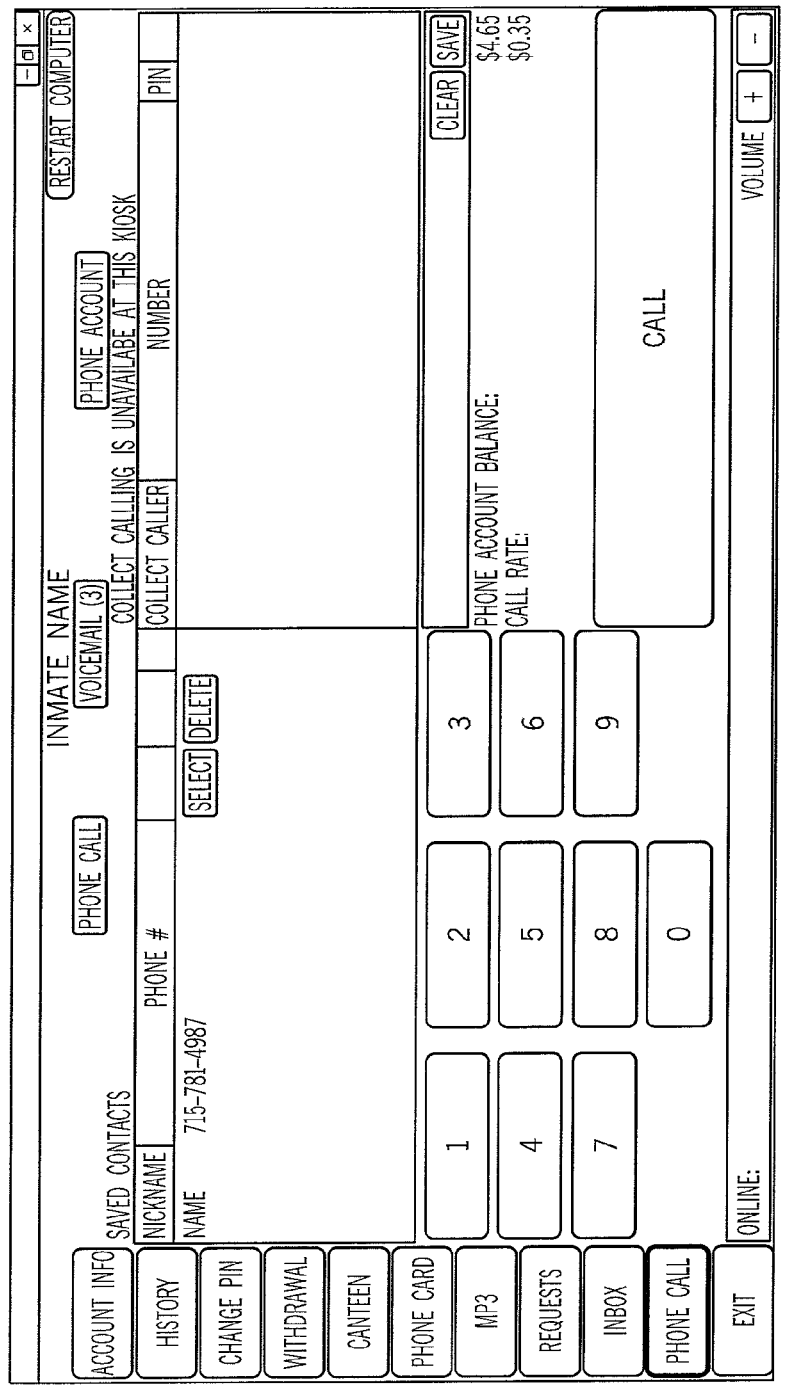
Figure 50:
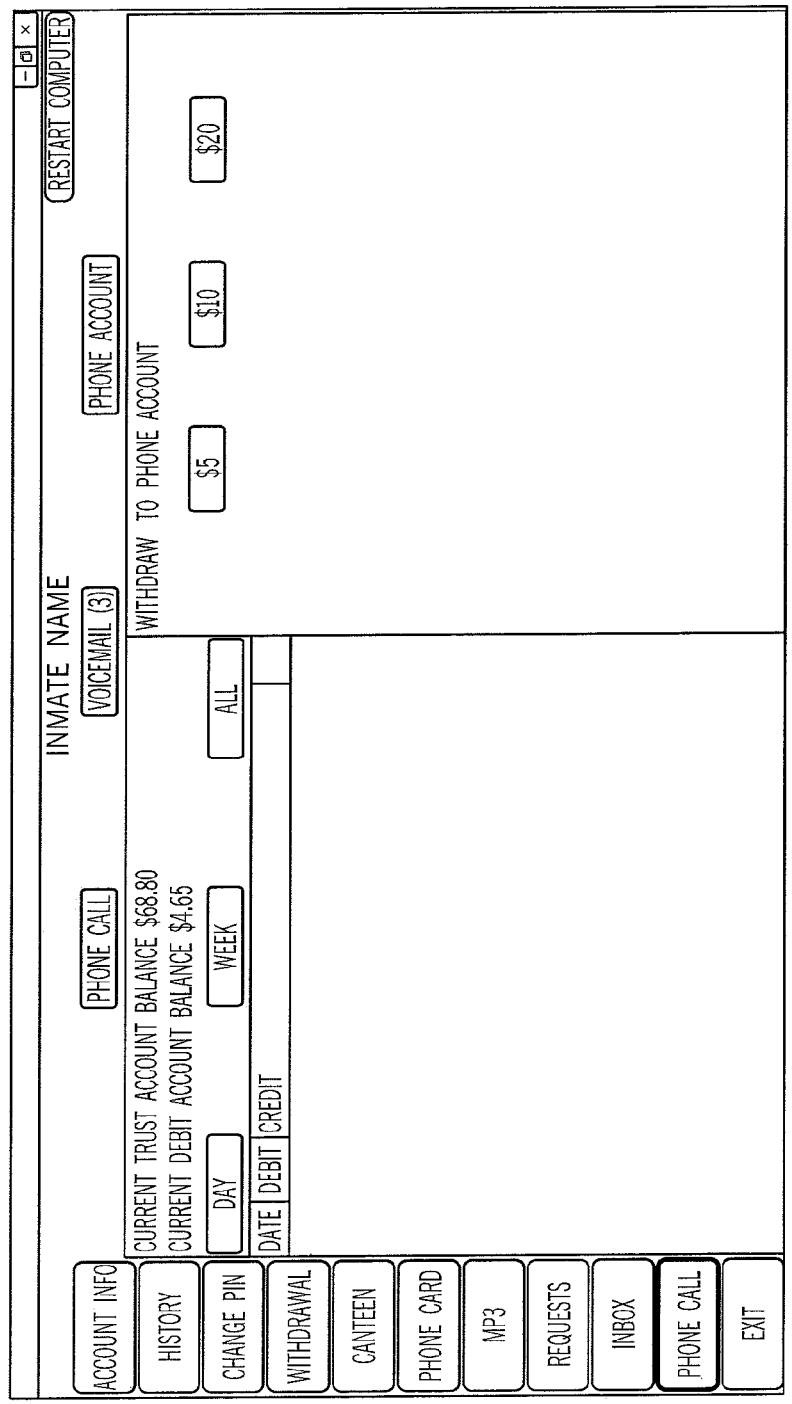

FIG. 10 is a chart of an embodiment of the user screens of the inmate management tools 130 of the system. At the Login Screen 131 a username and password are input. The following options are provided: Account information 132, Account History 133, Withdrawal Information 134, Canteen Information 135A/B (including Current Order 136 and Past Orders 137). Phone Cards 138, MP3 139, Requests 140, Inbox 141, and phone calls 142, including Phone Calls 143, Voice Mail 144 and Phone Account 145. FIGS. 38 to 50 show embodiments of user screens of the inmate management tools of the system outlined in the Chart of FIG. 10, with an example of the login screen 131 shown in FIG. 38. An example of the Account Information screen 132 is shown in FIG. 39. The Account History screen 133 is shown in FIG. 40. The Withdrawal Information screen 134 is shown in FIG. 41. The Canteen Information screens 135a/b are shown in FIGS. 42 and 43, including Current Order selection 136 and a Past Orders selection 137. The Phone Card screen 138 is shown in FIG. 44. The MP3 screen 139 is shown in FIG. 45. The Requests screen 140 is shown in FIG. 46. The Inbox 141 is shown in FIG. 47. The Phone Call screen 143 is shown in FIG. 48. The Voice Mail screen 144 is shown in FIG. 49. And, a preferred embodiment of the Phone Account screen 145 is shown in FIG. 50.

Figure 11:
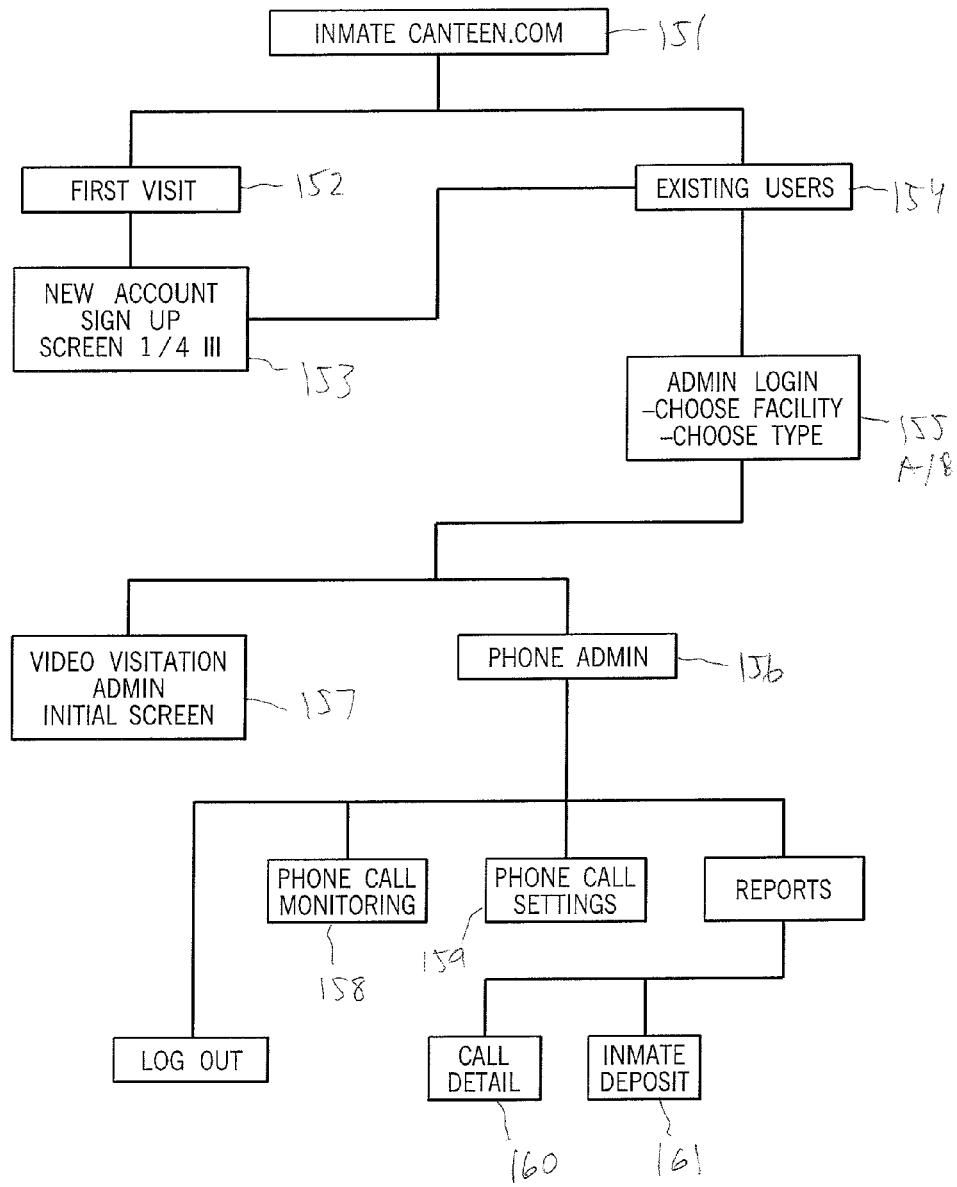
FIG. 11 is a chart of an embodiment of the user screens of the family/friend management tools of the system.
Figure 51:
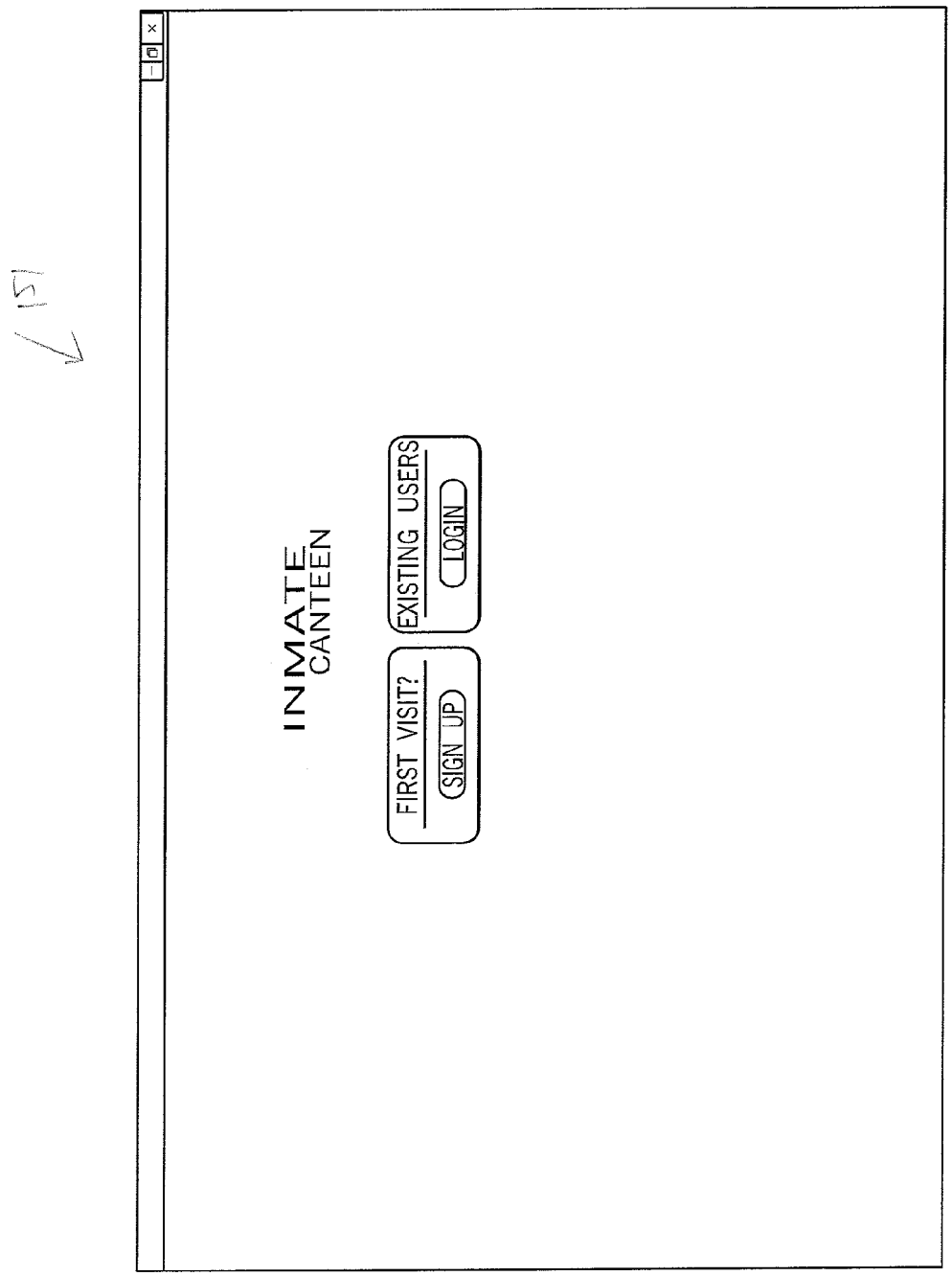
Figure 53:
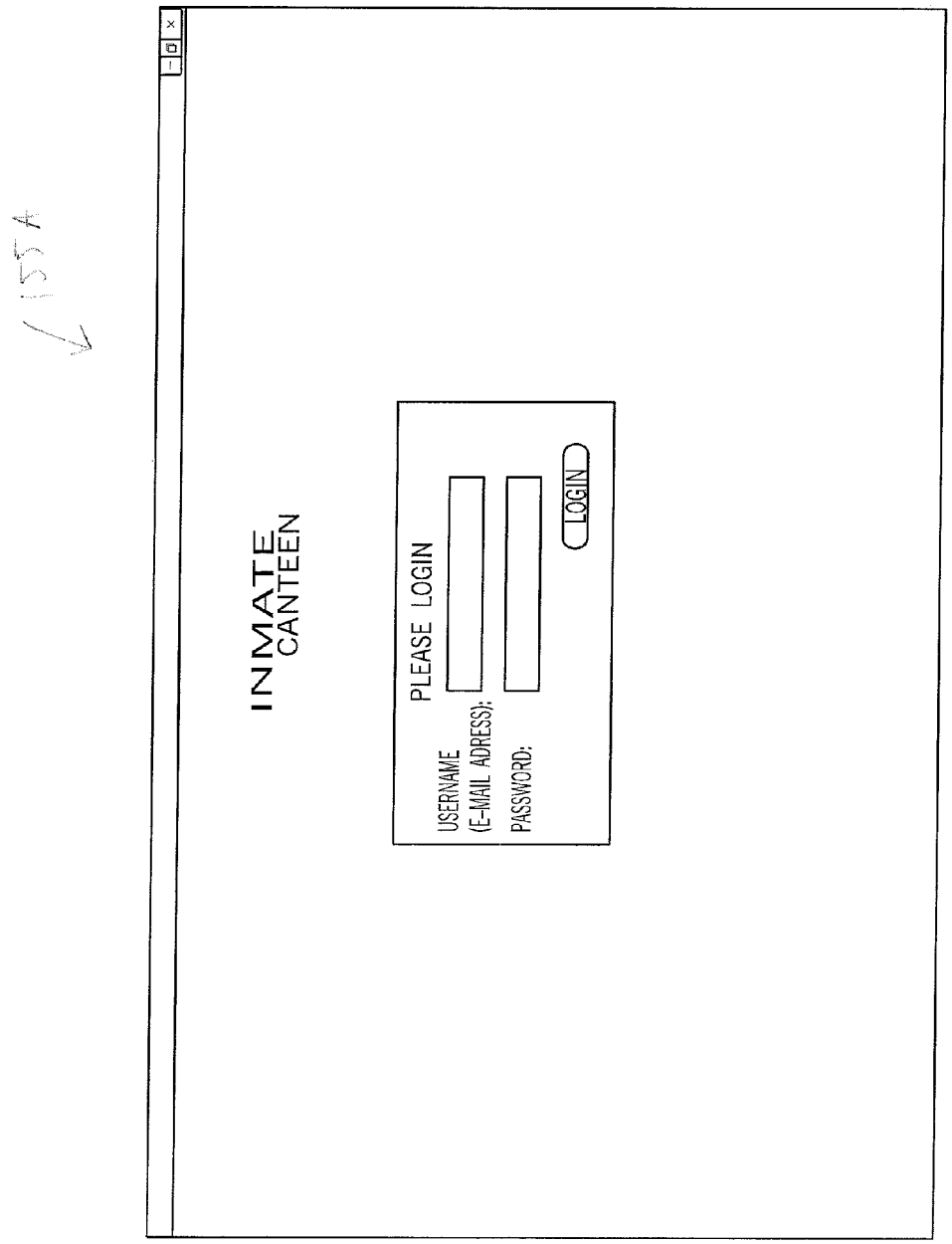
Figure 54:
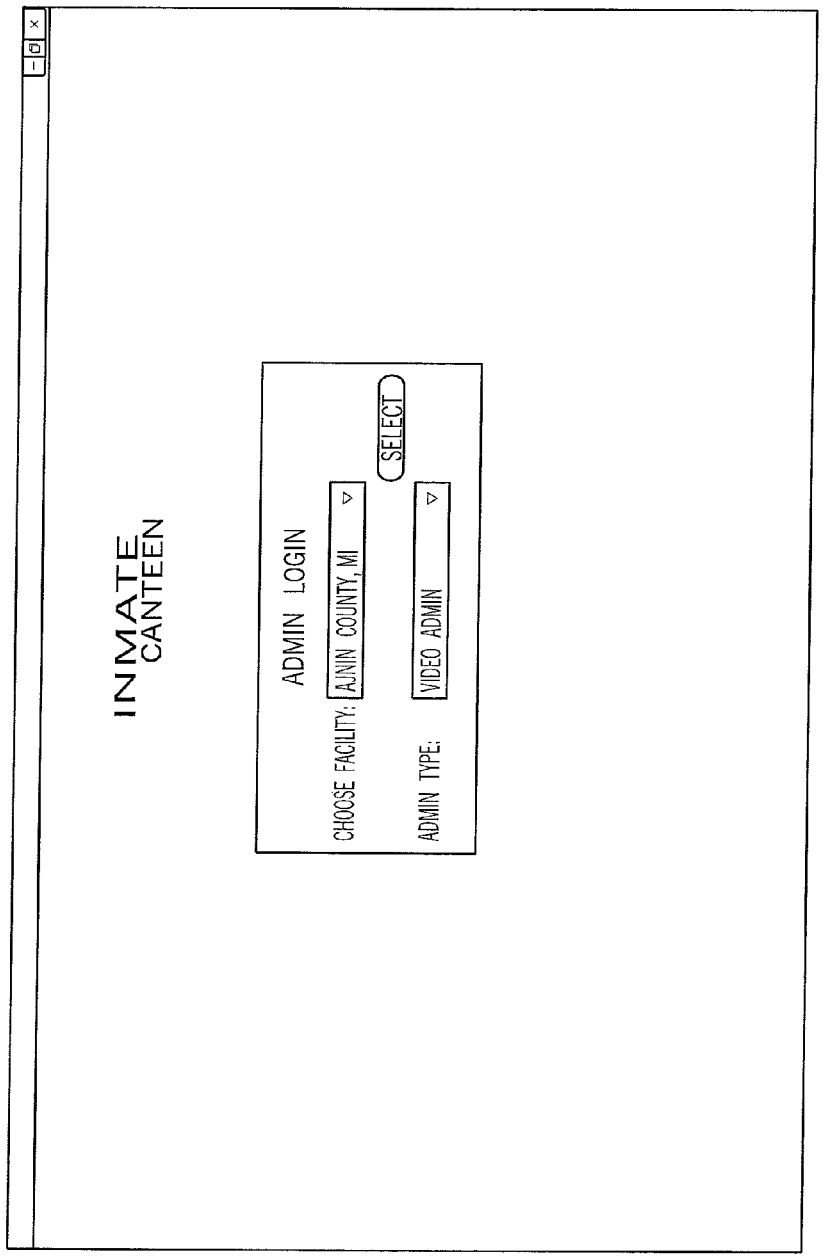
Figure 57:
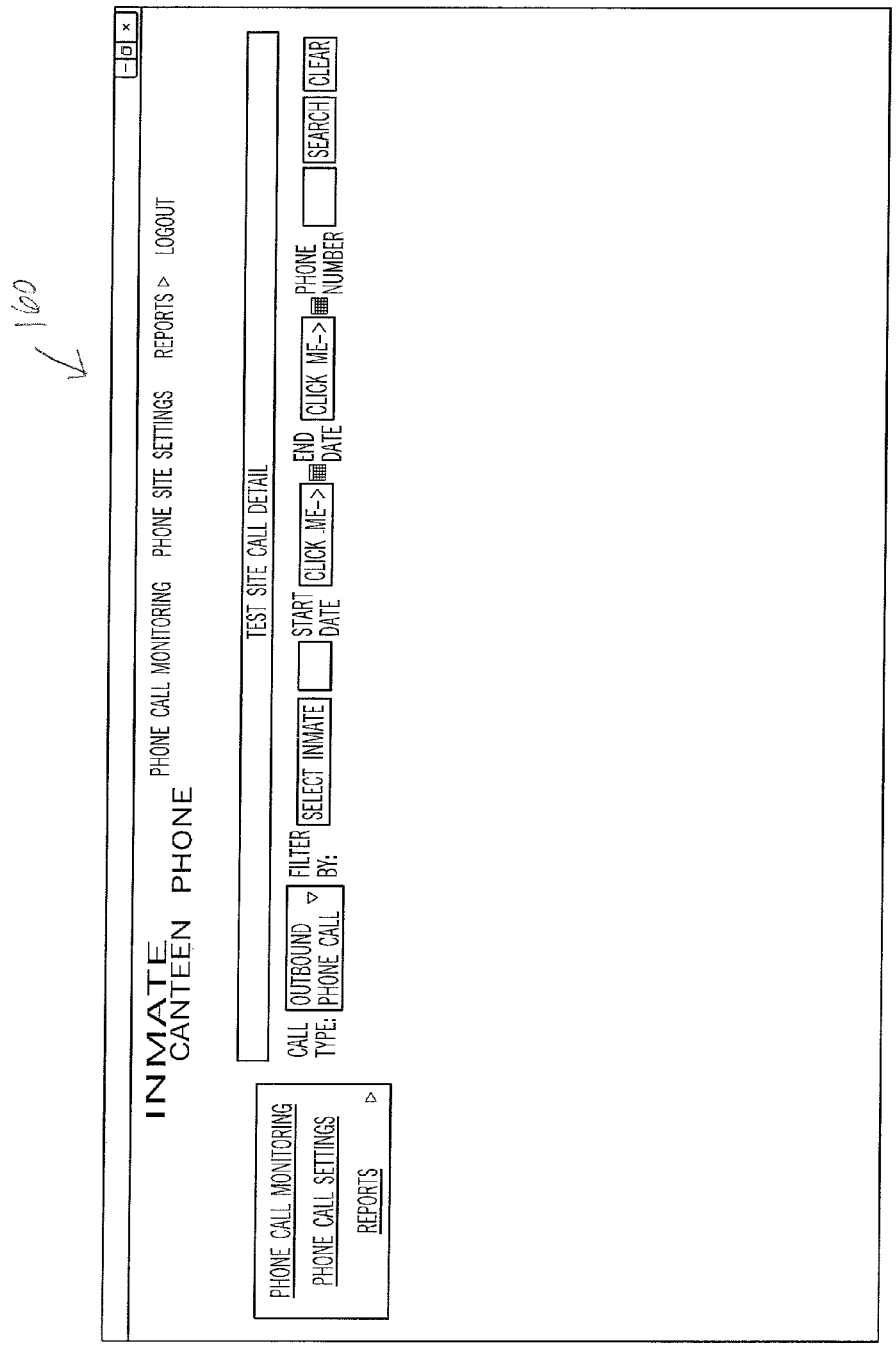
Figure 58:
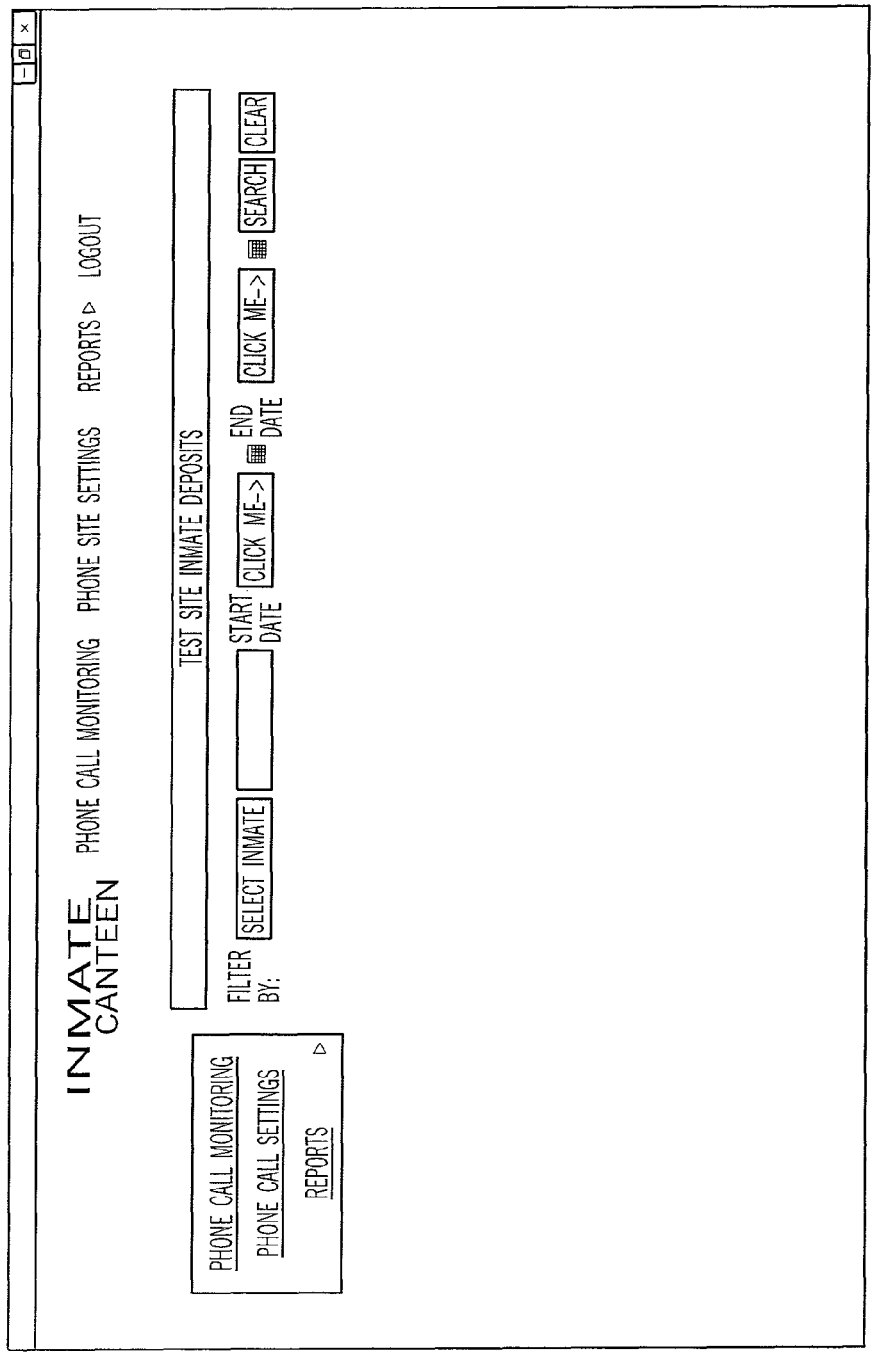

FIG. 11 is a chart of an embodiment of the user screens of the family/friend management tools 150 of the system. An on-line web based login screen 151 are for input of a username and password. First time visitors 152 are routed to a New Account Sign Up screen 153 and sub screens (not shown) for input of user information. Holders 154 of accounts are routed to a screen 155a/b permitting selection of a facility (jail) and a choice of communication administration between phone 156 and video visitation 157 (audio-visual). For phone administration 156, phone call monitoring 157, phone call setting 158 and reports (call details 159 and inmate deposit 160) are available. FIGS. 51-59 show exemplary embodiments of user interfaces for these functions for family/friend management. FIG. 51 illustrates the login screen 151. FIG. 52 shows an embodiment of the New Account Sign Up Screen 153. FIG. 53 shows an admin screen 155a for user name and password. FIG. 54 shows a facility selection screen 155b. FIG. 55 shows an example interface for phone administration 156. FIG. 56 shows a phone call setting screen 159. FIG. 57 illustrates a call detail screen 160. And, FIG. 58 discloses an inmate deposit user interface 161. FIG. 59 shows a video visitation admin screen 157

2. Video Visitation Features

Figure 60:
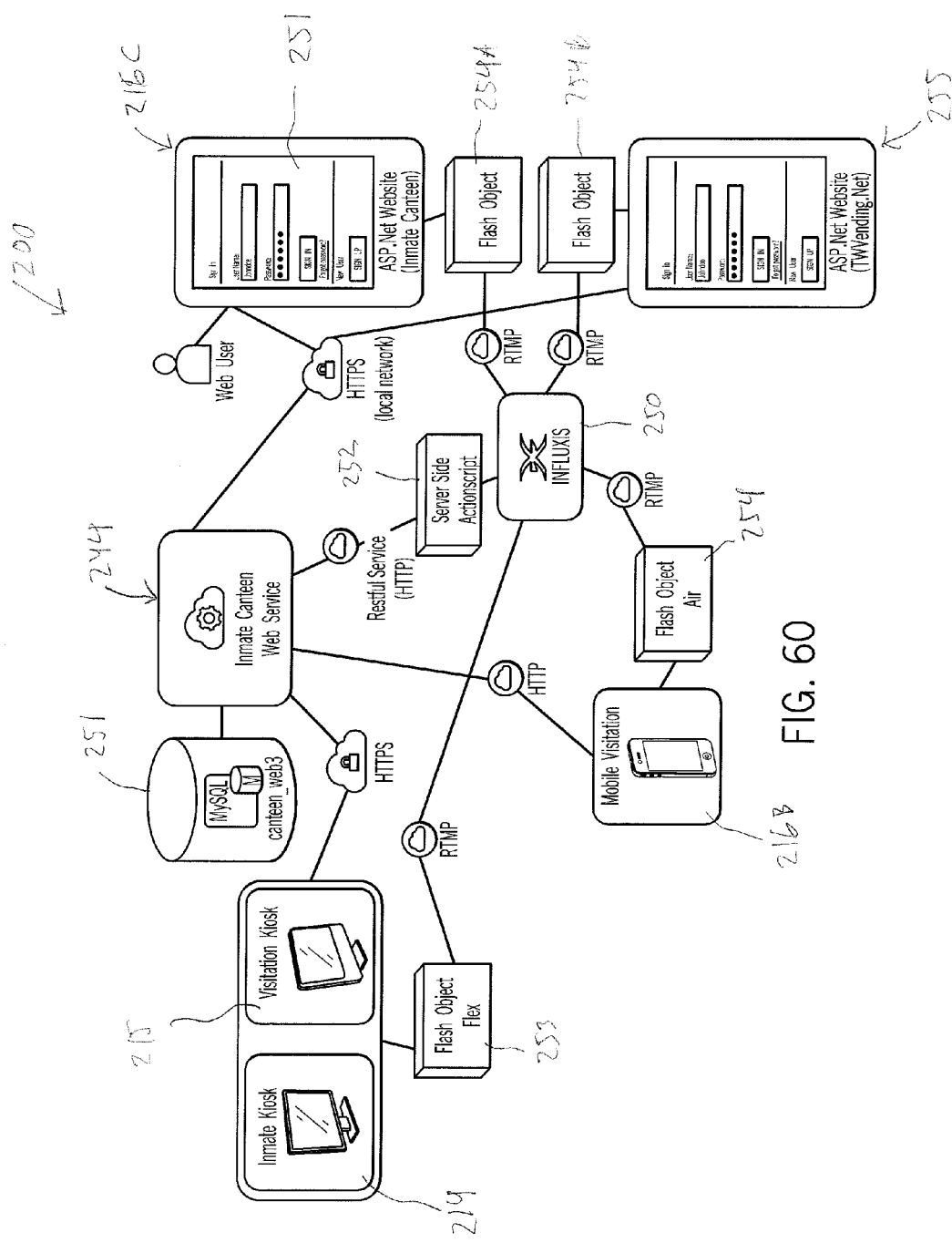
FIG. 60 illustrates an embodiment of the system of the invention from the perspective of the audio-visual video visitation hardware and software elements of the invention.
Figure 66:
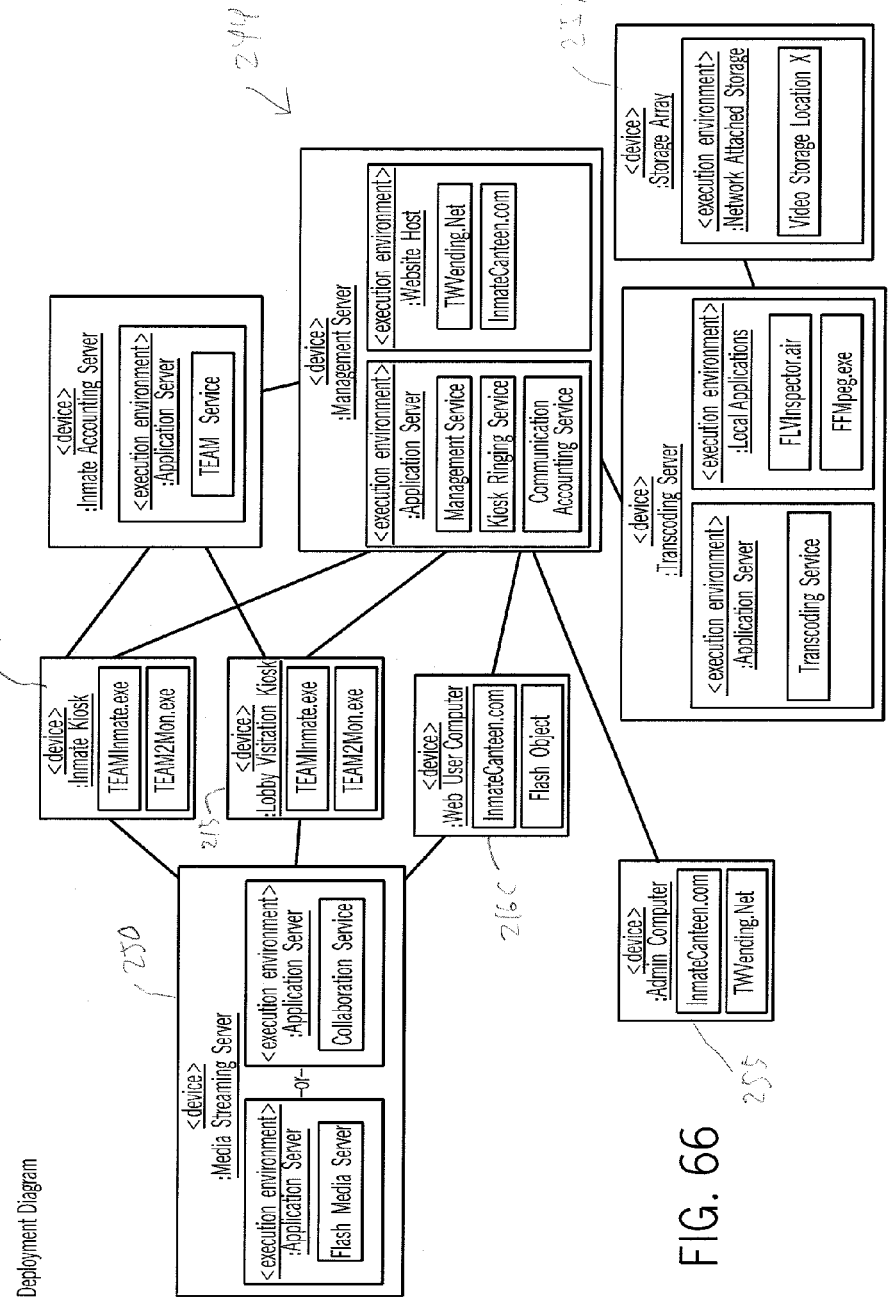
FIG. 66 is a diagram of an embodiment of the deployment of devices in the video visitation system of the invention.

FIGS. 60 and 66 illustrate an embodiment of the system 200 of the invention from the perspective of the audio-visual video visitation hardware and software elements of the invention. The system 200 enables persons outside the jail or other secure facility to visit audio-visually with an inmate or resident of a secure facility. The inmate uses an Inmate Kiosk 214. The outside visitor uses a Visitation Kiosk 215 disposed at the jail in the lobby, visitor center or booking station thereof, a mobile, smart device 216B or a PC/Mac web browser 216C (for example via sign on page 251) or the like. The kiosks 214 and 215 are communicatively connected to a remote, on-line streaming platform or infrastructure 250. The streaming platform 250 facilitates on-demand, live (real-time), interactive audiovisual communication between at least two parties. A preferred streaming platform is provided by Influxis of Valencia, Calif., USA. The kiosks 214 and 215 communicate with the streaming platform 250 preferably by real time messaging protocol (RTMP). The communication link preferably includes Flash Object Flex 253 attributes. Similarly, a mobile device 216B carried by an outside visitor is communicatively connected to the streaming platform 250 via RTMP (and preferably Flash Object Air 254). Further, the outside person's PC browser 216C is also communicatively connected to the streaming platform 250 via RTMP with Flash Object 254A. The kiosks 214/215, mobile device 216B and PC 216C audio-visual devices are further communicatively connected to a remote, Inmate Canteen Web service 244 via hypertext transfer protocol (HTTP or HTTPS). The Web Service 244 is connected to a database 251. The streaming platform 250 is communicatively connected to the Web Service 244 via an http protocol and a server side actionscript 252. This communication service preferably conforms to Representational State Transfer (REST) constraints. System management may monitor and control the system 200 via a web interface 255.

Figure 61:
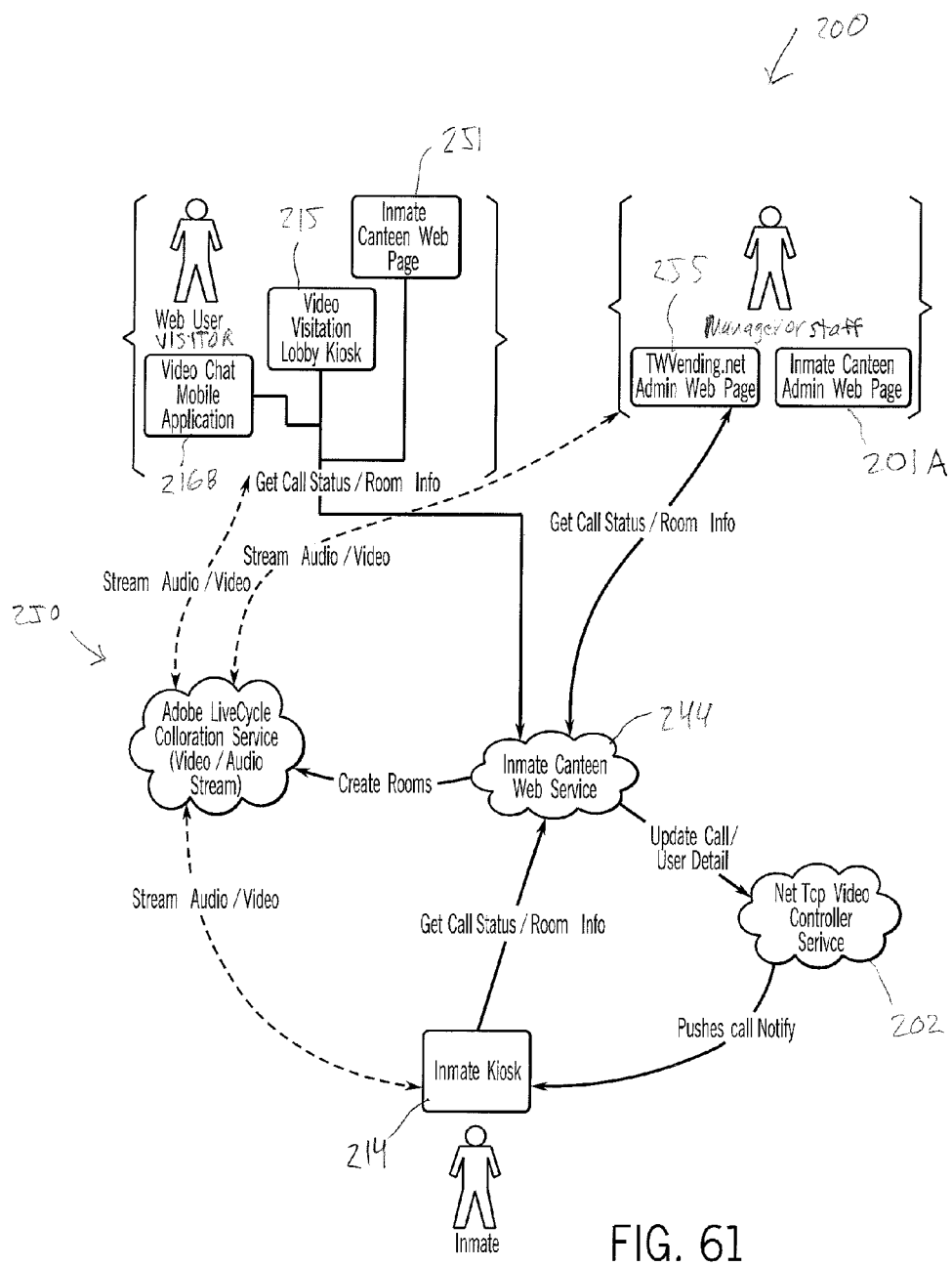
FIG. 61 illustrates an embodiment of the video visitation method of the invention.

FIG. 61 illustrates an embodiment of the flow of information in the video visitation system 200 and method of the invention. Inmates access the video visitation system 200 via the inmate kiosk 214. Visitors access the system 200 via an app on their mobile smart device 216B, or visitor kiosk 215 or web browser 251. Jail staff or system managers access the system to monitor and control video visitation via the manager web interface 255 and admin web page 201A respectively. Video Chat Room information and call status information is shared between the inmate kiosk 214, visitor devices 216B, 215, and 251 and jail staff and system managers via the web service 244. Audio/Visual streams to and from the inmate kiosk 214 and the visitor devices 216B, 215, and 251 via a collaboration service 250. The web service 244 is also used to create AV chat rooms. The web service 244 updates calls and user details to a net TCP Video controller service 202. The controller service pushes call notifications to the inmate kiosk 214.

Figure 62:
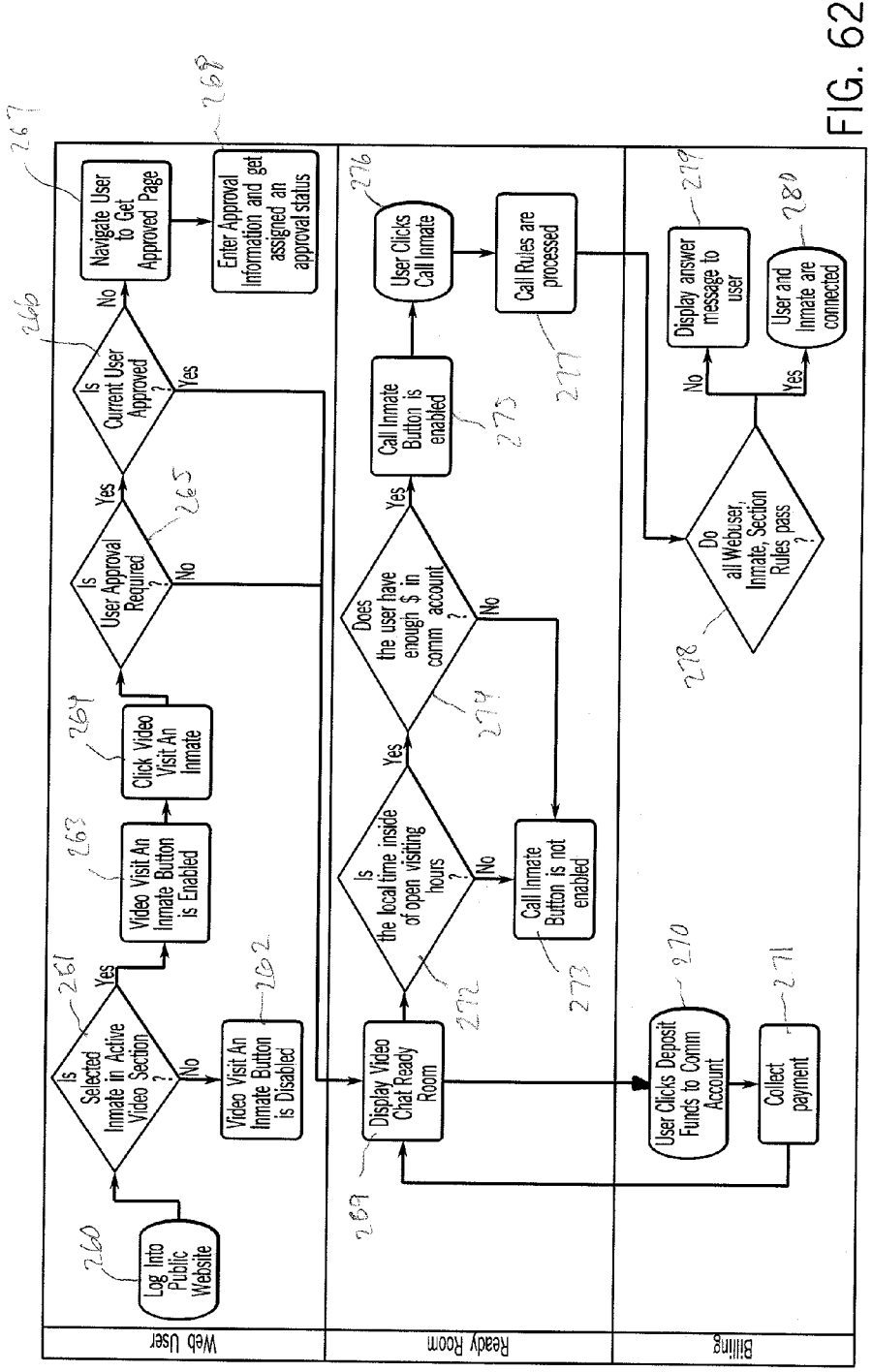
FIG. 62 is a flow chart of an embodiment of another aspect of the method of the invention.

FIG. 62 is a flow chart of a preferred embodiment of the method of making a web based video visitation. The visitor logs on 260 the system via a web interface. A determination 261 is made whether the desired inmate is in an active video section. If not, the video visit option on the visitor/user web interface is disabled 262. If present, the video visit option is enabled 263. Next, the visitor may actuate 264 the video visitation button. User approval requirement is determined 265. If required, a determination 266 is made whether the user is approved. If not, the user is navigated 267 to a web page to permit approval, whereupon information is entered 268 to assign approval status. If approved (already or after the approval process 267/268), the user is directed to a display video chat room ready 269. The user is so directed earlier if user approval is not required in step 265. The user is provided an opportunity to deposit additional funds or credits by clicking "Deposit Funds To Account" button, payment is collected 271, and video visitation processing continues. Next, determination 272 is made whether the visiting hours time window is open. If not, the call inmate button is not enabled 273. If so, determination 274 is made whether the user has sufficient funds. If not, the call inmate button is disable 273. If sufficient funds are available, the call inmate button is enabled 275. Upon clicking the call inmate button 276, call rules are processed 277. Determination 278 is made whether any necessary rules are met. If not, a message related to the rule is displayed 279 to the user. If rules are met, the user and the inmate are connected 280 for a video visitation.

Figure 63:
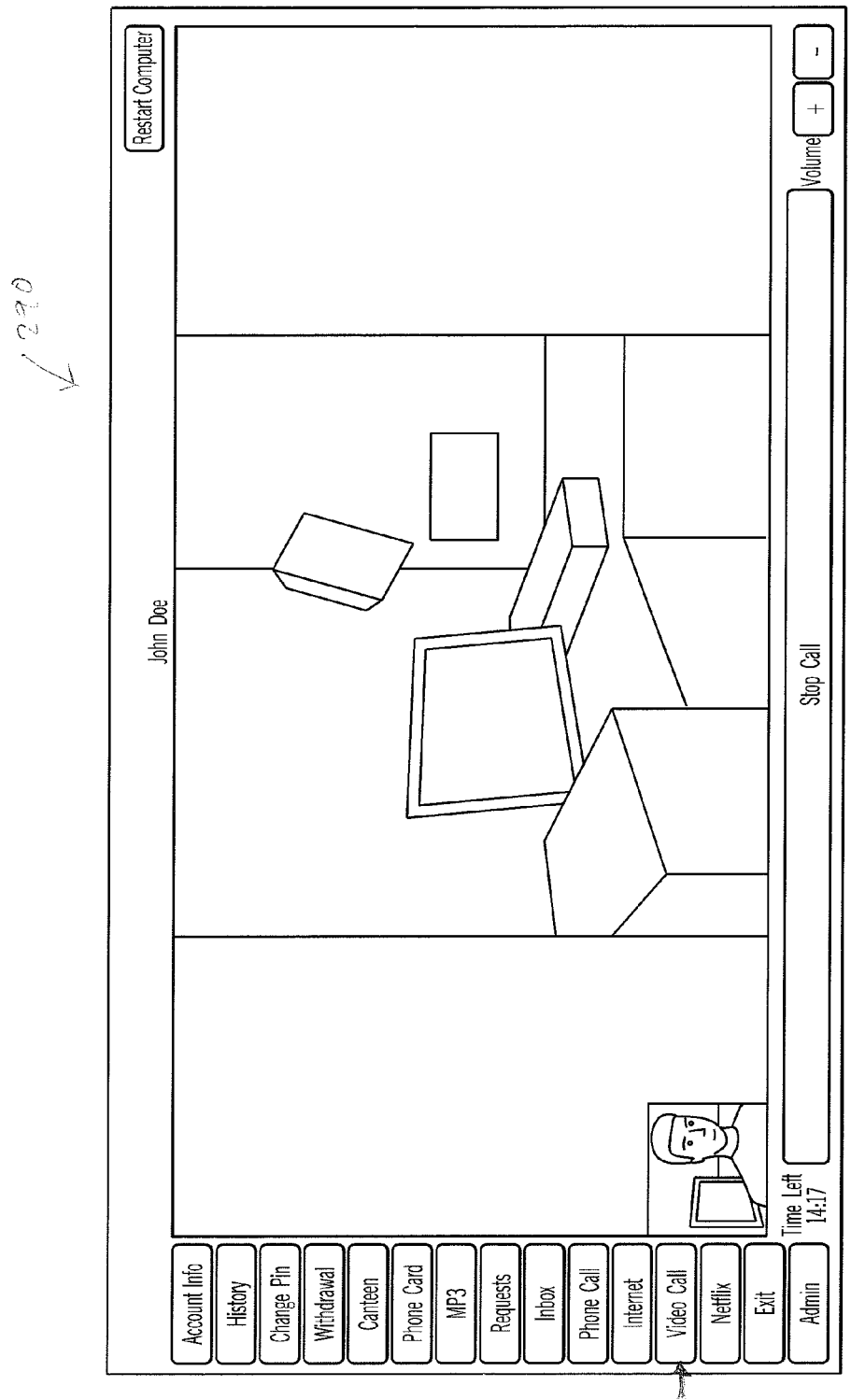
FIG. 63 is a screen shot showing an embodiment of the user interface and display of a video visitation kiosk of the invention.
Figure 64:
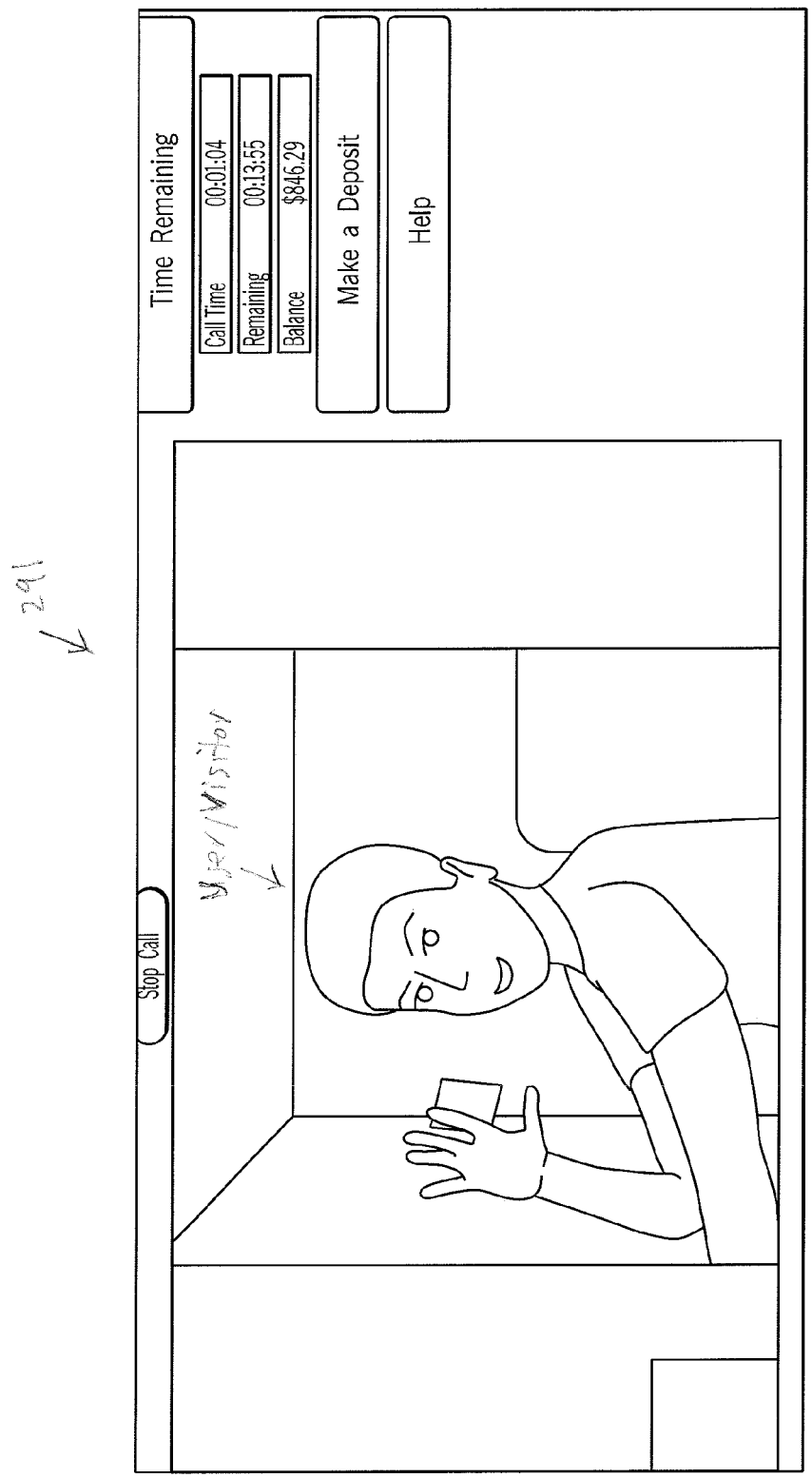
FIG. 64 is a screen shot showing an embodiment of the user interface and display of a video visitation from the perspective of an outside user family or friend using a personal computer.
Figure 65A:
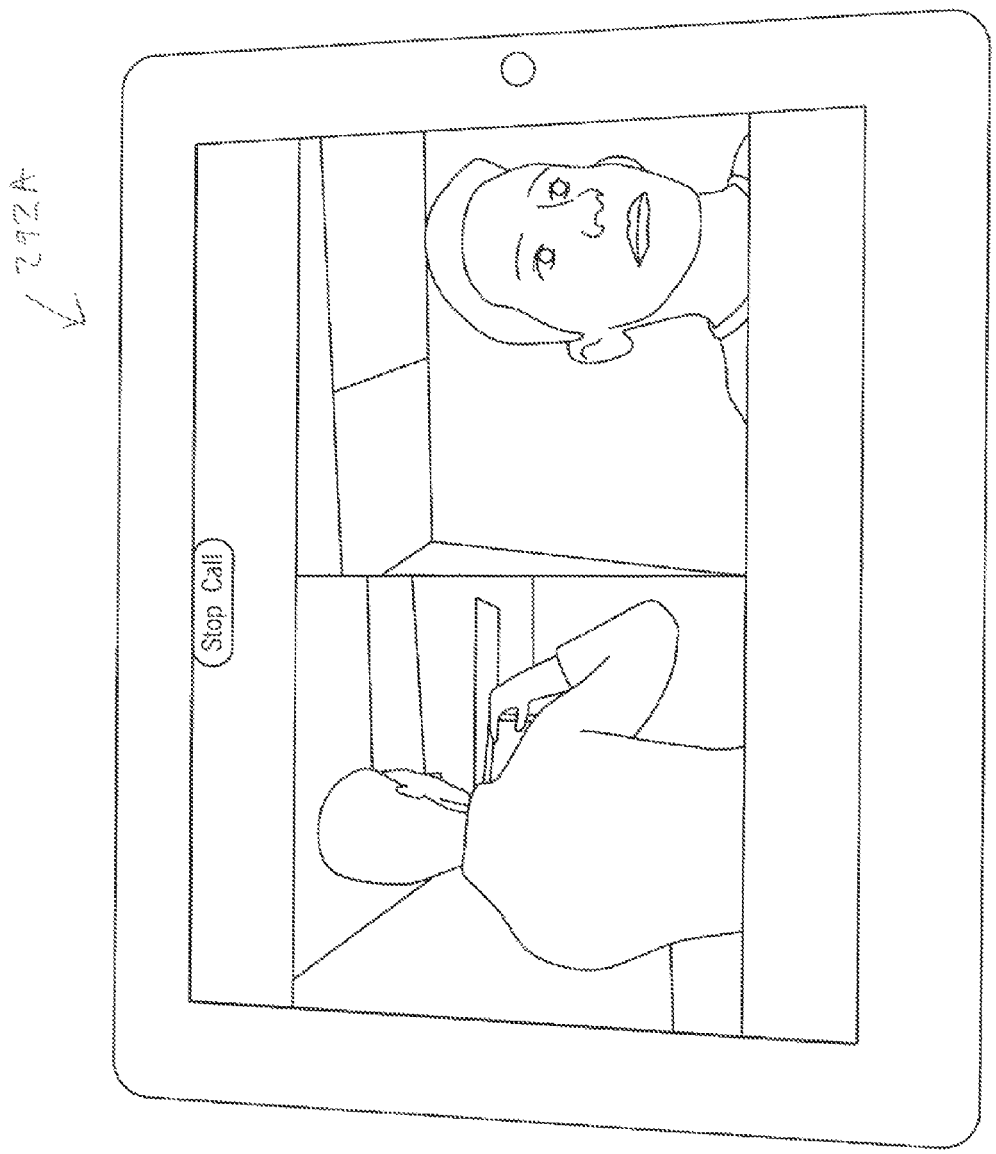
FIG. 65A is a screen shots showing an embodiment of the user interface and display of a video visitation from the perspective of an outside user family or friend using a mobile device such as an iPad or Android device.

FIG. 63 is screen shot showing an embodiment of the user interface and display 290 of a video visitation kiosk of the invention for a video call. FIG. 64 is a screen shot showing an embodiment of the user interface and display 291 of a video visitation from the perspective of an outside user family or friend using a personal computer. FIGS. 65A/B is a screen shots showing an embodiment of the user interface and display 292 of a video visitation from the perspective of an outside user family or friend using a mobile device such as an iPad.

Figure 68:
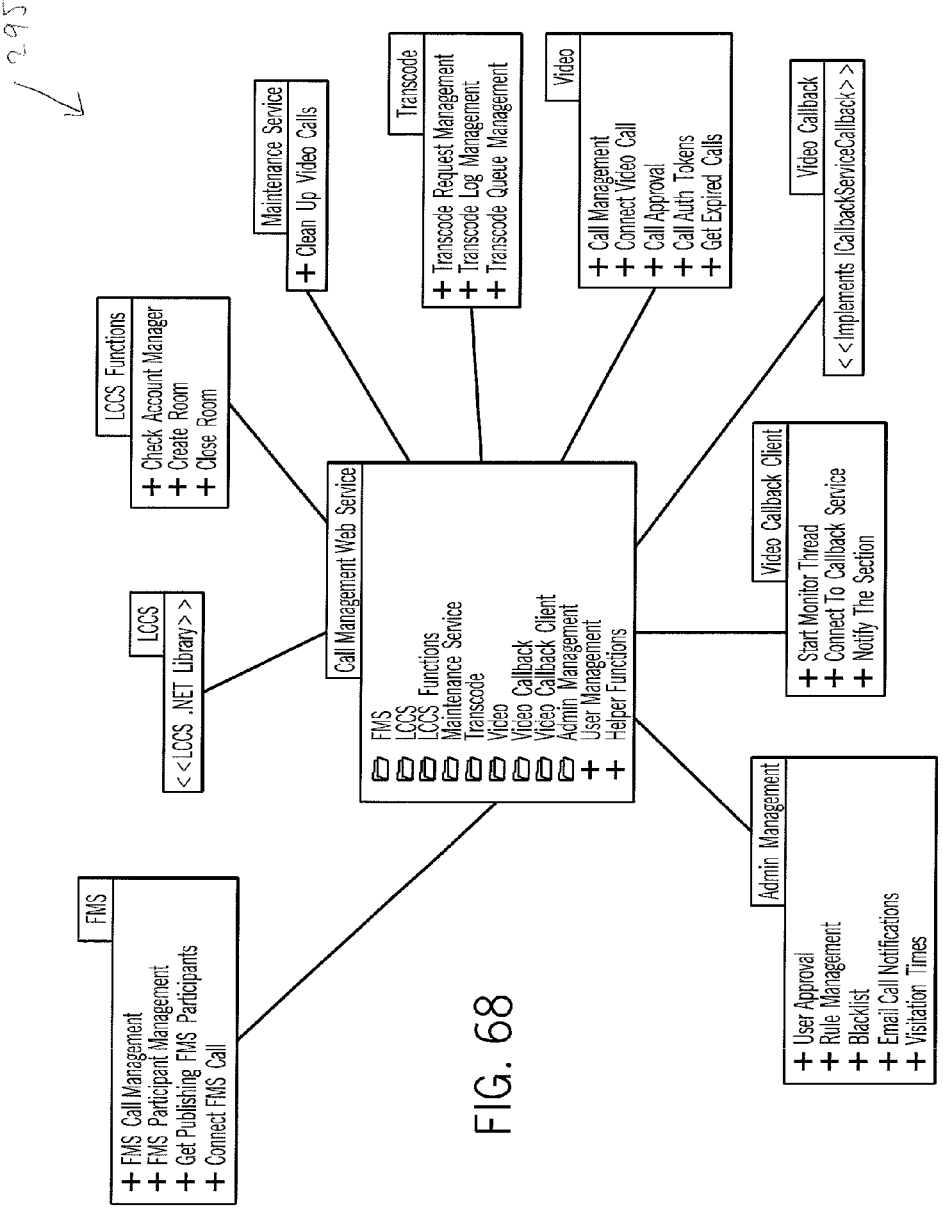
FIG. 68 is a diagram of an embodiment of a call management web service package of the invention.

FIG. 66 is another diagram 293 of the deployment of devices in the video visitation system 200 of the invention. FIG. 67 is a flow chart of an embodiment of the file migration worker process 294 of the invention. FIG. 68 is a diagram of an embodiment of a call management web service package 295 of the invention.

Figure 70:
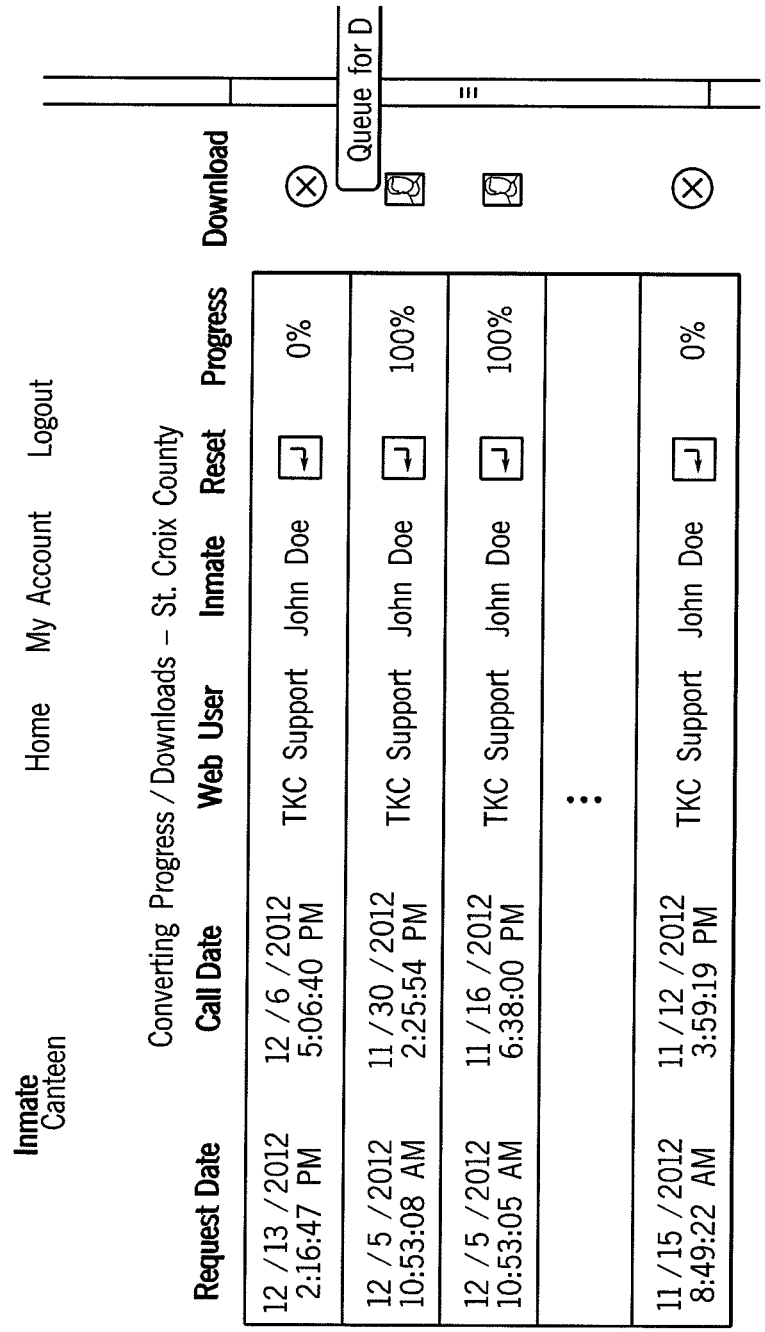
FIG. 70 is a web shot of an embodiment of a user interface for an administrator for listing and monitoring downloads for the system.

FIG. 69 is a web shot of an embodiment of a user interface 296 for a secure facility administrator for controlling video visitation settings for the system. FIG. 70 is a web shot of an embodiment of a user interface 297 for an administrator for listing and monitoring downloads for the system. FIG. 71 is a web shot of an embodiment of a user interface 298 for an administrator for listing and controlling blacklist information for the system. FIG. 72 is a web shot of an embodiment of a user interface 299 for an administrator for listing and controlling inmate video visitations for the system. FIG. 73 is a web shot of an embodiment of an email notification 300 for an administrator that a particular inmate has used video visitation for the system.

Figure 74A:
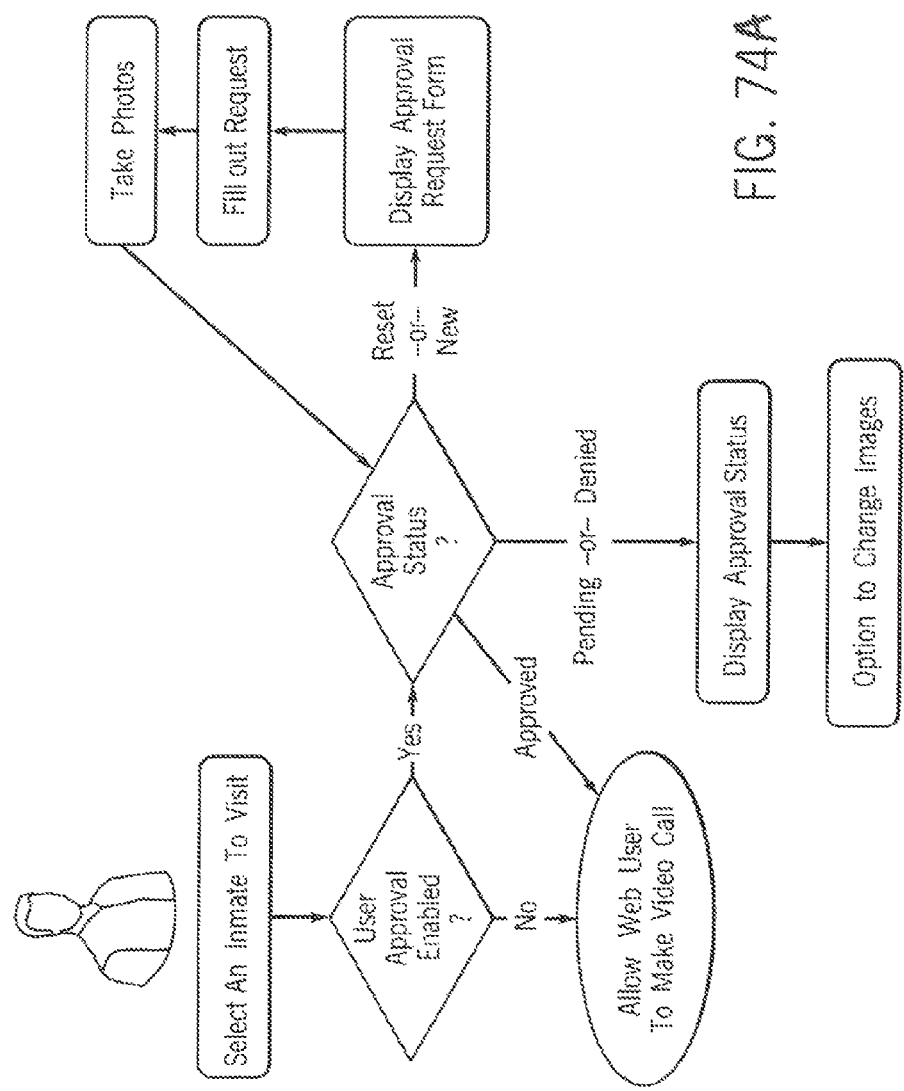
FIG. 74A is an activity diagram of an embodiment of a portion of a method of approving video visitation for a user.
Figure 74B:
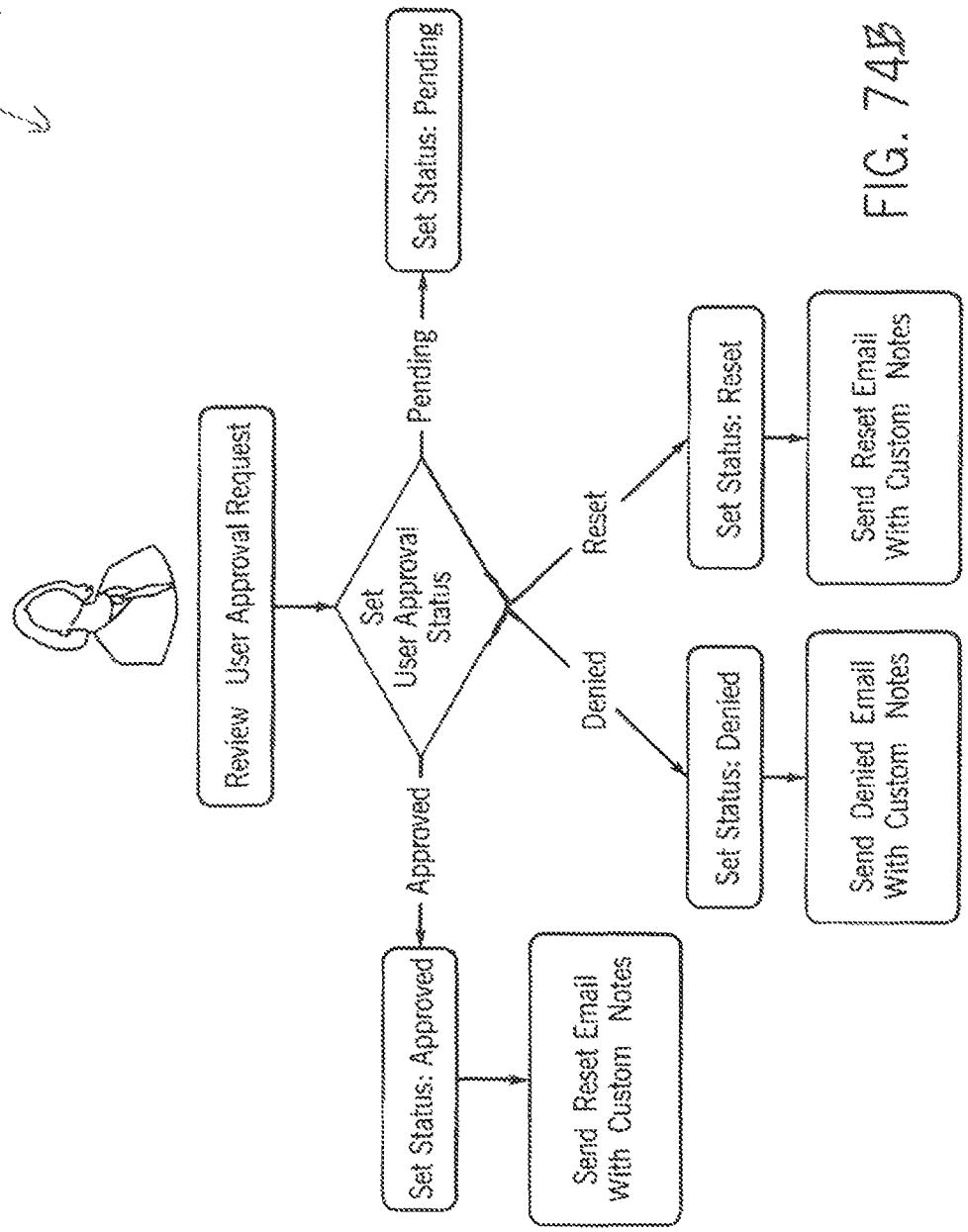
FIG. 74B is an activity diagram of a further portion of the method.
Figure 76:
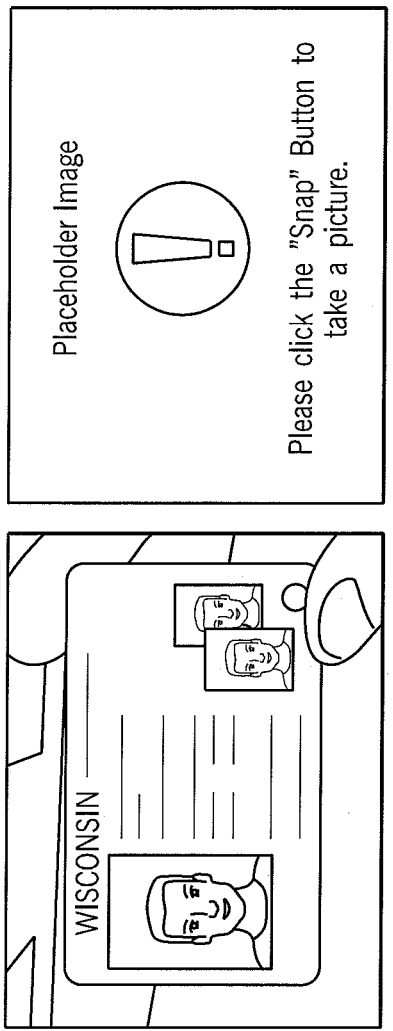
FIG. 76 is a web shot of an embodiment of a user interface for a second or subsequent step in the method of obtaining approval.
Figure 77:
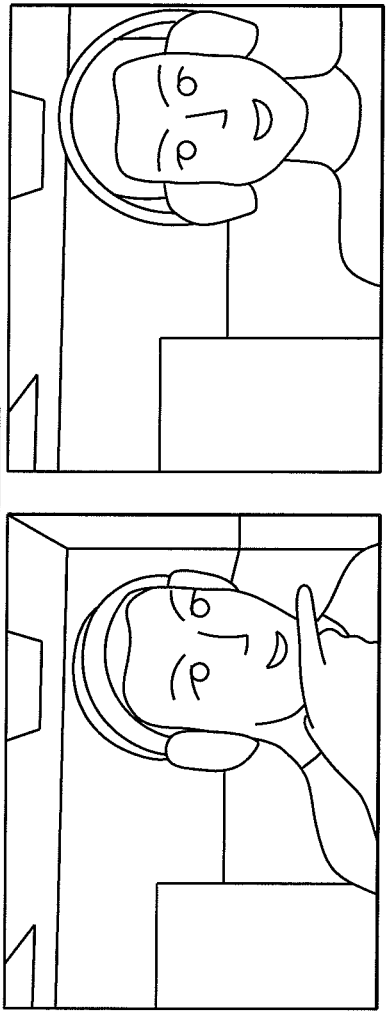
FIG. 77 is a web shot of an embodiment of a user interface for a third or subsequent step in the method of obtaining approval.
Figure 78:
FIG. 78 is a web shot of an embodiment of a user interface for a fourth or subsequent step in the method of obtaining approval.
Figure 80:
FIG. 80 is a web shot of an embodiment of a user interface for an optional audition room feature in the method of obtaining approval.

FIGS. 74 A/B are activity diagrams 301a/b of an embodiment of a method of approving video visitation for a user. FIG. 74A shows the steps from the perspective of the user. FIG. 74B shows the steps from the perspective of the staff. FIG. 75 is a web shot of an embodiment of a user interface 302 for a first step in the method of obtaining approval. FIG. 76 is a web shot of an embodiment of a user interface 303 for a second or subsequent step in the method of obtaining approval. FIG. 77 is a web shot of an embodiment of a user interface 304 for a third or subsequent step in the method of obtaining approval. FIG. 78 is a web shot of an embodiment of a user interface 305 for a fourth or subsequent step in the method of obtaining approval. FIG. 79 is a web shot of an embodiment of a user interface 306 for a final step in the method of obtaining approval, wherein a request is denied or approved. FIG. 80 is a web shot of an embodiment of a user interface 307 for an optional audition room feature in the method of obtaining approval.

FIG. 81 is a web shot of an embodiment of a user interface 308 for a first step in the method of making a video visitation call by an outside family member or friend. FIG. 82 is a web shot of an embodiment of a user interface 309 for a second or subsequent step in the method of obtaining approval, wherein the video visitation caller is waiting for the video visitation call to connect with the inmate. Upon connection, a video visitation screen appears as for example is shown in FIG. 65 or 65.

Figure 84:
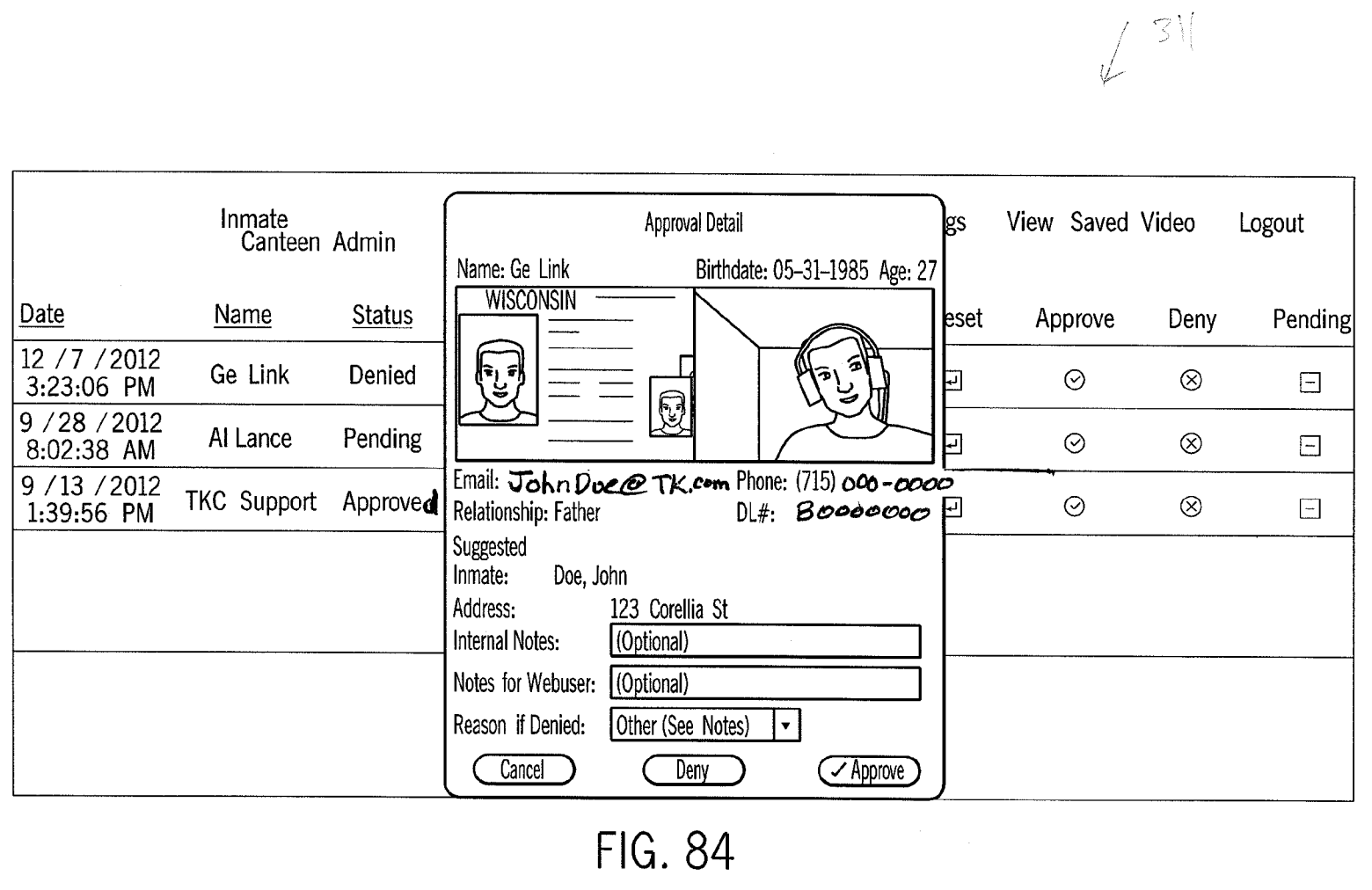

FIG. 83 is a web shot of an embodiment of a user interface 310 for an administrator who is manually approving requests for video visitation rights for a caller. FIG. 84 is a web shot of an embodiment of a subsequent user interface 311 for an administrator who is manually approving requests for video visitation rights for a caller.

Figure 85:
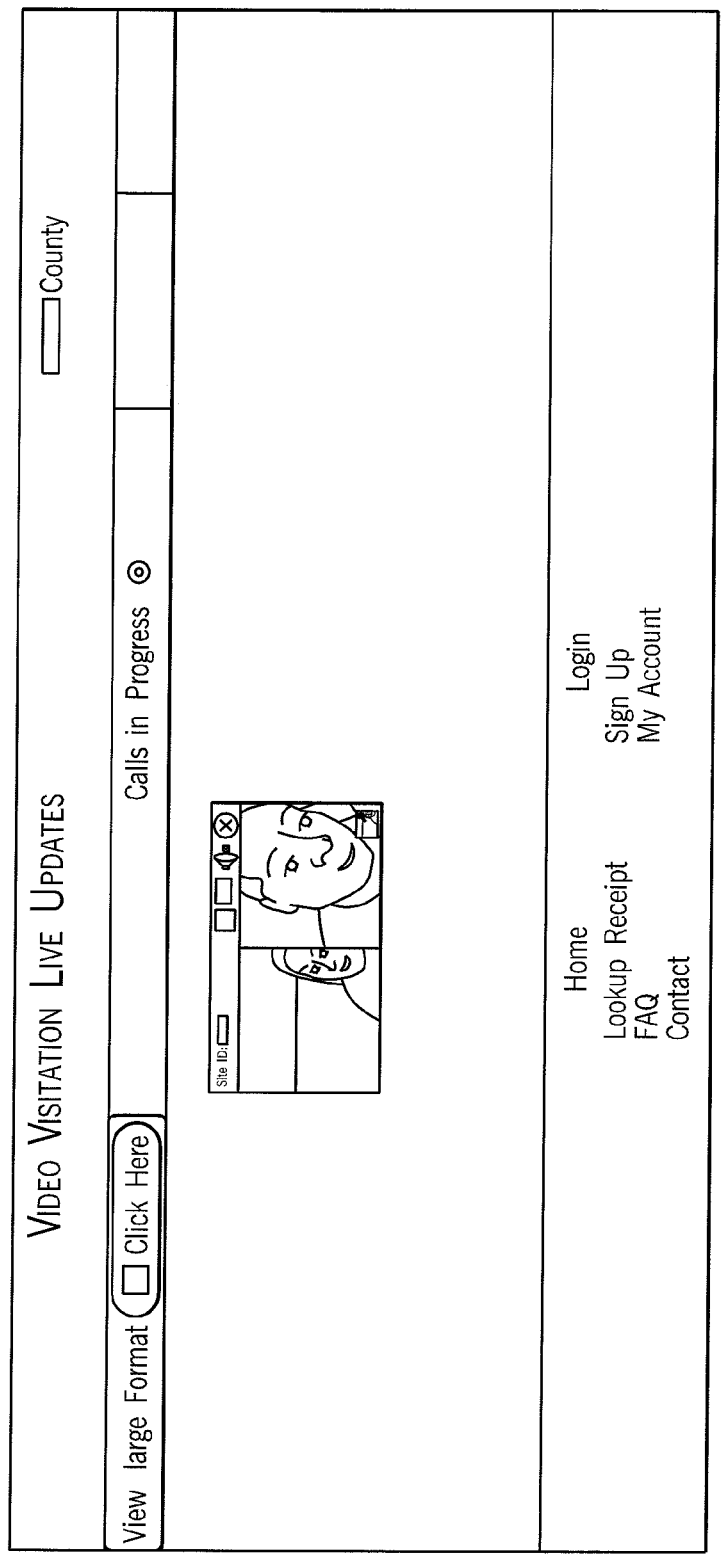
FIG. 85 is a web shot of an embodiment of a user interface for a system administrator for monitoring live updates of video visitation calls in progress in the overall system.
Figure 87:
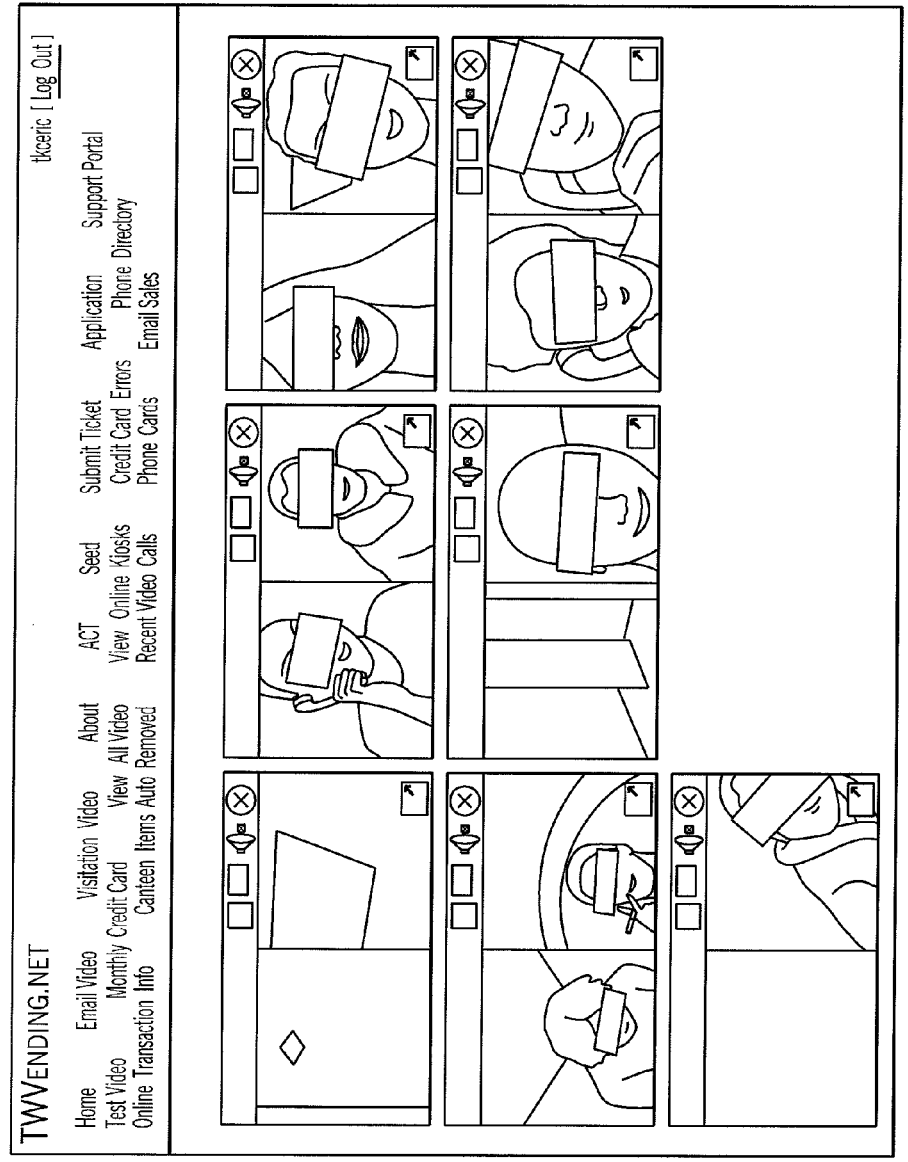
FIG. 87 is a web shot of an embodiment of a user interface for a system administrator for monitoring plural video visitation calls in progress in the overall system.

FIG. 85 is a web shot of an embodiment of a user interface 312 for a system administrator for monitoring live updates of video visitation calls in progress in the overall system. FIG. 86 is a web shot of an embodiment of a user interface 313 for a system administrator for monitoring and controlling video visitation calls in the overall system. FIG. 87 is a web shot of an embodiment of a user interface 314 for a system administrator for monitoring plural video visitation calls in progress in the overall system.

The descriptions above and the accompanying materials should be interpreted in the illustrative and not the limited sense. While the invention has been disclosed in connection with the preferred embodiment or embodiments thereof, it should be understood that there may be other embodiments which fall within the scope of the invention.

The invention claimed is:

1. A system for providing audio-visual telecommunications between a resident inside a secure facility and at least one person outside the secure facility via a smart phone mobile device, and for management of such audio-visual telecommunications by an administrator of the secure facility, comprising: at least one audio-visual telecommunications device disposed at the secure facility for use by the resident, the secure facility audio-visual telecommunications device adapted to be communicatively connected to an external streaming platform communicatively connected to the secure facility audio-visual telecommunications device via real time messaging protocol (RTMP) through a flash object flex communicatively connected between the secure facility audio-visual telecommunications device and the streaming platform and through a flash object air communicatively connected between the streaming platform and the person outside the secure facility; and an audio-visual account management server communicatively connected to the at least one secure facility audio-visual telecommunications device, the audio-visual account management server being communicatively connected to the secure facility audio-visual telecommunications device and to the person outside the secure facility by hypertext transfer protocol (HTTP or HTTPS) and wherein the audiovisual account management server includes an inmate canteen web service, a database, and a monitoring and control web interface, and wherein the secure facility audio-visual telecommunications device, the streaming platform, by way of the flash object air, and the audio-visual account management server, by way of an RTMP flash object, are adapted to be communicatively connectible to at least one audio-visual communications smart phone mobile device disposed outside the secure facility for use by the at least one person outside the secure facility.

2. The system of claim 1, wherein the secure facility is an institution selected from the group of institutions consisting of a jail, a detention center, a short term corrections facility, a penitentiary, a prison and a mental health institution; wherein the resident is a person selected from the group of persons consisting of an inmate, a prisoner and a patient; wherein the administrator is a person selected from the group of persons consisting of a sheriff, an officer, a guard, a warden, a jailer, and a mental health worker, and wherein the at least one person outside secure facility is selected from the group of persons consisting of a family member, a friend, an acquaintance, and an attorney.

3. The system of claim 1, wherein the telecommunications between the resident of the secure facility and the at least one person outside the secure facility further includes telecommunications selected from the group of communications consisting of voice, SMS text, IM, and email; and wherein management of telecommunications is selected from the group of activities consisting of monitoring, recording, controlling and documenting communications and transactions of the resident.

4. The system of claim 3, wherein the controlling activities are selected from the group of activities consisting of video visitation blocking, blacklisting, email notification, section/station setting, attorney video visitation status, and deferred video visitation status.

5. The system of claim 1, wherein the person outside the secure facility is further able to electronically deposit funds or credits to an account of the resident at the secure facility, the account funding products and services at the secure facility selected from the group of products and services consisting of audio-visual communications, voice communications, vending drink, snacks and food items, and commissary items such as personal care items, books, videos, clothing and apparel, and blankets; and wherein the administrator is further able to monitor, audit and manage the account of the resident.

6. The system of claim 1, wherein the at least one audio-visual telecommunications device disposed at the secure facility is a device selected from the group of devices consisting of a personal computer (PC), and an audio-visual telecommunications kiosk; and wherein the person outside the secure facility communicatively connects with the system by a device adapted to connect to the audio-visual management server and the external streaming platform, including a PC and an audio-visual telecommunications kiosk, in addition to the smart phone mobile device.

7. The system of claim 1, wherein the audio-visual account management server controls video visitation permissions, video visitation charging, recording and monitoring.

8. The system of claim 7, wherein the audio-visual account management server further functions to pause, fast forward, and rewind a recorded audio-visual telecommunications stream, and to stop a live call in progress.

9. The system of claim 8 wherein the audio-visual account management server further functions to process calling rules.

10. The system of claim 1, wherein the audio-visual account manager server stores and processes information about the resident, the at least one person outside the secure facility.

11. The system of claim 10, wherein the audio-visual account manager server is a further comprises a TEAM Server provided by Team Software of Hudson, Wis. USA.

12. The system of claim 1, further comprising storage means connected to the audio-visual account management server.

13. The system of claim 1, further comprising server side action script communicatively between the audio-visual account management server and the streaming platform to permit hypertext transfer protocol communication therebetween.

14. The system of claim 1, wherein the at least one secure facility audio-visual telecommunications devices includes a plurality of audio-visual resident kiosks.

15. The system of claim 1, wherein the external streaming platform consists of an Influxis streaming platform.

16. The system of claim 1, wherein the system includes the external streaming platform.

17. A system for providing audio-visual telecommunications between an inmate inside a correctional facility, the facility being of the type having a public lobby, visitor center, or booking area in addition to secure inmate resident section, and at least one non-inmate family member, friend or attorney outside the secure facility, and for management of such audio-visual telecommunications by an administrator of the secure facility, comprising:
  a. at least one inmate audio-visual telecommunications kiosk disposed at the secure facility in the secure inmate resident section for use by the inmate;
  b. a streaming platform having:
    i. a real time messaging protocol (RTMP) communication link including:
      1. a flash object flex connection to the inmate kiosk,
      2. a flash object air, and
      3. a flash object, and
    ii. a hypertext transfer protocol (HTTP/HTTPS) communication link;
  c. an audio-visual account management server communicatively connected to the at least one secure facility inmate kiosk, and wherein the audio-visual account management server includes:
    i. an inmate canteen web server having a hypertext transfer protocol (HTTP/HTTPS) communication link connected to the inmate kiosk and to the streaming platform,
    ii. a database connected to the web server via the HTTP/HTTPS link, and
    iii. a monitoring and control web interface connected to the web server via the HTTP/HTTPS link;

d. at least one public visitation audio-visual telecommunications kiosk disposed in the public lobby, visitor center or booking area at the secure facility for use by the at least one non-inmate family member, friend or attorney, the at least one public visitation telecommunications kiosk being communicatively connected to the streaming platform via the RTMP flash object flex;

e. at least one PC disposed outside the secure facility for use by at least one non-inmate family member, friend or attorney, the PC being communicatively connected to the streaming platform RTMP flash object and to the inmate canteen webserver HTTP/HTTPS link;

f. at least one mobile device disposed outside the secure facility for use by at least one non-inmate family member, friend or attorney, the mobile device being communicatively connected to the streaming platform RTMP flash object air and to the inmate canteen webserver HTTP/HTTPS communication link;

g. wherein audio-visual telecommunications between the inmate and the at least one non-inmate family member, friend or attorney is selected from the group of communications consisting of voice, SMS text, IM, email, and audio-visual by way of the inmate kiosks and the public visitation kiosks, the PCs and the mobile devices; and wherein management of telecommunications is selected from the group of activities consisting of monitoring, recording, controlling and documenting audio-visual visitation and transactions of the inmate.

18. A method for audio-visually telecommunicating between a resident inside a secure facility and at least one person outside the secure facility, and for management of such telecommunication by an administrator of the secure facility, comprising the steps of (a) providing a system including (i) at least one audio-visual telecommunications device disposed at the secure facility for use by the resident, the secure facility audio-visual telecommunications device adapted to be communicatively connected to an external streaming platform; (ii) an audio-visual account management server communicatively connected to the at least one secure facility telecommunications device communications between the secure facility device and the streaming platform being by remote real time messaging protocol (RTMP), and communications between the secure facility device and the management server being by hypertext transfer protocol (HTTP/HTTPS), and (b) making an incoming audio-visual chat from at least one person outside the secure facility to the resident inside the secure facility.

19. The method for telecommunicating of claim 18, wherein the step of making an incoming video chat comprises the steps of determining whether the resident is in an active video section, verifying that a chat is authorized, displaying an answer message to the resident, and connecting the at least one person outside the secure facility and the resident.

20. The method of claim 18 further comprising the step of making an outgoing video chat from the resident to at least one person outside the secure facility.

21. The method of claim 20, wherein the step of making an outgoing call comprises the steps of receiving an video chat request, verifying that the resident is authorized to make an outgoing video chat, and sending a chat request to the at least one person outside the secure facility.

* * * * *